US012594985B2

(12) United States Patent
Edamoto et al.

(10) Patent No.: US 12,594,985 B2
(45) Date of Patent: *Apr. 7, 2026

(54) MOTOR CONTROL DEVICE

(71) Applicant: JTEKT CORPORATION, Kariya (JP)

(72) Inventors: Syouma Edamoto, Ikoma (JP); Tsutomu Tamura, Nara (JP); Robert Fuchs, Nara (JP); Mitsuko Yoshida, Nara (JP)

(73) Assignee: JTEKT CORPORATION, Kariya (JP)

( * ) Notice: Subject to any disclaimer, the term of this patent is extended or adjusted under 35 U.S.C. 154(b) by 28 days.

This patent is subject to a terminal disclaimer.

(21) Appl. No.: 18/705,206

(22) PCT Filed: May 12, 2022

(86) PCT No.: PCT/JP2022/020124
§ 371 (c)(1),
(2) Date: Apr. 26, 2024

(87) PCT Pub. No.: WO2023/079776
PCT Pub. Date: May 11, 2023

(65) Prior Publication Data

US 2024/0416991 A1      Dec. 19, 2024

(30) Foreign Application Priority Data

Nov. 8, 2021    (WO) .................. PCT/JP2021/041059

(51) Int. Cl.
B62D 5/04 (2006.01)
B62D 6/00 (2006.01)

(52) U.S. Cl.
CPC ........... B62D 5/0463 (2013.01); B62D 6/002 (2013.01)

(58) Field of Classification Search
CPC .. B62D 5/0409; B62D 5/0403; B62D 5/0457; B62D 5/0463; B62D 15/025;
(Continued)

(56) References Cited

U.S. PATENT DOCUMENTS 6,212,453 B1      4/2001   Kawagoe et al.
11,267,506 B2 *   3/2022   Moreillon ............ B62D 5/0463
(Continued)

FOREIGN PATENT DOCUMENTS

EP            2 842 833 B1      11/2016
JP            H11-073597 A       3/1999
(Continued)

OTHER PUBLICATIONS

Nov. 9, 2023, International Preliminary Report on Patentability issued in International Patent Application No. PCT/JP2022/020124.
(Continued)

*Primary Examiner* — Logan M Kraft
*Assistant Examiner* — Johnny H Hoang
(74) *Attorney, Agent, or Firm* — Oliff PLC

(57) ABSTRACT

A motor control device includes: an assist torque command value generation unit that generates an assist torque command value using steering torque; a manual steering command value generation unit that generates a manual steering command value using the steering torque and the assist torque command value; an integrated angle command value calculation unit that calculates an integrated angle command value by adding the manual steering command value to an automatic steering command value for driving assist; and a switching unit that switches between a first control mode in which an electric motor is controlled based on the assist torque command value or the manual steering command value and a second control mode in which the electric motor is controlled based on the integrated angle command value
(Continued)

according to a lateral position of a vehicle with respect to a lane in a driving assist mode.

7 Claims, 29 Drawing Sheets

(58) Field of Classification Search
CPC ........ B62D 15/021; B62D 6/00; B62D 6/002; B62D 6/007; B62D 6/008; B62D 1/02; B62D 1/286
USPC ..................................................... 701/41–89
See application file for complete search history.

(56) References Cited

U.S. PATENT DOCUMENTS

| | | | |
|---|---|---|---|
| 2011/0015850 A1 | 1/2011 | Tange et al. | |
| 2014/0222295 A1* | 8/2014 | Dornhege | B62D 6/002 701/42 |
| 2015/0057889 A1* | 2/2015 | Tamaizumi | B62D 5/0463 701/41 |
| 2015/0344066 A1 | 12/2015 | Tsubaki et al. | |
| 2017/0015322 A1* | 1/2017 | Saito | B60W 10/18 |
| 2019/0039642 A1 | 2/2019 | Minaki et al. | |
| 2019/0161116 A1 | 5/2019 | Moreillon et al. | |
| 2019/0210638 A1* | 7/2019 | Ueno | B62D 6/00 |
| 2019/0329818 A1 | 10/2019 | Shoji et al. | |
| 2020/0039576 A1 | 2/2020 | Shoji | |
| 2020/0269906 A1* | 8/2020 | Nakade | B62D 5/0463 |
| 2020/0398893 A1* | 12/2020 | Shoji | B62D 6/002 |
| 2021/0253161 A1 | 8/2021 | Yoshida et al. | |
| 2022/0063713 A1* | 3/2022 | Shoji | B62D 1/02 |

FOREIGN PATENT DOCUMENTS

| | | | |
|---|---|---|---|
| JP | 2001-048035 A | 2/2001 | |
| JP | 2007-326534 A | 12/2007 | |
| JP | 2010-030505 A | 2/2010 | |
| JP | 2016-107750 A | 6/2016 | |
| JP | 2018-154334 A | 10/2018 | |
| JP | 2018-183046 A | 11/2018 | |
| JP | 2019-098817 A | 6/2019 | |
| JP | 2019-194059 A | 11/2019 | |
| JP | 2020-019346 A | 2/2020 | |
| JP | 2020-023221 A | 2/2020 | |
| WO | 2009/110151 A1 | 9/2009 | |

OTHER PUBLICATIONS

Jul. 26, 2022 International Search Report issued in International Patent Application No. PCT/JP2022/020124.

Feb. 5, 2025 Search Report issued in European Patent Application No. 22889602.3.

Dec. 6, 2024 Extended Search Report issued in European Patent Application No. 22841936.2.

* cited by examiner

ASSIST TORQUE
COMMAND VALUE ($T_{asst}$)

⟨RIGHT⟩

O

⟨LEFT⟩
TORSION BAR
TORQUE ($T_{tb}$)

$T_{tb}$ $T_{asst}$

Lower column $J_{ref}$ $C_{vl}$ $k_{vl}$

LEFT LANE
BOUNDARY

CENTER OF
LANE

RIGHT LANE
BOUNDARY

FIG. 21

START

S21  W1 = 1, W2 = 0

S22  IS VEHICLE REFERENCE POSITION ON LEFT SIDE OF CENTER OF LANE ?  NO  YES

S23  $P_{lat} < P_{L1}$ and $\theta_{vh} > 0$ ?  NO  YES

S27  $P_{lat} < P_{R1}$ and $\theta_{vh} > 0$ ?  NO  YES

S24  W1 → 0, W2 → 1

S28  W1 → 0, W2 → 1

S25  $P_{lat} > P_{L2}$ and $\theta_{vh} < 0$ ?  NO  YES

S29  $P_{lat} > P_{R2}$ and $\theta_{vh} < 0$ ?  NO  YES

S26  W1 → 1, W2 → 0

S30  W1 → 1, W2 → 0

MOTOR CONTROL DEVICE

TECHNICAL FIELD

The present invention relates to a motor control device that controls drive of an electric motor for steering angle control.

BACKGROUND ART

Patent Document 1 below discloses the following vehicle steering device. That is, a steering assist current is calculated in a driving assist mode. A risk level is calculated and a steering reaction force gain is calculated based on the risk level. A steering reaction force control current is calculated by multiplying a deviation between a target steering angle for steering assist and a steering angle by the steering reaction force gain, and a steering assist correction gain is calculated based on the steering reaction force gain. Then, an actuator drive current is calculated by adding a value obtained by multiplying the steering assist current by the steering assist correction gain and the steering reaction force control current, and drive of the actuator (electric motor) is controlled based on the actuator drive current. Thus, a reaction force based on the risk is generated and a driver is notified about the risk state.

RELATED ART DOCUMENTS

Patent Documents

Patent Document 1: Japanese Unexamined Patent Application Publication No. 2010-30505 (JP 2010-30505 A)

SUMMARY OF THE INVENTION

Problem to be Solved by the Invention

An object of an embodiment of the present invention is to provide a motor control device that can apply a steering reaction force to a driver by a novel method in a driving assist mode.

Means for Solving the Problem

An embodiment of the present invention provides a motor control device that controls drive of an electric motor for steering angle control. The motor control device includes: an assist torque command value generation unit that generates an assist torque command value using steering torque; a manual steering command value generation unit that generates a manual steering command value using the steering torque and the assist torque command value; an integrated angle command value calculation unit that calculates an integrated angle command value by adding the manual steering command value to an automatic steering command value for driving assist; and a switching unit that switches between a first control mode in which the electric motor is controlled based on the assist torque command value or the manual steering command value and a second control mode in which the electric motor is controlled based on the integrated angle command value according to a lateral position of a vehicle with respect to a lane in a driving assist mode.

The above and other objects, features, and effects of the present invention will become apparent from the following description of an embodiment that will be given with reference to the accompanying drawings.

BRIEF DESCRIPTION OF THE DRAWINGS

FIG. 21 is a graph showing an example of a weighting characteristic with respect to the heading angle $\theta_{vh}$.

MODES FOR CARRYING OUT THE INVENTION

Description of Embodiment of Invention

Figure 1:
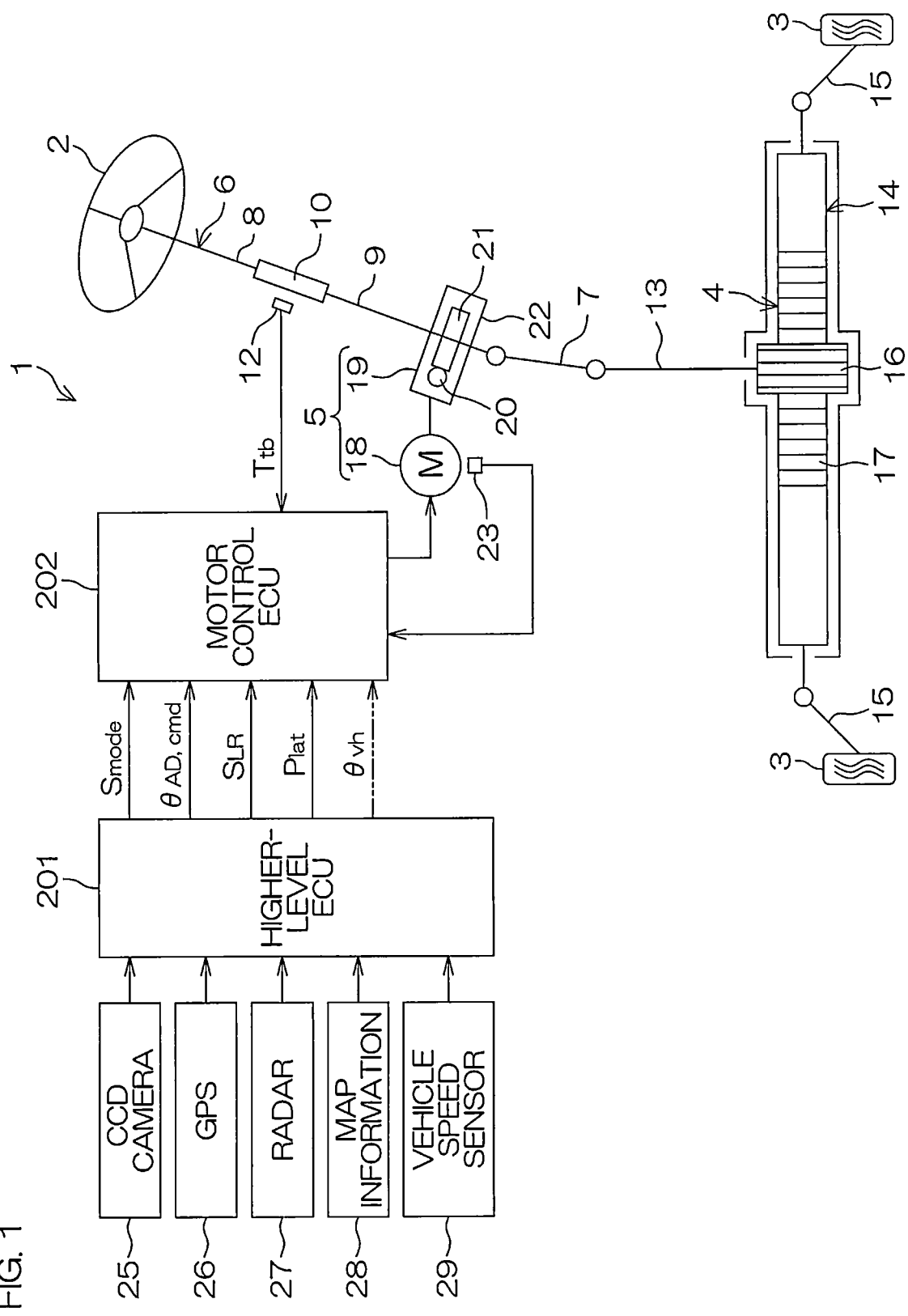
FIG. 1 is a schematic diagram showing a schematic configuration of an electric power steering system to which a motor control device according to an embodiment of the present invention is applied.

An embodiment of the present invention provides a motor control device that controls drive of an electric motor for steering angle control. The motor control device includes: an assist torque command value generation unit that generates an assist torque command value using steering torque; a manual steering command value generation unit that generates a manual steering command value using the steering torque and the assist torque command value; an integrated angle command value calculation unit that calculates an integrated angle command value by adding the manual steering command value to an automatic steering command value for driving assist; and a switching unit that switches between a first control mode in which the electric motor is controlled based on the assist torque command value or the manual steering command value and a second control mode in which the electric motor is controlled based on the integrated angle command value according to a lateral position of a vehicle with respect to a lane in a driving assist mode.

In the embodiment of the present invention, a first lateral position that is the lateral position at which the first control mode is switched to the second control mode and a second lateral position that is the lateral position at which the second control mode is switched to the first control mode are set in advance, and a steering reaction force applied to the vehicle when the vehicle moves from a lane boundary of the lane to the second lateral position has a first characteristic in which a rate of decrease in the steering reaction force is high, and a second characteristic that is continuous with the first characteristic and in which the rate of decrease in the steering reaction force is lower than the rate of decrease in the steering reaction force in the first characteristic.

In the embodiment of the present invention, a first lateral position that is the lateral position at which the first control mode is switched to the second control mode and a second lateral position that is the lateral position at which the second control mode is switched to the first control mode are set to different positions.

In the embodiment of the present invention, the second lateral position is set closer to a center of the lane than the first lateral position.

In the embodiment of the present invention, the first lateral position is set closer to a center of the lane than the second lateral position.

In the embodiment of the present invention, the manual steering command value is calculated in consideration of a virtual road load torque.

In the embodiment of the present invention, the virtual road load torque is set according to the lateral position of the vehicle with respect to the lane.

The embodiment of the present invention, the virtual road load torque is set according to an angle of a traveling direction of the vehicle with respect to the lane.

In the embodiment of the present invention, the virtual road load torque is set based on information on outside of the lane where the vehicle is traveling.

Detailed Description of Embodiment of Invention

An embodiment of the present invention will be described in detail below with reference to the accompanying drawings.

FIG. 1 is a schematic diagram showing a schematic configuration of an electric power steering system to which a steering device according to an embodiment of the present invention is applied.

An electric power steering system 1 includes: a steering wheel 2 that is a steering member for steering a vehicle; a steering operation mechanism 4 that steers steered wheels 3 in conjunction with rotation of the steering wheel 2; and a steering assist mechanism 5 that assists a driver in steering. The steering wheel 2 and the steering operation mechanism 4 are mechanically connected via a steering shaft 6 and an intermediate shaft 7.

The steering shaft 6 includes an input shaft 8 connected to the steering wheel 2 and an output shaft 9 connected to the intermediate shaft 7. The input shaft 8 and the output shaft 9 are connected via a torsion bar 10 so as to be relatively rotatable.

A torque sensor 12 is disposed near the torsion bar 10. The torque sensor 12 detects torsion bar torque $T_{tb}$ applied to the steering wheel 2 based on the amount of relative rotational displacement between the input shaft 8 and the output shaft 9. In the present embodiment, the torsion bar torque $T_{tb}$ that is detected by the torque sensor 12 is such that, for example, the torque for steering to the left is detected as a positive value and the torque for steering to the right is detected as a negative value. It is herein assumed that the magnitude of the torsion bar torque $T_{tb}$ increases as the absolute value thereof increases. The torsion bar torque $T_{tb}$ is an example of the "steering torque" according to the present invention.

The steering operation mechanism 4 is a rack and pinion mechanism including a pinion shaft 13 and a rack shaft 14 that is a steered shaft. The steered wheels 3 are connected to the ends of the rack shaft 14 via tie rods 15 and knuckle arms (not shown). The pinion shaft 13 is connected to the intermediate shaft 7. The pinion shaft 13 is configured to rotate in conjunction with steering of the steering wheel 2. A pinion 16 is connected to a distal end of the pinion shaft 13.

The rack shaft 14 extends linearly along the right-left direction of the vehicle. A rack 17 that meshes with the pinion 16 is formed on an intermediate portion of the rack shaft 14 in the axial direction. The pinion 16 and the rack 17 convert rotation of the pinion shaft 13 into axial movement of the rack shaft 14. The steered wheels 3 can be steered by moving the rack shaft 14 in the axial direction.

When the steering wheel 2 is steered (rotated), this rotation is transferred to the pinion shaft 13 via the steering shaft 6 and the intermediate shaft 7. The pinion 16 and the rack 17 convert rotation of the pinion shaft 13 into axial movement of the rack shaft 14. The steered wheels 3 are thus steered.

The steering assist mechanism 5 includes an electric motor 18 that generates a steering assist force (assist torque), and a speed reducer 19 that amplifies output torque of the electric motor 18 and transfers the amplified torque to the steering operation mechanism 4. The speed reducer 19 is a worm gear mechanism including a worm gear 20 and a worm wheel 21 that meshes with the worm gear 20. The speed reducer 19 is housed in a gear housing 22 that is a transfer mechanism housing.

Hereinafter, the speed reduction ratio (gear ratio) of the speed reducer 19 may be represented by N. The speed reduction ratio N is defined as the ratio $(\theta_{wg}/\theta_{ww})$ of a worm gear angle $\theta_{wg}$, that is, the rotational angle of the worm gear 20, to a worm wheel angle $\theta_{ww}$, that is, the rotational angle of the worm wheel 21.

The worm gear 20 is rotationally driven by the electric motor 18. The worm wheel 21 is connected to the output shaft 9 so as to be rotatable together.

When the worm gear 20 is rotationally driven by the electric motor 18, the worm wheel 21 is rotationally driven so that motor torque is applied to the steering shaft 6 and the steering shaft 6 (output shaft 9) is rotated. Rotation of the steering shaft 6 is transferred to the pinion shaft 13 via the intermediate shaft 7. Rotation of the pinion shaft 13 is converted into axial movement of the rack shaft 14. The steered wheels 3 are thus steered. That is, rotationally driving the worm gear 20 using the electric motor 18 enables steering assist by the electric motor 18 and steering of the steered wheels 3. The electric motor 18 is provided with a rotational angle sensor 23 that detects the rotational angle of a rotor of the electric motor 18.

The torque that is applied to the output shaft 9 (example of the object to be driven by the electric motor 18) includes motor torque from the electric motor 18 and disturbance torque $T_{lc}$ other than the motor torque. The disturbance torque $T_{lc}$ other than the motor torque includes the torsion bar torque $T_{tb}$, road load torque (road reaction torque) Tri, and friction torque $T_f$.

The torsion bar torque $T_{tb}$ is torque that is applied from the steering wheel 2 side to the output shaft 9 due to a force that is applied to the steering wheel 2 by the driver, a force that is generated by steering inertia, etc.

The road load torque Tri is torque that is applied from the steered wheel 3 side to the output shaft 9 via the rack shaft 14 due to self-aligning torque that is generated in tires, a force that is generated by suspensions and tire wheel alignment, a friction force of the rack and pinion mechanism, etc.

The vehicle is equipped with a CCD (Charge Coupled Device) camera 25 that captures an image of the road ahead of the vehicle in the advancing direction, a GPS (Global Positioning System) 26 that detects the position of the vehicle, a radar 27 that detects a road shape and obstacles, a map information memory 28 that stores map information, and a vehicle speed sensor 29.

The CCD camera 25, the GPS 26, the radar 27, the map information memory 28, and the vehicle speed sensor 29 are connected to a higher-level ECU (ECU: Electronic Control Unit) 201 that performs driving assist control. The higher-level ECU 201 performs surrounding environment recognition, vehicle position estimation, route planning, etc. based on information obtained by the CCD camera 25, the GPS 26, the radar 27, and the vehicle speed sensor 29 and the map information, and determines control target values for steering and drive actuators.

In the present embodiment, the driving mode includes a normal mode and a driving assist mode. The higher-level ECU 201 sets an automatic steering command value $\theta_{AD,cmd}$ for driving assist in the driving assist mode. In the present embodiment, the driving assist is lane keep assist (LKA) for the vehicle to avoid deviating from its lane. The automatic steering command value $\theta_{AD,cmd}$ is a target value of the steering angle for causing the vehicle to travel along a target travel line.

The automatic steering command value $\theta_{AD,cmd}$ is set based on, for example, the vehicle speed, the lateral deviation from the target travel line, and the yaw deviation of the vehicle from the target travel line. A process of setting such an automatic steering command value $\theta_{AD,cmd}$ is well known, and therefore will not be described in detail herein.

The higher-level ECU 201 outputs a mode signal $S_{mode}$ indicating whether the driving mode is the normal mode or the driving assist mode, a right/left discrimination signal $S_{LR}$ indicating whether the vehicle reference position is on the right or left side with respect to the center of the lane, and a vehicle lateral position $P_{lat}$. The vehicle reference position is a predetermined reference position at the width center of the vehicle.

The vehicle lateral position $P_{lat}$ is a distance from a boundary of the lane where the vehicle is currently traveling (hereinafter referred to as "lane boundary") to the vehicle reference position. Specifically, when the vehicle reference position is on the left side with respect to the center, the vehicle lateral position $P_{lat}$ is a distance from a left lane boundary to the vehicle reference position. When the vehicle reference position is on the right side with respect to the center of the lane, the vehicle lateral position $P_{lat}$ is a distance from a right lane boundary to the vehicle reference position.

The mode signal $S_{mode}$, the right/left discrimination signal $S_{LR}$, the vehicle lateral position $P_{lat}$, and the automatic steering command value $\theta_{AD,cmd}$ are provided to a motor control ECU 202 via an in-vehicle network. The torsion bar torque $T_{tb}$ detected by the torque sensor 12 and an output signal from the rotational angle sensor 23 are input to the motor control ECU 202. The motor control ECU 202 controls the electric motor 18 based on these input signals and information provided from the higher-level ECU 201.

Figure 2:
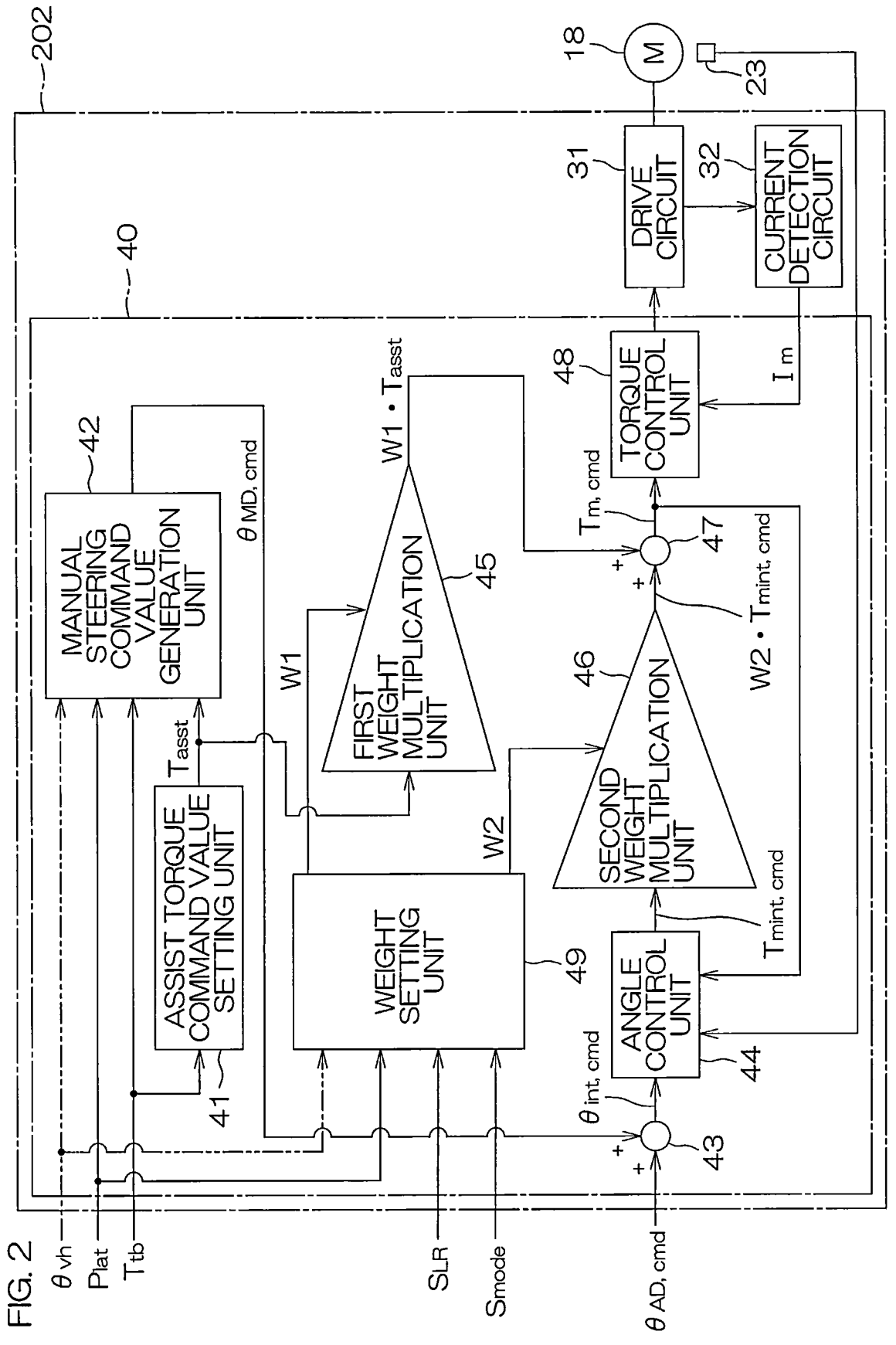
FIG. 2 is a block diagram showing an electrical configuration of a motor control ECU.

FIG. 2 is a block diagram showing an electrical configuration of the motor control ECU 202.

Operation for a case where the driving mode is the driving assist mode will be mainly described below.

The motor control ECU 202 includes a microcomputer 40, a drive circuit (inverter circuit) 31 that is controlled by the microcomputer 40 and supplies electric power to the electric motor 18, and a current detection circuit 32 that detects a current (hereinafter referred to as "motor current $I_m$") that flows through the electric motor 18.

The microcomputer 40 includes a CPU and a memory (such as a ROM, a RAM, and a non-volatile memory), and functions as a plurality of functional processing units by executing a predetermined program. The plurality of functional processing units includes an assist torque command value setting unit 41, a manual steering command value generation unit 42, an integrated angle command value calculation unit 43, an angle control unit 44, a first weight multiplication unit 45, a second weight multiplication unit 46, an addition unit 47, a torque control unit (current control unit) 48, and a weight setting unit 49.

The first weight multiplication unit 45, the second weight multiplication unit 46, the addition unit 47, and the weight setting unit 49 are examples of the "switching unit" according to the present invention.

Figure 3:
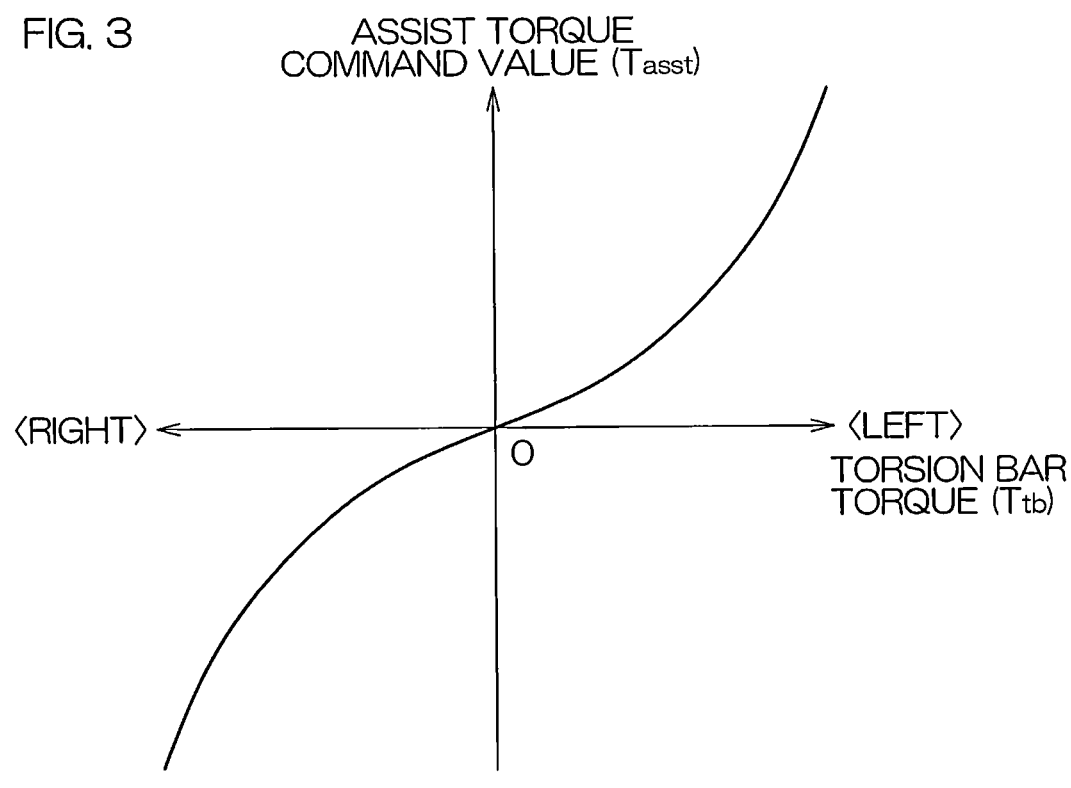
FIG. 3 is a graph showing an example of setting an assist torque command value $T_{asst}$ with respect to torsion bar torque $T_{tb}$.

The assist torque command value setting unit 41 sets an assist torque command value $T_{asst}$ that is a target value of the assist torque necessary for a manual operation. The assist torque command value setting unit 41 sets the assist torque command value $T_{asst}$ based on the torsion bar torque $T_{tb}$ detected by the torque sensor 12. An example of setting the assist torque command value $T_{asst}$ with respect to the torsion bar torque $T_{tb}$ is shown in FIG. 3.

The assist torque command value $T_{asst}$ is set to a positive value when the electric motor 18 should generate a steering assist force for steering to the left, and is set to a negative value when the electric motor 18 should generate a steering assist force for steering to the right. The assist torque command value $T_{asst}$ is positive for a positive value of the torsion bar torque $T_{tb}$, and is negative for a negative value of the torsion bar torque $T_{tb}$. The assist torque command value $T_{asst}$ is set so that its absolute value increases as the absolute value of the torsion bar torque $T_{tb}$ increases.

The assist torque command value setting unit 41 may acquire the vehicle speed from the higher-level ECU 201, and set the assist torque command value $T_{asst}$ based on the vehicle speed and the torsion bar torque $T_{tb}$. In this case, the assist torque command value $T_{asst}$ is set according to the torsion bar torque $T_{tb}$ as described above, and set so that the absolute value of the assist torque command value $T_{asst}$ decreases as a vehicle speed V increases.

The assist torque command value setting unit 41 may calculate the assist torque command value $T_{asst}$ by multiplying the torsion bar torque $T_{tb}$ by a preset constant.

The manual steering command value generation unit 42 is provided to, when the driver operates the steering wheel 2, set the steering angle (more exactly, a rotational angle θ of the output shaft 9) that matches the steering wheel operation as a manual steering command value $\theta_{MD,cmd}$. The manual steering command value generation unit 42 generates the manual steering command value $\theta_{MD,cmd}$ using the torsion bar torque $T_{tb}$ detected by the torque sensor 12 and the assist torque command value $T_{asst}$ set by the assist torque command value setting unit 41. The manual steering command value generation unit 42 will be described in detail later.

The integrated angle command value calculation unit 43 calculates an integrated angle command value $\theta_{int,cmd}$ by adding the manual steering command value $\theta_{MD,cmd}$ to the automatic steering command value $\theta_{AD,cmd}$ set by the higher-level ECU 201.

The angle control unit 44 calculates an integrated motor torque command value $T_{mint,cmd}$ that matches the integrated angle command value $\theta_{int,cmd}$ based on the integrated angle command value $\theta_{int,cmd}$. The angle control unit 44 will be described in detail later.

The first weight multiplication unit 45 multiplies the assist torque command value $T_{asst}$ set by the assist torque command value setting unit 41 by a first weight W1. The second weight multiplication unit 46 multiplies the integrated motor torque command value $T_{mint,cmd}$ by a second weight W2. The first weight W1 and the second weight W2 are set by the weight setting unit 49. The weight setting unit 49 will be described in detail later.

The addition unit 47 calculates a motor torque command value $T_{m,cmd}$ for the electric motor 18 by adding an assist torque command value $W1 \cdot T_{asst}$ after first weight multiplication (after a first weighting process) and an integrated motor torque command value $W2 \cdot T_{mint,cmd}$ after second weight multiplication (after a second weighting process).

The torque control unit 48 drives a drive circuit 31 so that the motor torque of the electric motor 18 is brought closer to the motor torque command value $T_{m,cmd}$.

In the present embodiment, the manual steering command value generation unit 42 uses a reference EPS model to set the manual steering command value $\theta_{MD,cmd}$.

Figure 4:
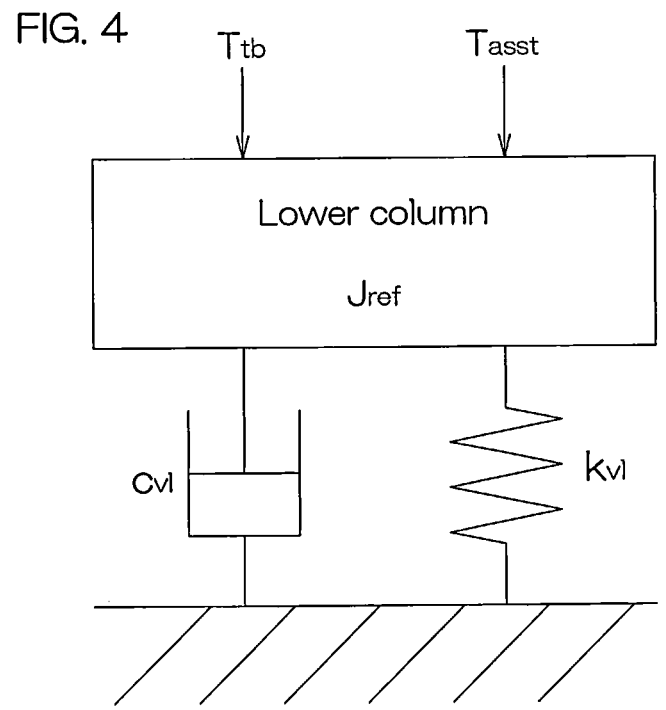
FIG. 4 is a schematic diagram showing an example of a reference EPS model that is used in a manual steering command value generation unit.

FIG. 4 is a schematic diagram showing an example of the reference EPS model that is used in the manual steering command value generation unit 42.

This reference EPS model is a single inertia model including a lower column. The lower column corresponds to the output shaft 9 and the worm wheel 21. In FIG. 4, $J_{ref}$ is the inertia of the lower column, and $T_{tb}$ is the torsion bar torque. The torsion bar torque $T_{tb}$, the assist torque command value $T_{asst}$, and the road load torque $T_{rl}$ are applied to the lower column. When the rotational angle of the lower column is the manual steering command value $\theta_{MD,cmd}$, the road load torque (virtual road load torque) $T_{rl}$ is given by expression (1) below using a virtual load spring stiffness coefficient $k_{vl}$, a virtual load viscous damping coefficient cvi, and the manual steering command value $\theta_{MD,cmd}$.

$$T_{rl} = -k_{vl} \cdot \theta_{MD,cmd} - c_{vl}(d\theta_{MD,cmd}/dt) \tag{1}$$

where $k_{vl}=k_{vl}(P_{lat})$ and $c_{vl}=c_{vl}(P_{lat})$.

As shown in expression (1) above, the virtual load spring stiffness coefficient $k_{vl}$ and the virtual load viscous damping coefficient ci are set in association with the vehicle lateral position $P_{lat}$.

Figure 5:
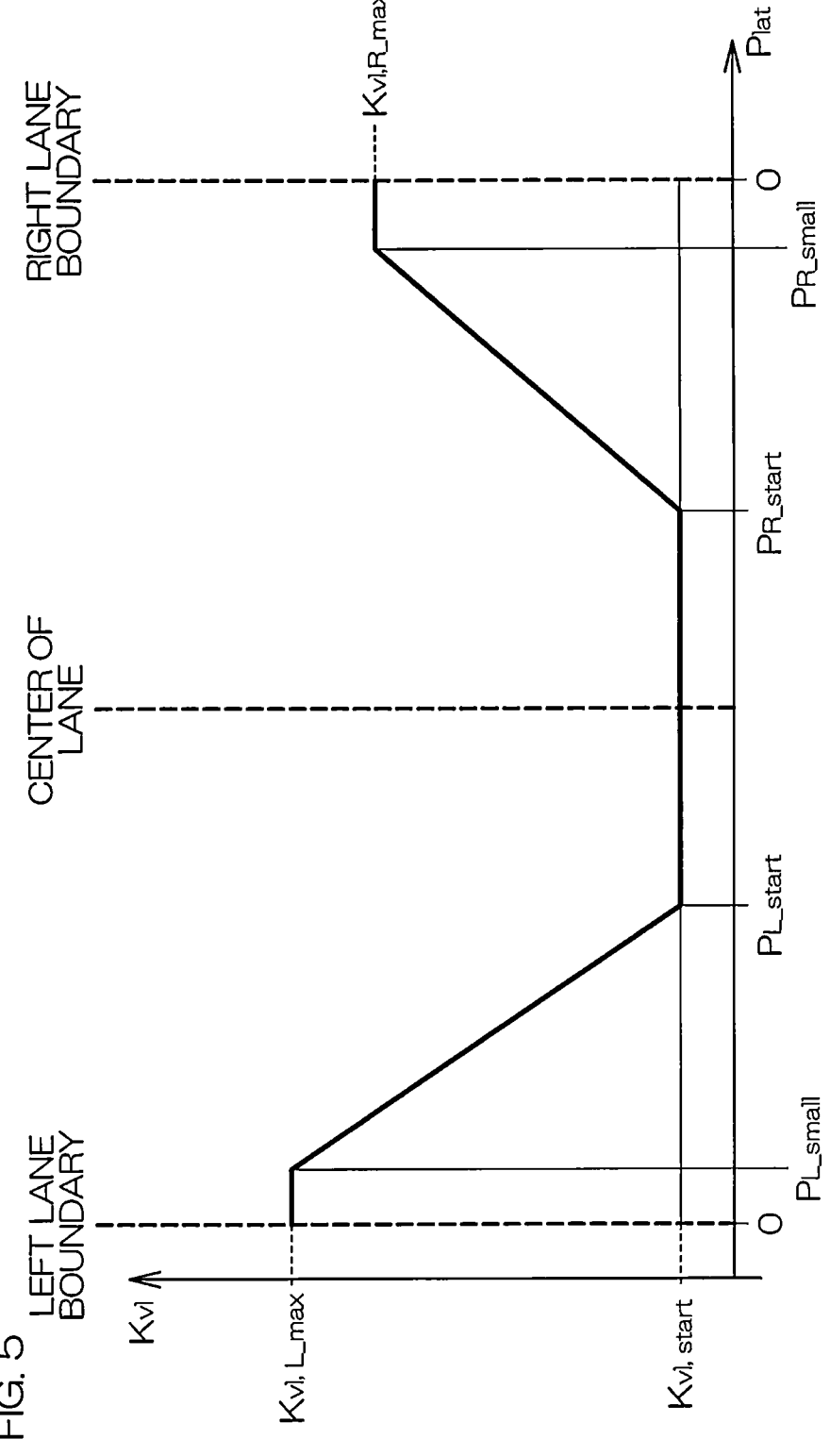
FIG. 5 is a graph showing an example of setting a virtual load spring component $k_{vl}$ with respect to a vehicle lateral position $P_{lat}$.

FIG. 5 is a graph showing an example of setting the virtual load spring stiffness coefficient $k_{vl}$ with respect to the vehicle lateral position $P_{lat}$. The affix L of each symbol in FIG. 5 indicates that the symbol is applied when the vehicle reference position is on the left side with respect to the center of the lane, and the affix R indicates that the symbol is applied when the vehicle reference position is on the right side with respect to the center of the lane. The same applies to FIG. 6 described later.

When the vehicle lateral position $P_{lat}$ is equal to or greater than a predetermined value $P_{L\_start}$ with respect to the left lane boundary or equal to or greater than a predetermined value $P_{R\_start}$ with respect to the right lane boundary, the virtual load spring stiffness coefficient $k_{vl}$ is set to a predetermined value $k_{vl,start}$. For example, $P_{L\_start}$ is set to about 60 cm. For example, $P_{R\_start}$ is set to about 70 cm.

When the vehicle lateral position $P_{lat}$ is equal to or greater than a predetermined value $P_{L\_small}$ smaller than $P_{L\_start}$ and is smaller than $P_L$ start with respect to the left lane boundary, the virtual load spring stiffness coefficient $k_{vl}$ is set according to a characteristic that it gradually increases from $k_{vl,start}$ to $k_{vl,L\_max}$ as the vehicle lateral position $P_{lat}$ decreases from $P_{L\_start}$ (as the vehicle reference position approaches the left lane boundary). For example, $P_{L\_small}$ is set to about 40 cm.

When the vehicle lateral position $P_{lat}$ is equal to or greater than a predetermined value $P_{R\_small}$ smaller than $P_{R\_start}$ and is smaller than $P_{R\_start}$ with respect to the right lane boundary, the virtual load spring stiffness coefficient $k_{vl}$ is set according to a characteristic that it gradually increases from $k_{vl,start}$ to $k_{vl,R\_max}$ as the vehicle lateral position $P_{lat}$ decreases from $P_{R\_start}$ (as the vehicle reference position approaches the right lane boundary). For example, $P_{R\_small}$ is set to about 50 cm.

When the vehicle lateral position $P_{lat}$ is smaller than $P_{L\_small}$ with respect to the left lane boundary, the virtual load spring stiffness coefficient $k_{vl}$ is set to $k_{vl,L\_max}$. When the vehicle lateral position $P_{lat}$ is smaller than $P_{R\_small}$ with respect to the right lane boundary, the virtual load spring stiffness coefficient $k_{vl}$ is set to $k_{vl,R\_max}$. The virtual load spring stiffness coefficient $k_{vl}$ is limited in this way to prevent the virtual road load torque $T_{rl}$ from increasing excessively so that the driver cannot intervene in steering.

Figure 6:
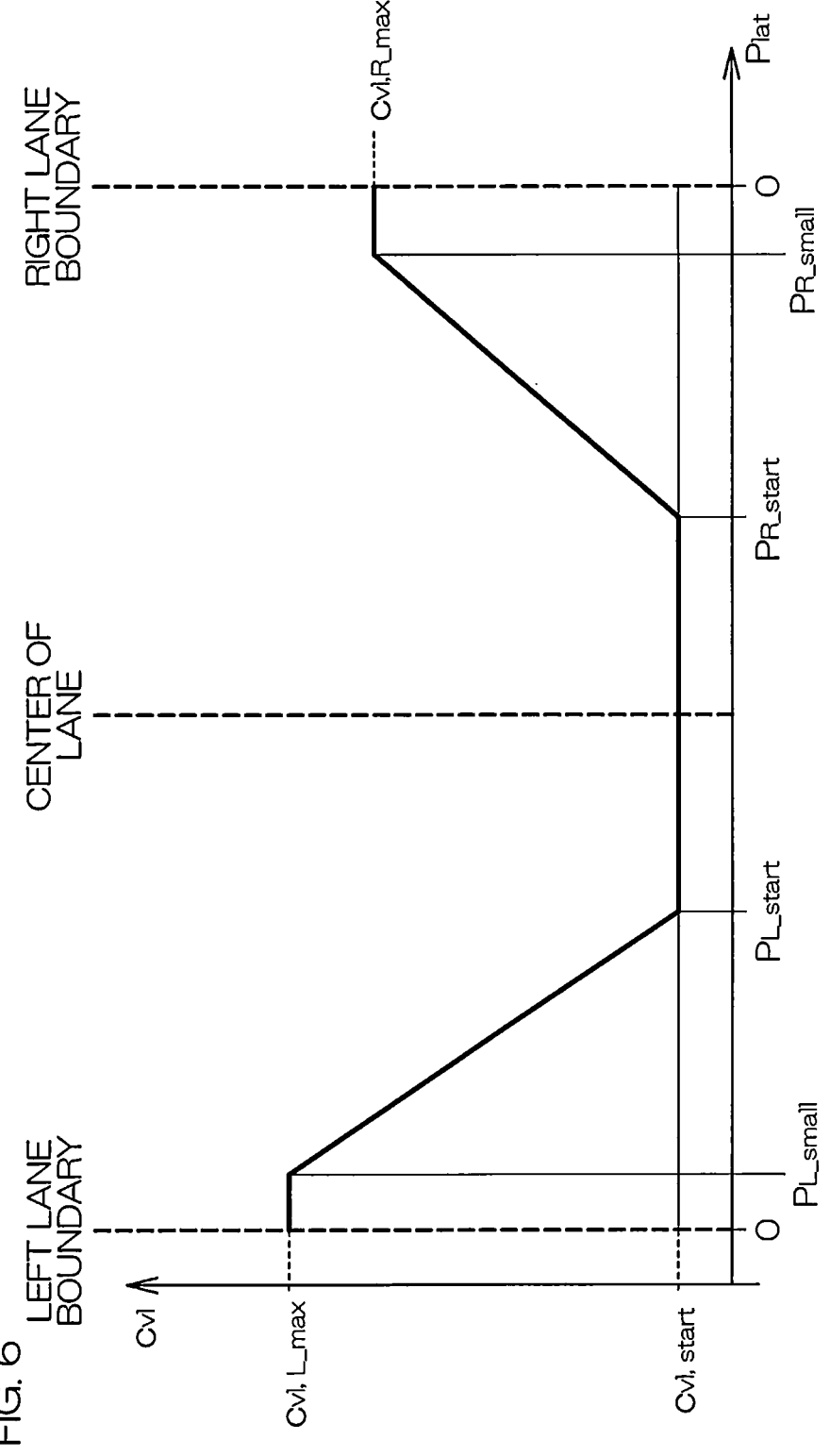
FIG. 6 is a graph showing an example of setting a virtual load viscous damping coefficient $c_{vl}$ with respect to the vehicle lateral position $P_{lat}$.

FIG. 6 is a graph showing an example of setting the virtual load viscous damping coefficient cvi with respect to the vehicle lateral position $P_{lat}$.

When the vehicle lateral position $P_{lat}$ is equal to or greater than the predetermined value $P_{L\_start}$ with respect to the left lane boundary or equal to or greater than the predetermined value $P_{R\_start}$ with respect to the right lane boundary, the virtual load viscous damping coefficient cvi is set to a predetermined value $c_{vl,start}$.

When the vehicle lateral position $P_{lat}$ is equal to or greater than the predetermined value $P_{L\_small}$ smaller than $P_L$ start and is smaller than $P_L$ start with respect to the left lane boundary, the virtual load viscous damping coefficient cvi is set according to a characteristic that it gradually increases from $c_{vl,start}$ to $c_{vl,L\_max}$ as the vehicle lateral position $P_{lat}$ decreases from $P_{L\_start}$ (as the vehicle reference position approaches the left lane boundary).

When the vehicle lateral position $P_{lat}$ is equal to or greater than the predetermined value $P_{R\_small}$ smaller than $P_{R\_start}$ and is smaller than $P_{R\_start}$ with respect to the right lane boundary, the virtual load viscous damping coefficient cvi is set according to a characteristic that it gradually increases from $c_{vl,start}$ to $c_{vl,R\_max}$ as the vehicle lateral position $P_{lat}$ decreases from $P_{R\_start}$ (as the vehicle reference position approaches the right lane boundary).

When the vehicle lateral position $P_{lat}$ is smaller than $P_{L\_small}$ with respect to the left lane boundary, the virtual load viscous damping coefficient cvi is set to $c_{vl,L\_max}$. When the vehicle lateral position $P_{lat}$ is smaller than $P_{R\_small}$ with respect to the right lane boundary, the virtual load viscous damping coefficient $c_{vl}$ is set to $c_{vl,R\_max}$.

An equation of motion of the reference EPS model is given by expression (2) below.

$$J_{ref} \cdot d^2\theta_{MD,cmd}/dt^2 = T_{tb} + T_{asst} - k_{vl} \cdot \theta_{MD,cmd} - c_{vl}(d\theta_{MD,cmd}/dt) \quad (2)$$

The manual steering command value generation unit 42 calculates the manual steering command value $\theta_{MD,cmd}$ by solving the differential equation given by expression (2) by substituting the torsion bar torque $T_{tb}$ detected by the torque sensor 12 into $T_{tb}$ and substituting the assist torque command value $T_{asst}$ set by the assist torque command value setting unit 41 into $T_{asst}$.

The virtual load spring stiffness coefficient $k_{vl}$ associated with the vehicle lateral position $P_{lat}$ is determined, for example, based on the vehicle lateral position $P_{lat}$ provided from the higher-level ECU 201 and a map that stores the virtual load spring stiffness coefficient $k_{vl}$ with respect to the vehicle lateral position $P_{lat}$ in FIG. 5. The virtual load viscous damping coefficient $c_{vl}$ associated with the vehicle lateral position $P_{lat}$ is determined, for example, based on the vehicle lateral position $P_{lat}$ provided from the higher-level ECU 201 and a map that stores the virtual load viscous damping coefficient $c_{vl}$ with respect to the vehicle lateral position $P_{lat}$ in FIG. 6.

The virtual load spring stiffness coefficient $k_{vl}$ and the virtual load viscous damping coefficient $c_{vl}$ may be set so that the characteristic of the virtual road load torque $T_{rl}$ changes depending on information on the outside of the lane where the vehicle is currently traveling. For example, the virtual load spring stiffness coefficient $k_{vl}$ and the virtual load viscous damping coefficient $c_{vl}$ may be set so that the characteristic of the virtual road load torque $T_{rl}$ changes depending on whether there is a lane adjacent to the lane, there is no lane adjacent to the lane, or there is a protective fence such as a guardrail for the lane. In this case, the information on the outside of the lane is provided from the higher-level ECU 201 to the motor control ECU 202.

Figure 7:
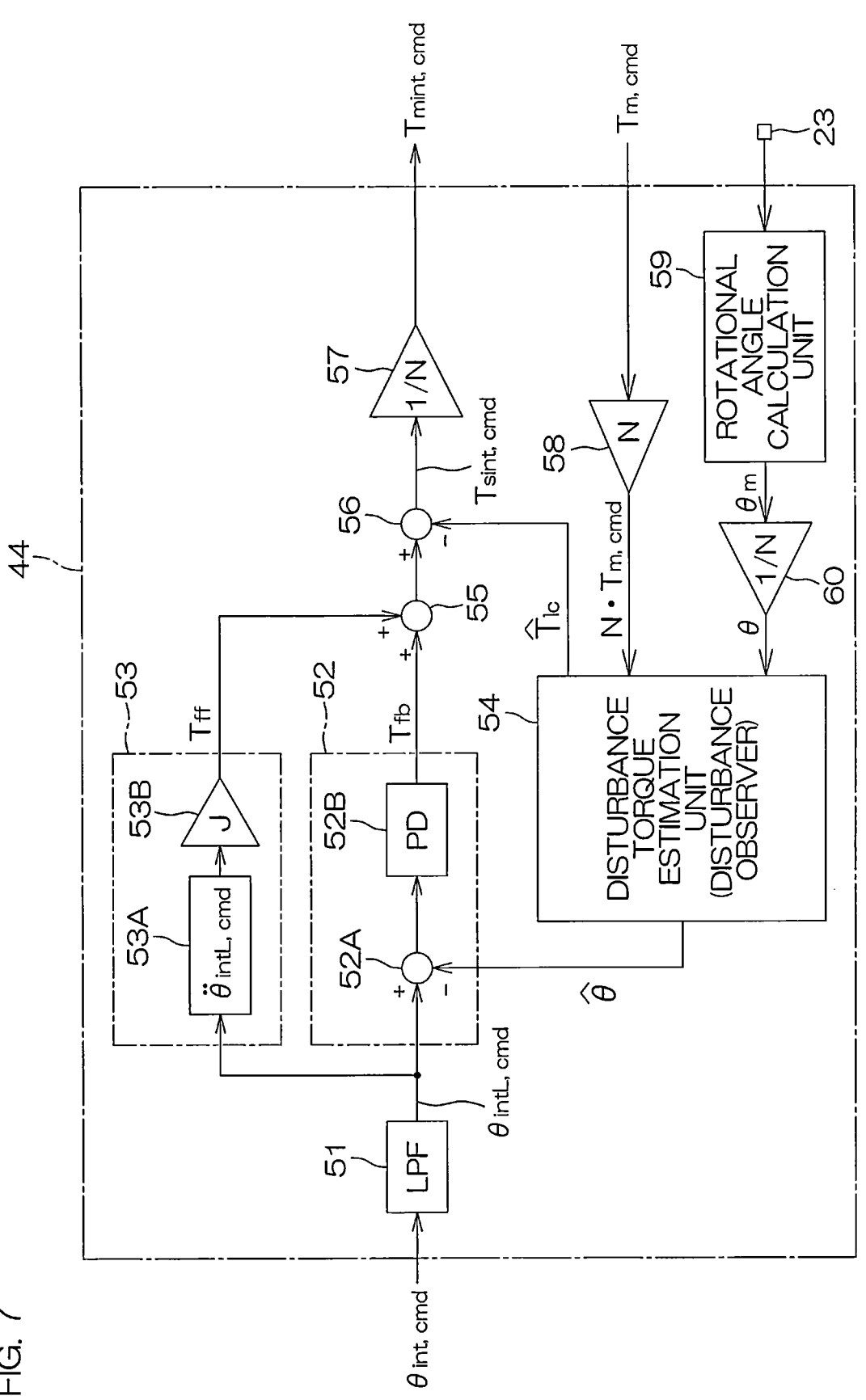
FIG. 7 is a block diagram showing the configuration of an angle control unit.

FIG. 7 is a block diagram showing the configuration of the angle control unit 44.

The angle control unit 44 calculates the integrated motor torque command value $T_{mint,cmd}$ based on the integrated angle command value $\theta_{int,cmd}$. The angle control unit 44 includes a low-pass filter (LPF) 51, a feedback control unit 52, a feedforward control unit 53, a disturbance torque estimation unit 54, a torque addition unit 55, a disturbance torque compensation unit 56, a first speed reduction ratio division unit 57, a speed reduction ratio multiplication unit 58, a rotational angle calculation unit 59, and a second speed reduction ratio division unit 60.

The speed reduction ratio multiplication unit 58 converts the motor torque command value $T_{m,cmd}$ calculated by the addition unit 47 (see FIG. 2) into an output shaft torque command value $N \cdot T_{m,cmd}$ that acts on the output shaft 9 (worm wheel 21) by multiplying the motor torque command value $T_{m,cmd}$ by the speed reduction ratio N of the speed reducer 19.

The rotational angle calculation unit 59 calculates a rotor rotational angle $\theta_m$ of the electric motor 18 based on an output signal from the rotational angle sensor 23. The second speed reduction ratio division unit 60 converts the rotor rotational angle $\theta_m$ calculated by the rotational angle calculation unit 59 into a rotational angle (actual steering angle) $\theta$ of the output shaft 9 by dividing the rotor rotational angle $\theta_m$ by the speed reduction ratio N.

The low-pass filter 51 performs a low-pass filtering process on the integrated angle command value $\theta_{int,cmd}$. An integrated angle command value $\theta_{intL,cmd}$ after the low-pass filtering process is provided to the feedback control unit 52 and the feedforward control unit 53.

The feedback control unit 52 is provided to bring an estimated steering angle value ^$\theta$ calculated by the disturbance torque estimation unit 54 closer to the integrated angle command value $\theta_{intL,cmd}$ after the low-pass filtering process. The feedback control unit 52 includes an angle deviation calculation unit 52A and a PD control unit 52B. The angle deviation calculation unit 52A calculates a deviation $\Delta\theta$ (=$\theta_{intL,cmd}$−$\hat{}\theta$) between the integrated angle command value $\theta_{intL,cmd}$ and the estimated steering angle value $\hat{}\theta$. The angle deviation calculation unit 52A may calculate, as the angle deviation $\Delta\theta$, a deviation ($B_{intL,cmd}$−$\theta$) between the integrated angle command value $\theta_{intL,cmd}$ and the actual steering angle $\theta$ calculated by the second speed reduction ratio division unit 60.

The PD control unit 52B calculates feedback control torque $T_{fb}$ by performing PD calculation (proportional-derivative calculation) for the angle deviation $\Delta\theta$ calculated by the angle deviation calculation unit 52A. The feedback control torque $T_{fb}$ is provided to the torque addition unit 55.

The feedforward control unit 53 is provided to improve control response by compensating for a delay in response due to the inertia of the electric power steering system 1. The feedforward control unit 53 includes an angular acceleration calculation unit 53A and an inertia multiplication unit 53B. The angular acceleration calculation unit 53A calculates a target angular acceleration $d^2\theta_{intL,cmd}/dt^2$ by obtaining the second derivative of the integrated angle command value $\theta_{intL,cmd}$.

The inertia multiplication unit 53B calculates feedforward control torque $T_{ff}$ (=$J\cdot d^2\theta_{intL,cmd}/dt^2$) by multiplying the target angular acceleration $d^2\theta_{intL,cmd}/dt^2$ calculated by the angular acceleration calculation unit 53A by an inertia J of the electric power steering system 1. The inertia J is obtained from, for example, a physical model (see FIG. 8) of the electric power steering system 1 described later. The feedforward control torque $T_{ff}$ is provided to the torque addition unit 55 as an inertia compensation value.

The torque addition unit 55 calculates a basic torque command value ($T_{fb}$+$T_{ff}$) by adding the feedforward control torque $T_{ff}$ to the feedback control torque $T_{fb}$.

The disturbance torque estimation unit 54 is provided to estimate non-linear torque (disturbance torque:torque other than the motor torque) that is generated as disturbance in a plant (object to be controlled by the electric motor 18). The disturbance torque estimation unit 54 estimates the disturbance torque (disturbance load) $T_{lc}$, the steering angle $\theta$, and a steering angle differential value (angular velocity) $d\theta/dt$ based on the output shaft torque command value $N\cdot T_{m,cmd}$ and the actual steering angle $\theta$. The estimated values of the disturbance torque $T_{lc}$, the steering angle $\theta$, and the steering angle differential value (angular velocity) $d\theta/dt$ are represented by $\hat{}T_{lc}$, $\hat{}\theta$, and $d\hat{}\theta/dt$, respectively. The disturbance torque estimation unit 54 will be described in detail later.

The estimated disturbance torque value $\hat{}T_{lc}$ calculated by the disturbance torque estimation unit 54 is provided to the disturbance torque compensation unit 56 as a disturbance torque compensation value. The estimated steering angle value $\hat{}\theta$ calculated by the disturbance torque estimation unit 54 is provided to the angle deviation calculation unit 52A.

The disturbance torque compensation unit 56 calculates an integrated steering torque command value $T_{sint,cmd}$ (=$T_{fb}$+$T_{ff}$−$\hat{}T_{lc}$) by subtracting the estimated disturbance torque value $\hat{}T_{lc}$ from the basic torque command value ($T_{fb}$+$T_{ff}$). The integrated steering torque command value $T_{sint,cmd}$ (torque command value for the output shaft 9) with the disturbance torque compensated for is thus obtained.

The integrated steering torque command value $T_{sint,cmd}$ is provided to the first speed reduction ratio division unit 57. The first speed reduction ratio division unit 57 calculates the integrated motor torque command value $T_{mint,cmd}$ by dividing the integrated steering torque command value $T_{sint,cmd}$ by the speed reduction ratio N. The integrated motor torque command value $T_{mint,cmd}$ is provided to the second weight multiplication unit 46 (see FIG. 2).

The disturbance torque estimation unit 54 will be described in detail. The disturbance torque estimation unit 54 is a disturbance observer that estimates the disturbance torque $T_{lc}$, the steering angle $\theta$, and the angular velocity $d\theta/dt$ using, for example, a physical model 101 of the electric power steering system 1 shown in FIG. 8.

The physical model 101 includes a plant (example of an object to be driven by the motor) 102 that includes the output shaft 9 and the worm wheel 21 fixed to the output shaft 9. The torsion bar torque $T_{tb}$ is applied from the steering wheel 2 to the plant 102 via the torsion bar 10, and the road load torque $T_{rl}$ is applied from the steered wheel 3 side to the plant 102.

Moreover, the output shaft torque command value $N\cdot T_{m,cmd}$ is applied to the plant 102 via the worm gear 20, and the friction torque $T_f$ is applied to the plant 102 due to the friction between the worm wheel 21 and the worm gear 20.

An equation of motion for the inertia of the physical model 101 is given by expression (3) below, where J is the inertia of the plant 102.

[Math. 1]

$$J\ddot{\theta} = N \cdot T_{m,cmd} + T_{lc} \tag{3}$$
$$T_{lc} = T_{tb} + T_{rl} + T_f$$

$d^2\theta/dt^2$ is the angular acceleration of the plant 102. N is the speed reduction ratio of the speed reducer 19. $T_{lc}$ represents the disturbance torque other than the motor torque that is applied to the plant 102. While the disturbance torque $T_{lc}$ is shown as the sum of the torsion bar torque $T_{tb}$, the road load torque $T_{rl}$, and the friction torque $T_f$ in the present embodiment, the disturbance torque $T_{lc}$ actually includes torque other than these.

Figure 8:
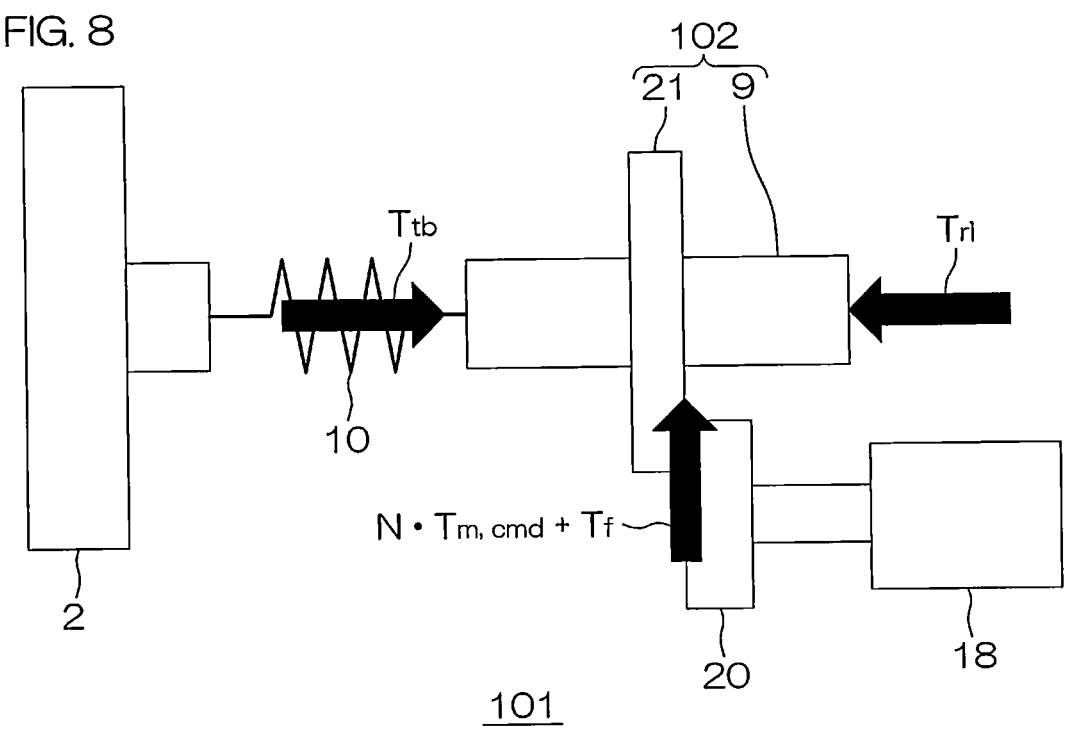
FIG. 8 is a schematic diagram showing an example of the configuration of a physical model of the electric power steering system.

An equation of state for the physical model 101 in FIG. 8 is given by expression (4) below.

[Math. 2]

$$\begin{cases} \dot{x} = Ax + B_1 u_1 + B_2 u_2 \\ y = Cx + Du_1 \end{cases} \tag{4}$$

In expression (4) above, x is a state variable vector, $u_1$ is a known input vector, $u_2$ is an unknown input vector, and y is an output vector (measured value). In expression (4) above, A is a system matrix, $B_1$ is a first input matrix, $B_2$ is a second input matrix, C is an output matrix, and D is a direct feedthrough matrix.

The above equation of state is extended to a system including the unknown input vector $u_2$ as one of the states. An equation of state of the extended system (extended equation of state) is given by expression (5) below.

[Math. 3]

$$\begin{cases} \dot{x}_e = A_e x_e + B_1 u_1 \\ y = C_e x_e \end{cases} \tag{5}$$

In expression (5) above, $x_e$ is a state variable vector of the extended system, and is given by expression (6) below.

[Math. 4]

$$x_e = \begin{bmatrix} x \\ u_2 \end{bmatrix} \qquad (6)$$

In expression (5) above, $A_e$ is a system matrix of the extended system, $B_e$ is a known input matrix of the extended system, and $C_e$ is an output matrix of the extended system.

A disturbance observer (extended state observer) given by the equation of expression (7) below is constructed from the extended equation of state given by expression (5) above.

[Math. 5]

$$\begin{cases} \dot{\hat{x}}_e = A_e \hat{x}_e + B_e u_1 + L(y - \hat{y}) \\ \hat{y} = C_e \hat{x}_e \end{cases} \qquad (7)$$

In expression (7), $\hat{x}_e$ represents an estimated value of $x_e$. L is an observer gain. $\hat{y}$ represents an estimated value of y. $\hat{x}_e$ is given by expression (8) below.

[Math. 6]

$$\hat{x}_e = \begin{bmatrix} \hat{\theta} \\ \dot{\hat{\theta}} \\ \hat{T}_{lc} \end{bmatrix} \qquad (8)$$

In expression (8), $\hat{\theta}$ is an estimated value of 0, and $\hat{T}_{lc}$ is an estimated value of $T_{lc}$.

The disturbance torque estimation unit 54 calculates the state variable vector $\hat{x}_e$ based on the equation of expression (7) above.

Figure 9:
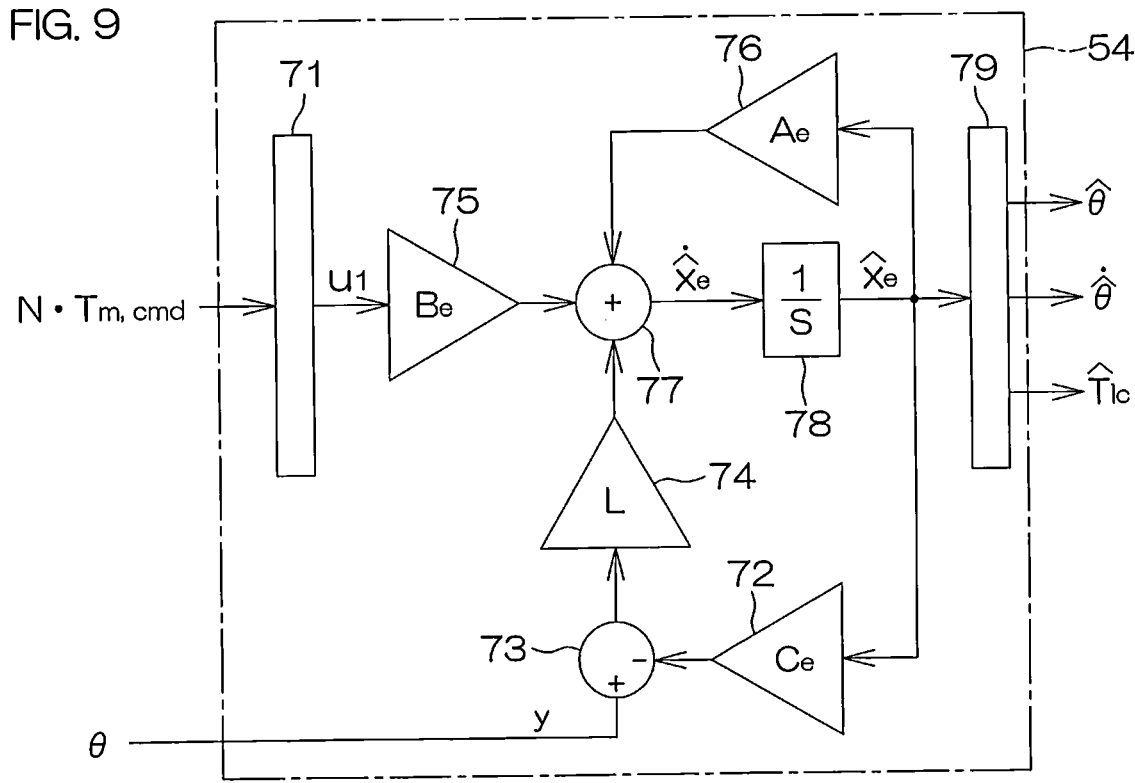
FIG. 9 is a block diagram showing the configuration of a disturbance torque estimation unit.

FIG. 9 is a block diagram showing the configuration of the disturbance torque estimation unit 54.

The disturbance torque estimation unit 54 includes an input vector input unit 71, an output matrix multiplication unit 72, a first addition unit 73, a gain multiplication unit 74, an input matrix multiplication unit 75, a system matrix multiplication unit 76, a second addition unit 77, an integration unit 78, and a state variable vector output unit 79.

The output shaft torque command value $N \cdot T_{m,cmd}$ calculated by the speed reduction ratio multiplication unit 58 (see FIG. 7) is provided to the input vector input unit 71. The input vector input unit 71 outputs the input vector $u_1$.

The output of the integration unit 78 is the state variable vector $\hat{x}_e$ (see expression (8) above). At the start of the calculation, an initial value is given as the state variable vector $\hat{x}_e$. The initial value of the state variable vector $\hat{x}_e$ is, for example, 0.

The system matrix multiplication unit 76 multiplies the state variable vector $\hat{x}_e$ by the system matrix $A_e$. The output matrix multiplication unit 72 multiplies the state variable vector $\hat{x}_e$ by the output matrix $C_e$.

The first addition unit 73 subtracts the output $(C_e \hat{x}_e)$ of the output matrix multiplication unit 72 from the output vector (measured value) y that is the actual steering angle θ calculated by the second speed reduction ratio division unit 60 (see FIG. 7). That is, the first addition unit 73 calculates the difference $(y - \hat{y})$ between the output vector y and the estimated output vector value $\hat{y}$ $(=C_e \cdot \hat{x}_e)$. The gain multiplication unit 74 multiplies the output $(y - \hat{y})$ of the first addition unit 73 by the observer gain L (see expression (7) above).

The input matrix multiplication unit 75 multiplies the input vector $u_1$ output from the input vector input unit 71 by the input matrix $B_e$. The second addition unit 77 calculates a differential value $d\hat{x}_e/dt$ of the state variable vector by adding the output $(B_e \cdot u_1)$ of the input matrix multiplication unit 75, the output $(A_e \hat{x}_e)$ of the system matrix multiplication unit 76, and the output $(L(y - \hat{y}))$ of the gain multiplication unit 74. The integration unit 78 calculates the state variable vector $\hat{x}_e$ by integrating the output $(d\hat{x}_e/dt)$ of the second addition unit 77. The state variable vector output unit 79 calculates the estimated disturbance torque value $\hat{T}_{lc}$, the estimated steering angle value $\hat{\theta}$, and the estimated angular velocity value $d\hat{\theta}/dt$ based on the state variable vector $\hat{x}_e$.

Unlike the extended state observer described above, a typical disturbance observer is composed of an inverse model of the plant and a low-pass filter. An equation of motion of the plant is given by expression (3) as described above. Thus, the inverse model of the plant is given by expression (9) below.

[Math. 7]

$$T_{lc} = J\ddot{\theta} - N \cdot T_{m,cmd} \qquad (9)$$

The inputs to the typical disturbance observer are $J \cdot d^2\theta/dt^2$ and $N \cdot T_{m,cmd}$. Since the second derivative of the actual steering angle θ is used, noise of the rotational angle sensor 23 has a great influence. On the other hand, the extended state observer according to the embodiment described above estimates the disturbance torque using an integral type. Therefore, the influence of noise due to differentiation can be reduced.

The typical disturbance observer composed of the inverse model of the plant and the low-pass filter may be used as the disturbance torque estimation unit 54.

Figure 10:
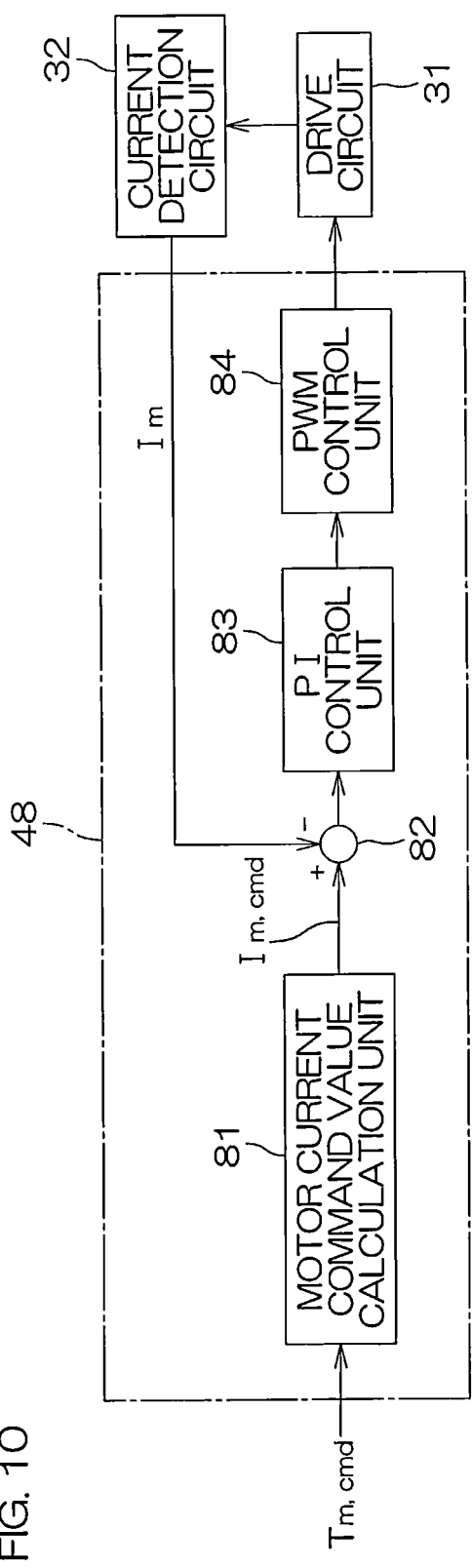
FIG. 10 is a schematic diagram showing the configuration of a torque control unit.

FIG. 10 is a schematic diagram showing the configuration of the torque control unit 48.

The torque control unit 48 (see FIG. 2) includes a motor current command value calculation unit 81, a current deviation calculation unit 82, a PI control unit 83, and a PWM (Pulse Width Modulation) control unit 84.

The motor current command value calculation unit 81 calculates a motor current command value $I_{m,cmd}$ by dividing the motor torque command value $T_{m,cmd}$ calculated by the addition unit 47 (see FIG. 2) by a torque constant $K_t$ of the electric motor 18.

The current deviation calculation unit 82 calculates a deviation $\Delta I$ $(=I_{m,cmd}-I_m)$ between the motor current command value $I_{m,cmd}$ obtained by the motor current command value calculation unit 81 and the motor current $I_m$ detected by the current detection circuit 32.

The PI control unit 83 generates a drive command value for controlling the motor current $I_m$ flowing through the electric motor 18 to the motor current command value $I_{m,cmd}$ by performing PI calculation (proportional-integral calculation) for the current deviation $\Delta I$ calculated by the current deviation calculation unit 82. The PWM control unit 84 generates a PWM control signal with a duty ratio corresponding to the drive command value, and supplies the PWM control signal to the drive circuit 31. Electric power corresponding to the drive command value is thus supplied to the electric motor 18.

Figure 11:
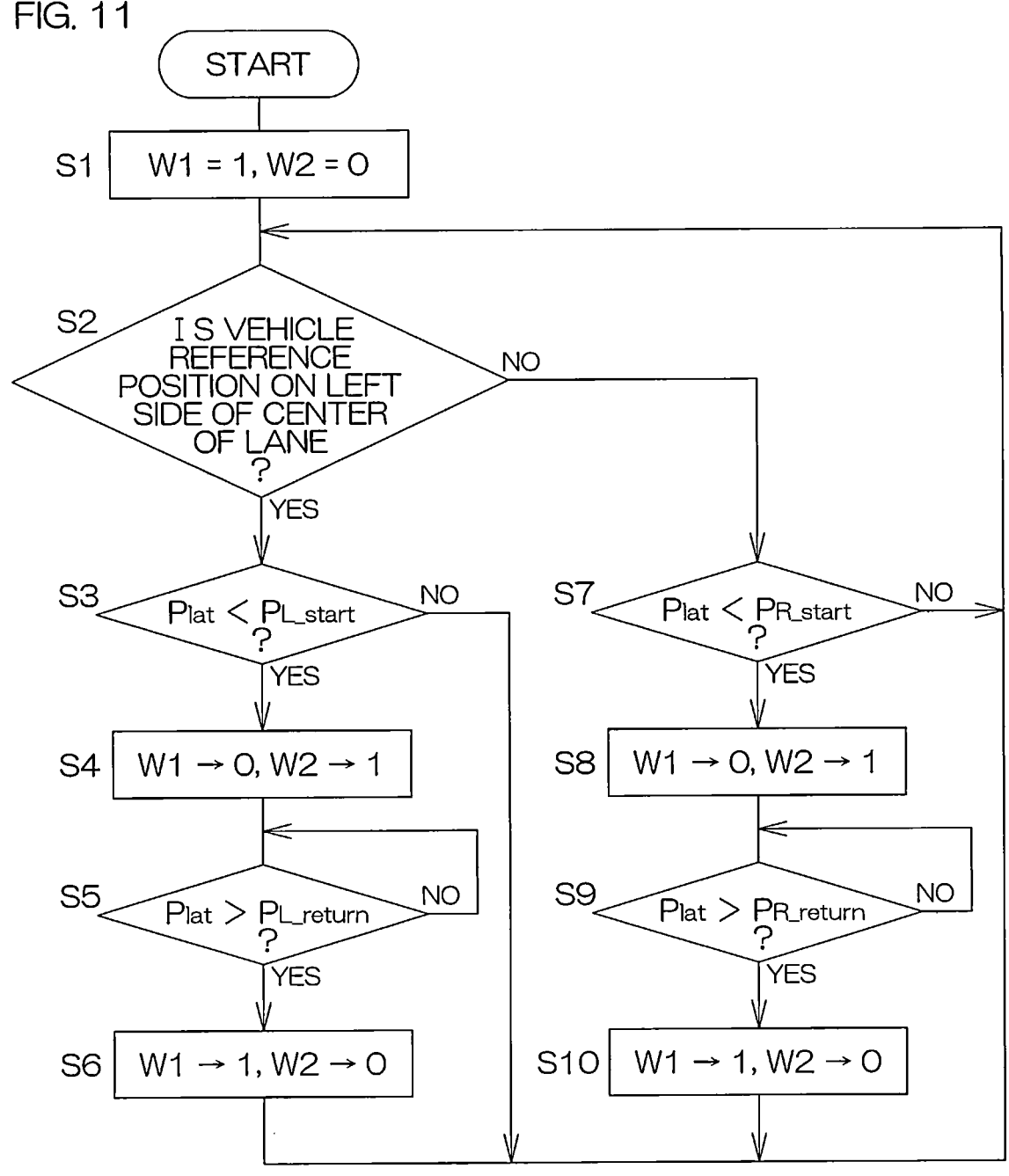
FIG. 11 is a flowchart showing the procedure of a weight setting process performed by a weight setting unit in a driving assist mode.

FIG. 11 is a flowchart showing the procedure of a weight setting process performed by the weight setting unit 49 in the driving assist mode.

When the driving mode is the driving assist mode, the weight setting unit 49 sets the first weight W1 to 1, and sets the second weight W2 to 0 (step S1). The control mode of the electric motor 18 thus becomes a first control mode in which the drive of the electric motor 18 is controlled only by the assist torque command value $T_{asst}$.

When the driving mode is the driving assist mode, the automatic steering command value $\theta_{AD,cmd}$ is set by the higher-level ECU 201, and the automatic steering command value $\theta_{AD,cmd}$, the mode signal $S_{mode}$, the right/left discrimination signal $S_{LR}$, and the vehicle lateral position $P_{lat}$ are provided to the motor control ECU 202.

Next, the weight setting unit 49 determines whether the vehicle reference position is on the left side of the center of the lane based on the right/left discrimination signal $S_{LR}$ (step S2).

When the vehicle reference position is on the left side of the center of the lane (step S2: YES), the weight setting unit 49 determines whether the vehicle lateral position $P_{lat}$ is smaller than $P_{L\_start}$ (see FIGS. 5 and 6) (step S3).

When $P_{lat} \geq P_{L\_start}$ (step S3: NO), the weight setting unit 49 returns to step S2.

When determination is made in step S3 that $P_{lat} < P_{L\_start}$ (step S3: YES), the weight setting unit 49 sets the first weight W1 to 0, and sets the second weight W2 to 1 (step S4). At this time, it is preferable that the weight setting unit 49 gradually reduce the first weight W1 from 1 to 0 and gradually increase the second weight W2 from 0 to 1. The time for gradually reducing the first weight W1 from 1 to 0 (time for gradually increasing the second weight W2 from 0 to 1) may be, for example, about 0.1 seconds.

The control mode of the electric motor 18 thus becomes a second control mode in which the drive of the electric motor 18 is controlled by the integrated motor torque command value $T_{mint,cmd}$. While the first weight W1 is being gradually reduced (while the second weight W2 is being gradually increased), the electric motor 18 is controlled based on the sum of the assist torque command value W1·$T_{asst}$ after the first weight multiplication and the integrated motor torque command value W2·$T_{mint,cmd}$ after the second weight multiplication.

In the second control mode, the electric motor 18 is controlled based on the integrated angle command value $\theta_{int,cmd}$ that is the sum of the manual steering command value $\theta_{MD,cmd}$ and the automatic steering command value $\theta_{AD,cmd}$. A steering reaction force based on the virtual road load torque $T_{rl}$ used to calculate the manual steering command value $\theta_{MD,cmd}$ is thus reflected.

Next, the weight setting unit 49 determines whether the vehicle lateral position $P_{lat}$ is smaller than a predetermined value $P_{L\_return}$ (see FIG. 12) greater than $P_{L\_start}$ (step S5). For example, $P_{L\_return}$ is set to 80 cm. $P_{L\_return}$ is a threshold value used to return the control mode to the first control mode when the vehicle reference position is on the left side with respect to the center of the lane and the control mode is the second control mode.

When $P_{lat} \leq P_{L\_return}$ (step S5: NO), the weight setting unit 49 returns to step S5.

When determination is made in step S5 that $P_{lat} > P_{L\_return}$ (step S5: YES), the weight setting unit 49 sets the first weight W1 to 1, and sets the second weight W2 to 0 (step S6). At this time, it is preferable that the weight setting unit 49 gradually increase the first weight W1 from 0 to 1 and gradually reduce the second weight W2 from 1 to 0. The time for gradually increasing the first weight W1 from 0 to 1 (time for gradually reducing the second weight W2 from 1 to 0) may be, for example, about 0.1 seconds.

The control mode of the electric motor 18 thus becomes the first control mode. While the first weight W1 is being gradually increased (while the second weight W2 is being gradually reduced), the electric motor 18 is controlled based on the sum of the assist torque command value W1·$T_{asst}$ after the first weight multiplication and the integrated motor torque command value W2·$T_{mint,cmd}$ after the second weight multiplication.

In the first control mode, the steering reaction force based on the virtual road load torque $T_{rl}$ used to calculate the manual steering command value $\theta_{MD,cmd}$ is not reflected.

After the process of step S6 is performed, the weight setting unit 49 returns to step S2.

When determination is made in step S2 that the vehicle reference position is on the right side of the center of the lane (step S2: NO), the weight setting unit 49 determines whether the vehicle lateral position $P_{lat}$ is smaller than $P_{R\_start}$ (see FIGS. 5 and 6) (step S7).

When $P_{lat} \geq P_{R\_start}$ (step S7: NO), the weight setting unit 49 returns to step S2.

When determination is made in step S7 that $P_{lat} < P_{R\_start}$ (step S7: YES), the weight setting unit 49 sets the first weight W1 to 0, and sets the second weight W2 to 1 (step S8). At this time, it is preferable that the weight setting unit 49 gradually reduce the first weight W1 from 1 to 0 and gradually increase the second weight W2 from 0 to 1.

The control mode of the electric motor 18 thus becomes the second control mode. In the second control mode, the steering reaction force based on the virtual road load torque $T_{rl}$ is reflected.

Next, the weight setting unit 49 determines whether the vehicle lateral position $P_{lat}$ is smaller than a predetermined value $P_{R\_return}$ (see FIG. 12) greater than $P_{R\_start}$ (step S9). For example, $P_{R\_return}$ is set to 90 cm. $P_{R\_return}$ is a threshold value used to return the control mode to the first control mode when the vehicle reference position is on the right side with respect to the center of the lane and the control mode is the second control mode.

When $P_{lat} P_{R\_return}$ (step S9: NO), the weight setting unit 49 returns to step S9.

When determination is made in step S9 that $P_{lat} > P_{R\_return}$ (step S9: YES), the weight setting unit 49 sets the first weight W1 to 1, and sets the second weight W2 to 0 (step S10). At this time, it is preferable that the weight setting unit 49 gradually increase the first weight W1 from 0 to 1 and gradually reduce the second weight W2 from 1 to 0.

The control mode of the electric motor 18 thus becomes the first control mode. In the first control mode, the steering reaction force based on the virtual road load torque $T_{rl}$ is not reflected.

After the process of step S10 is performed, the weight setting unit 49 returns to step S2.

When the driving mode is the normal mode, the weight setting unit 49 sets the first weight W1 to 1, and sets the second weight W2 to 0. Thus, in the normal mode, the drive of the electric motor 18 is controlled based only on the assist torque command value $T_{asst}$.

Figure 12:
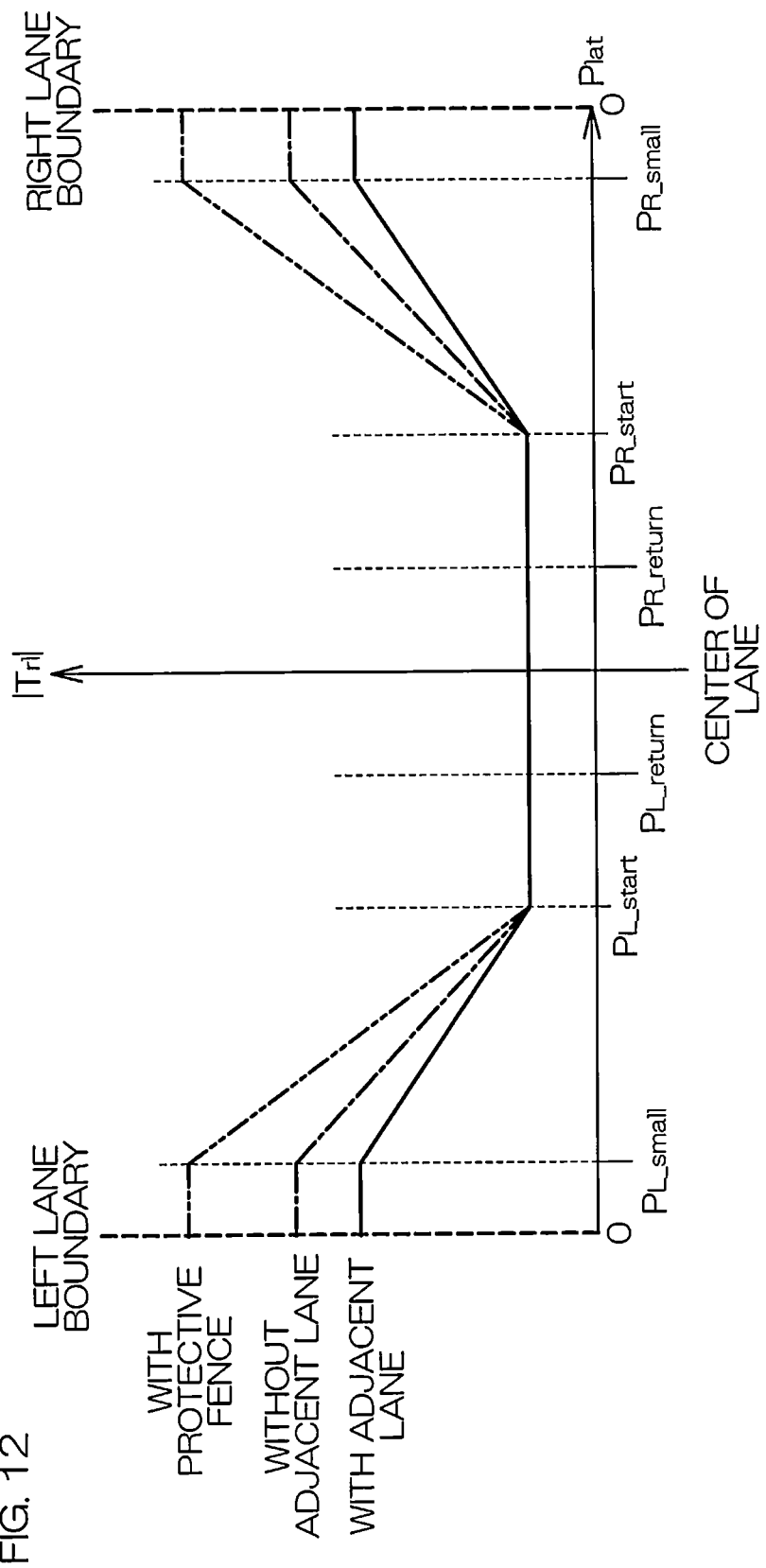
FIG. 12 is a graph showing an example of the relationship between the vehicle lateral position $P_{lat}$ and an absolute value $|T_{rl}|$ of a road load torque Tri calculated based on expression (1).

FIG. 12 is a graph showing an example of the relationship between the vehicle lateral position $P_{lat}$ and an absolute value $|T_{rl}|$ of the virtual road load torque $T_{rl}$ calculated based on expression (1). FIG. 12 shows the relationship between the vehicle lateral position $P_{lat}$ and the absolute value $|T_{rl}|$ of the virtual road load torque on the assumption that $\theta_{MD,cmd}$ and $d\theta_{MD,cmd}/dt$ in expression (1) are constant.

FIG. 12 shows an example in which the virtual load spring stiffness coefficient $k_{vl}$ and the virtual load viscous damping coefficient $c_{vl}$ are set so that the characteristic of the virtual road load torque $T_{rl}$ changes depending on whether there is a lane adjacent to the lane, there is no lane adjacent to the lane, or there is a protective fence such as a guardrail for the lane.

When the vehicle lateral position $P_{lat}$ is equal to or greater than $P_{L\_start}$ with respect to the left lane boundary or equal to or greater than $P_{R\_start}$ with respect to the right lane boundary, the virtual load spring stiffness coefficient $k_{vl}$ is $k_{vl,start}$ and the virtual load viscous damping coefficient $c_{vl}$ is $c_{vl,start}$. Therefore, the absolute value $|T_{rl}|$ of the virtual road load torque is a constant value.

When the vehicle lateral position $P_{lat}$ is equal to or greater than $P_{L\_small}$ and smaller than $P_{L\_start}$ with respect to the left lane boundary, the absolute value $|T_{rl}|$ of the virtual road load torque increases as the vehicle lateral position $P_{lat}$ decreases from $P_{L\_start}$ (as the vehicle reference position approaches the left lane boundary). In the example of FIG. 12, $|T_{rl}|$ gradually increases linearly, but $|T_{rl}|$ may gradually increase non-linearly.

When the vehicle lateral position $P_{lat}$ is smaller than $P_{L\_small}$, the absolute value $|T_{rl}|$ of the virtual road load torque is fixed to an absolute value $|T_{rl}|$ of the virtual road load torque when the vehicle lateral position $P_{lat}$ is $P_{L\_small}$.

When the vehicle lateral position $P_{lat}$ is equal to or greater than $P_{R\_small}$ and smaller than $P_{R\_start}$ with respect to the right lane boundary, the absolute value $|T_{rl}|$ of the virtual road load torque increases as the vehicle lateral position $P_{lat}$ decreases from $P_{R\_start}$ (as the vehicle reference position approaches the right lane boundary). In the example of FIG. 12, $|T_{rl}|$ gradually increases linearly, but $|T_{rl}|$ may gradually increase non-linearly.

When the vehicle lateral position $P_{lat}$ is smaller than $P_{R\_small}$, the absolute value $|T_{rl}|$ of the virtual road load torque $T_{rl}$ is fixed to an absolute value $|T_{rl}|$ of the virtual road load torque when the vehicle lateral position $P_{lat}$ is $P_{R\_small}$.

In the example of FIG. 12, the virtual load spring stiffness coefficient $k_{vl}$ and the virtual load viscous damping coefficient ci are set so that the absolute value $|T_{rl}|$ of the virtual road load torque when the vehicle lateral position $P_{lat}$ is smaller than $P_{L\_start}$ or $P_{R\_start}$ increases in the order of the case where there is an adjacent lane, the case where there is no adjacent lane, and the case where there is a protective fence.

Figure 13:
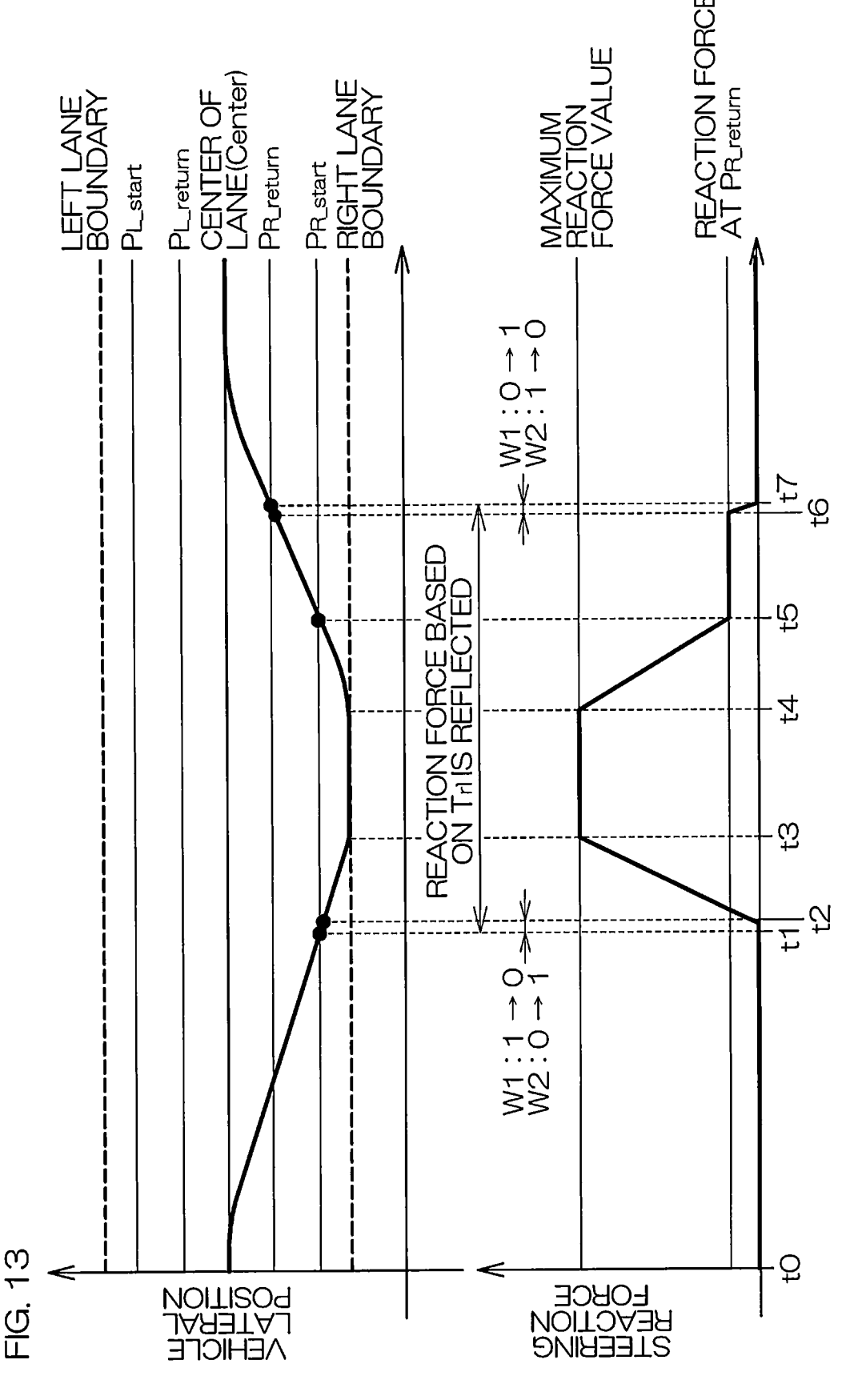
FIG. 13 is a schematic diagram illustrating a steering reaction force generated based on the road load torque $T_{rl}$ in the driving assist mode.

FIG. 13 is a schematic diagram illustrating a steering reaction force generated based on the virtual road load torque $T_{rl}$ in the driving assist mode.

At time to, the control mode is the first mode and the vehicle reference position is at the center of the lane. Since the control mode is the first control mode, W1=1 and W2=0, and the steering reaction force based on the virtual road load torque $T_{rl}$ used to calculate the manual steering command value $\theta_{MD,cmd}$ is 0.

The driver steers to the right immediately after time t0. The vehicle therefore starts to move to the right. When the vehicle lateral position $P_{lat}$ reaches $P_{R\_start}$ at time t1, W1 is gradually reduced and W2 is gradually increased. At time t2, W1=0 and W2=1. That is, the control mode becomes the second control mode.

From time t0 to time t1, the steering reaction force based on the virtual road load torque $T_{rl}$ used to calculate the manual steering command value $\theta_{MD,cmd}$ is 0. From time t1 to t2, the steering reaction force gradually increases because part of the steering reaction force based on the virtual road load torque Ti is reflected. Since the control mode becomes the second control mode from time t2, the steering reaction force based on the virtual road load torque $T_{rl}$ further increases.

When the vehicle reference position reaches the right lane boundary (time t3), the steering reaction force reaches the maximum reaction force value. When the driver feels the steering reaction force and stops steering to the right, the vehicle moves toward the center of the lane. When the vehicle reference position is shifted toward the center of the lane from the right lane boundary (time t4), the steering reaction force based on the virtual road load torque $T_{rl}$ decreases. When the vehicle lateral position $P_{lat}$ reaches $P_{R\_start}$ (time t5), the steering reaction force based on the virtual road load torque $T_{rl}$ reaches a constant value.

When the vehicle lateral position $P_{lat}$ then reaches $P_{R\_return}$ (time t6), W1 is gradually increased and W2 is gradually reduced. At time t7, W1=1 and W2=0. That is, the control mode becomes the first control mode. As can be seen from FIG. 13, in the period from time t4 to time t5, the steering reaction force characteristic is such that the rate of decrease in the steering reaction force is high (first characteristic). In the period from time t5 to time t6 described later, the steering reaction force characteristic is such that the rate of decrease in the steering reaction force is low (second characteristic). It is thus possible to stabilize the vehicle behavior when the vehicle returns to the center of the lane.

In FIG. 13, the rate of decrease in the steering reaction force in the second characteristic is 0 (i.e., the steering reaction force is constant). The rate of decrease in the steering reaction force in the second characteristic may be other than 0 as long as it is lower than the rate of decrease in the steering reaction force in the first characteristic. In the present embodiment, it is possible to securely stabilize the vehicle behavior when the vehicle returns to the center of the lane by setting the rate of decrease in the steering reaction force in the second characteristic to 0.

From time t6 to t7, the steering reaction force gradually decreases because part of the steering reaction force based on the virtual road load torque $T_{rl}$ is reflected. Since the control mode becomes the first control mode from time t7, the steering reaction force based on the virtual road load torque $T_{rl}$ is 0.

In the embodiment described above, the manual steering command value generation unit 42 can set the steering reaction force independently of the assist control and the steering angle control for driving assist.

In the embodiment described above, the driver can feel the reaction force corresponding to the lateral position of the vehicle as the steering torque, thereby improving the effect of preventing lane departure.

In the embodiment described above, the first vehicle lateral position for switching the first weight W1 from 1 to 0 (the second weight W2 from 0 to 1) is set different from the second vehicle lateral position for switching the first weight W1 from 0 to 1 (the second weight W2 from 1 to 0). Specifically, the second vehicle lateral position is set closer to the center of the lane than the first vehicle lateral position. It is thus possible to simultaneously achieve both the generation of the reaction force for the driver when the vehicle moves in the lane departure direction and the stabilization of the vehicle behavior when the vehicle returns to the center of the lane.

In other words, if the second vehicle lateral position is set to the same position as the first vehicle lateral position, the control mode is switched from the second control mode to the first control mode while a large steering reaction force is acting. The vehicle behavior may therefore become unstable.

In the embodiment described above, the driver can intuitively recognize, via the steering wheel, the danger level depending on the environment outside the current traveling lane (the presence or absence of an adjacent lane, the presence or absence of a guardrail, etc.).

Modifications of the procedure of the weight setting process performed by the weight setting unit 49 in the driving assist mode (modifications of the weight setting unit 49) will be described below.

[First Modification of Weight Setting Unit 49]

In a first modification, the first vehicle lateral position for switching the first weight W1 from 1 to 0 (the second weight W2 from 0 to 1) is set to the same position as the second vehicle lateral position for switching the first weight W1 from 0 to 1 (the second weight W2 from 1 to 0).

It is assumed that $P_{L\_return}$ is set as the first vehicle position and the second vehicle position when the vehicle is on the left side of the center of the lane and $P_{R\_return}$ is set as the first vehicle position and the second vehicle position when the vehicle is on the right side of the center of the lane.

In this case, the procedure of the weight setting process performed by the weight setting unit 49 in the driving assist mode is substantially the same as the procedure shown in FIG. 11. However, the condition that $P_{lat} < P_{L\_start}$ in step S3 of FIG. 11 is replaced with a condition that $P_{lat} < P_{L\_return}$. Further, the condition that $P_{lat} < P_{R\_start}$ in step S7 of FIG. 11 is replaced with a condition that $P_{lat} < P_{R\_return}$. The other procedure is the same as the procedure in FIG. 11.

Figure 14:
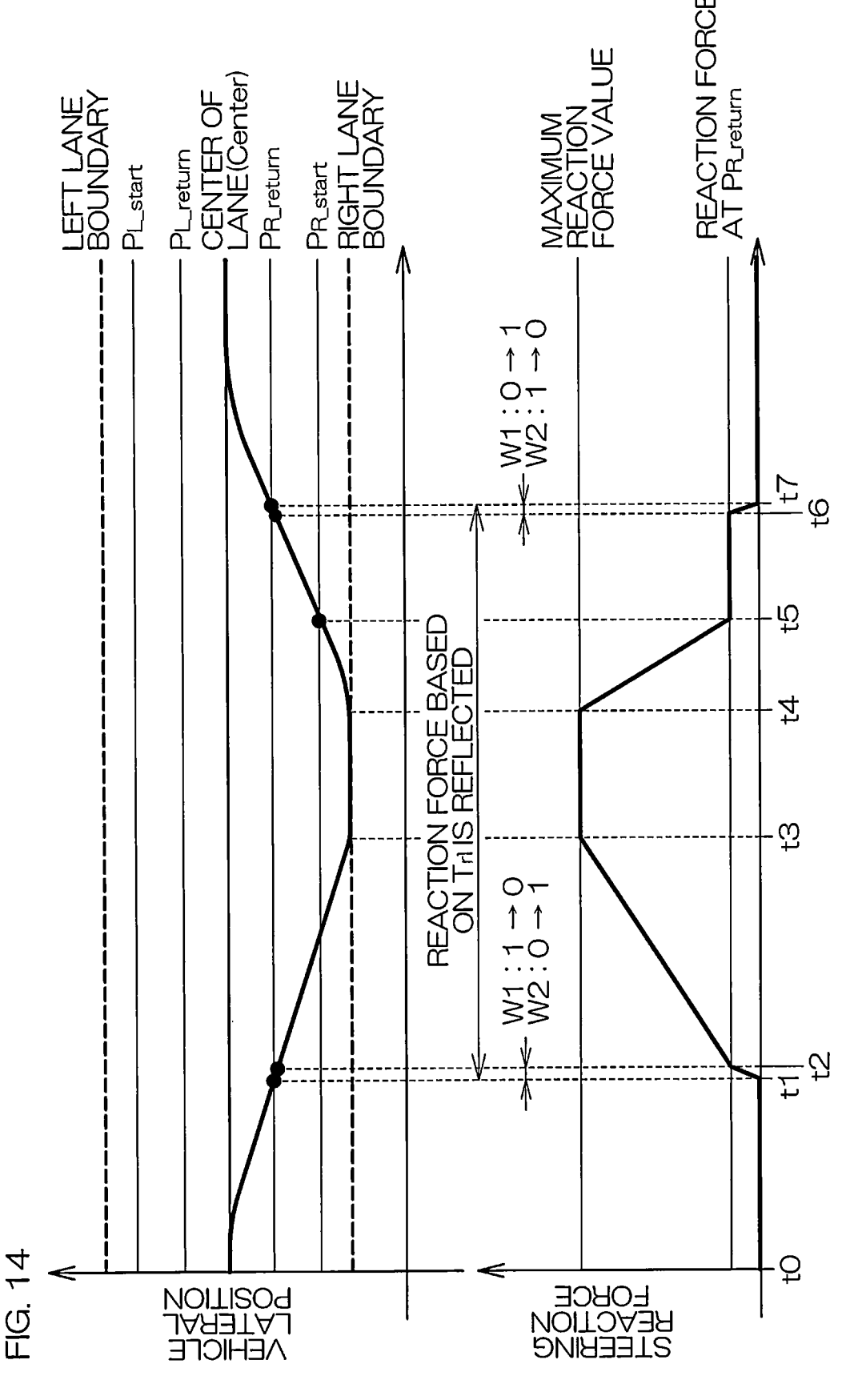
FIG. 14 is a schematic diagram illustrating a steering reaction force generated based on a virtual road load torque $T_{rl}$ in the driving assist mode when a first vehicle lateral position and a second vehicle lateral position are set to the same position.

FIG. 14 is a schematic diagram illustrating a steering reaction force generated based on the virtual road load torque $T_{rl}$ in the driving assist mode when the first vehicle lateral position and the second vehicle lateral position are set to the same position as described above.

At time t0, the control mode is the first mode and the vehicle reference position is at the center of the lane. Since the control mode is the first control mode, W1=1 and W2=0, and the steering reaction force based on the virtual road load torque $T_{rl}$ used to calculate the manual steering command value $\theta_{MD,cmd}$ is 0.

The driver steers to the right immediately after time t0. The vehicle therefore starts to move to the right. When the vehicle lateral position $P_{lat}$ crosses $P_{R\_return}$ toward the right lane boundary at time t1, W1 is gradually reduced and W2 is gradually increased. At time t2, W1=0 and W2=1. That is, the control mode becomes the second control mode.

From time t0 to time t1, the steering reaction force based on the virtual road load torque $T_{rl}$ used to calculate the manual steering command value $\theta_{MD,cmd}$ is 0. From time t1 to t2, the steering reaction force gradually increases because part of the steering reaction force based on the virtual road load torque $T_{rl}$ is reflected. Since the control mode becomes the second control mode from time t2, the steering reaction force based on the virtual road load torque $T_{rl}$ further increases.

When the vehicle reference position reaches the right lane boundary (time t3), the steering reaction force reaches the maximum reaction force value. When the driver feels the steering reaction force and stops steering to the right, the vehicle moves toward the center of the lane. When the vehicle reference position is shifted toward the center of the lane from the right lane boundary (time t4), the steering reaction force based on the virtual road load torque $T_{rl}$ decreases. When the vehicle lateral position $P_{lat}$ reaches $P_{R\_start}$ (time t5), the steering reaction force based on the virtual road load torque $T_{rl}$ reaches a constant value.

When the vehicle lateral position $P_{lat}$ then crosses $P_{R\_return}$ toward the center of the lane at time t6, W1 is gradually increased and W2 is gradually reduced. At time t7, W1=1 and W2=0. That is, the control mode becomes the first control mode. As can be seen from FIG. 14, in the period from time t4 to time t5, the steering reaction force characteristic is such that the rate of decrease in the steering reaction force is high (first characteristic). In the period from time t5 to time t6 described later, the steering reaction force characteristic is such that the rate of decrease in the steering reaction force is low (second characteristic). It is thus possible to stabilize the vehicle behavior when the vehicle returns to the center of the lane.

In FIG. 14, the rate of decrease in the steering reaction force in the second characteristic is 0 (i.e., the steering reaction force is constant). The rate of decrease in the steering reaction force in the second characteristic may be other than 0 as long as it is lower than the rate of decrease in the steering reaction force in the first characteristic. In the present embodiment, it is possible to securely stabilize the vehicle behavior when the vehicle returns to the center of the lane by setting the rate of decrease in the steering reaction force in the second characteristic to 0.

From time t6 to t7, the steering reaction force gradually decreases because part of the steering reaction force based on the virtual road load torque $T_{rl}$ is reflected. Since the control mode becomes the first control mode from time t7, the steering reaction force based on the virtual road load torque $T_{rl}$ is 0.

[Second Modification of Weight Setting Unit 49]

Figure 15:
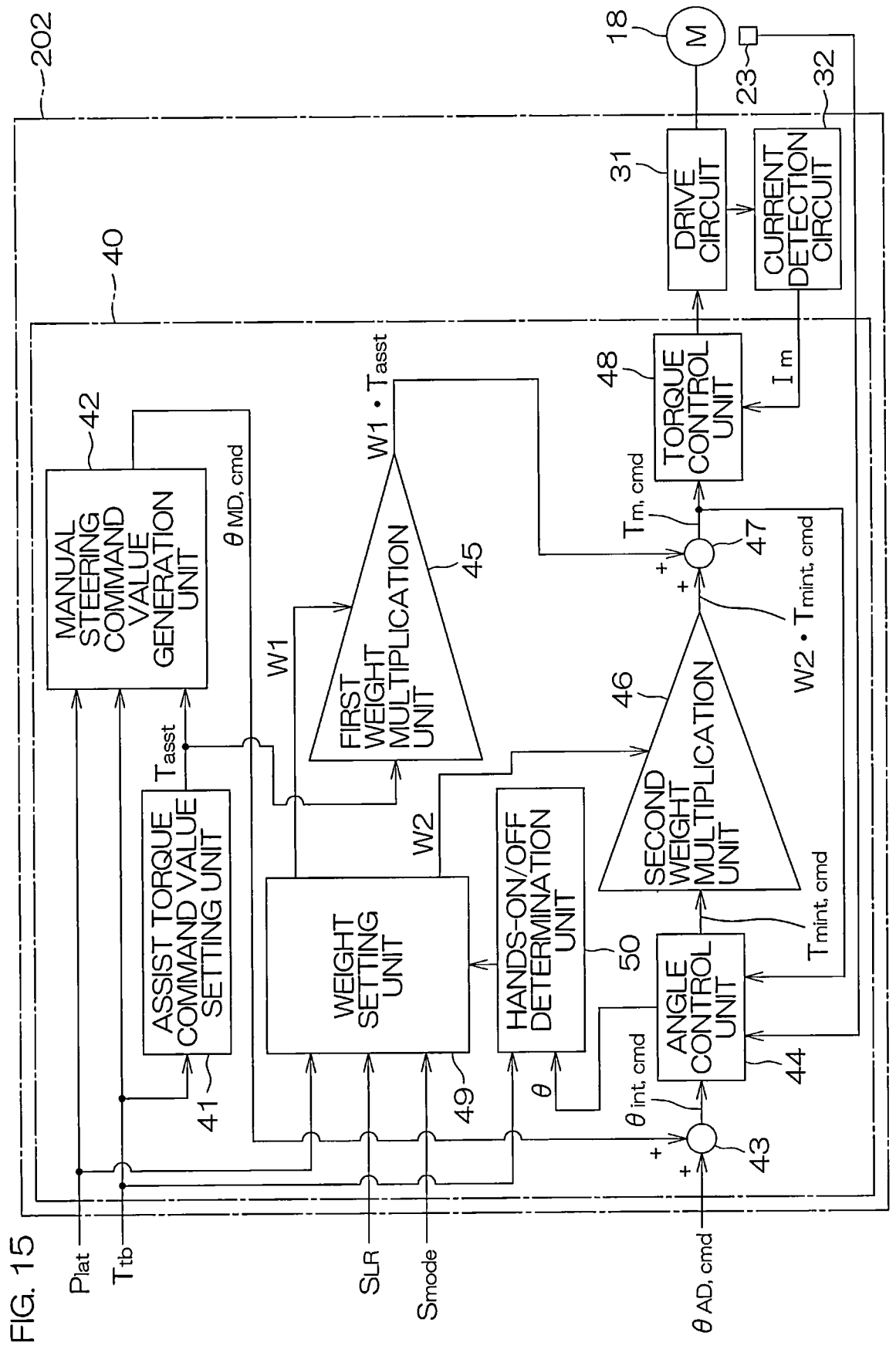
FIG. 15 is a block diagram showing an electrical configuration of a motor control ECU including a weight setting unit according to a second modification.

FIG. 15 is a block diagram showing an electrical configuration of a motor control ECU 202 including a weight setting unit 49 according to a second modification. In FIG. 15, portions corresponding to those in FIG. 2 described above are denoted by the same signs as those in FIG. 2.

The motor control ECU 202 in FIG. 15 is provided with a hands-on/off determination unit 50. The hands-on/off determination unit 50 determines whether the driver is in a gripping state (hands-on) in which the driver is gripping the steering wheel 2 or in a released state (hands-off) in which the driver is not gripping the steering wheel 2. The determination result from the hands-on/off determination unit 50 is provided to the weight setting unit 49.

For example, the hands-on/off determination unit 50 may estimate driver torque that is torque applied to the steering wheel 2 by the driver based on the torsion bar torque $T_{tb}$ and the actual steering angle $\theta$ or the rotor rotational angle $\theta_m$, determine that the driver is in the gripping state when the driver torque is equal to or greater than a predetermined threshold value, and determine that the driver is in the released state when the driver torque continues to be smaller than the threshold value for a predetermined time or longer. In this case, determination is made that the driver is in the gripping state until determination is made that the driver is in the released state after the driver torque has changed from a value equal to or greater than the threshold value to a value smaller than the threshold value. Examples of such a hands-on/off determination unit 50 may include "steering wheel operation state determination units" described in Japanese Unexamined Patent Application Publication Nos. 2017-114324 (JP 2017-114324 A), 2018-165156 (JP 2018-165156 A), 2020-142703 (JP 2020-142703 A), 2020-59361 (JP 2020-59361 A), and 2020-59362 (JP 2020-59362 A).

For example, the hands-on/off determination unit 50 may determine that the driver is in the gripping state when the torsion bar torque $T_{tb}$ is equal to or greater than a predetermined threshold value, and determine that the driver is in the released state when the torsion bar torque $T_{tb}$ continues to be smaller than the threshold value for a predetermined time or longer. In this case, determination is made that the driver is in the gripping state until determination is made that the driver is in the released state after the torsion bar torque $T_{tb}$ has changed from a value equal to or greater than the threshold value to a value smaller than the threshold value.

Figure 16:
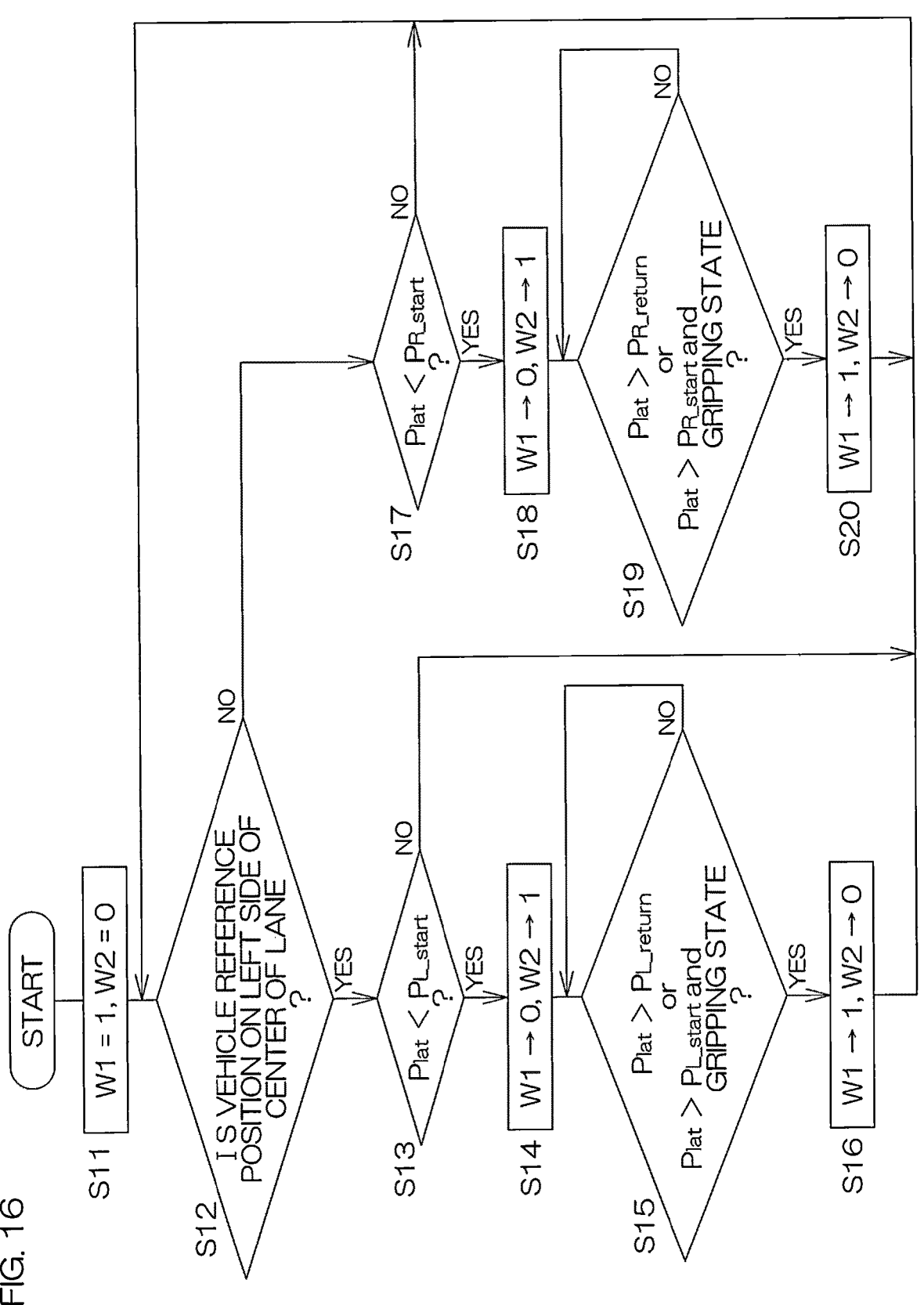
FIG. 16 is a flowchart showing the procedure of a weight setting process performed by the weight setting unit according to the second modification in the driving assist mode.

FIG. 16 is a flowchart showing the procedure of a weight setting process performed by the weight setting unit 49 according to the second modification in the driving assist mode.

When the driving mode is the driving assist mode, the weight setting unit 49 sets the first weight W1 to 1, and sets the second weight W2 to 0 (step S11). The control mode of the electric motor 18 thus becomes the first control mode in which the drive of the electric motor 18 is controlled only by the assist torque command value $T_{asst}$.

When the driving mode is the driving assist mode, the automatic steering command value $\theta_{AD,cmd}$ is set by the higher-level ECU 201, and the automatic steering command value $\theta_{AD,cmd}$, the mode signal $S_{mode}$, the right/left discrimination signal $S_{LR}$, and the vehicle lateral position $P_{lat}$ are provided to the motor control ECU 202.

Next, the weight setting unit 49 determines whether the vehicle reference position is on the left side of the center of the lane based on the right/left discrimination signal $S_{LR}$ (step S12).

When the vehicle reference position is on the left side of the center of the lane (step S12: YES), the weight setting unit 49 determines whether the vehicle lateral position $P_{lat}$ is smaller than $P_{L\_start}$ (see FIGS. 5 and 6) (step S13).

When $P_{lat} \geq P_{L\_start}$ (step S13: NO), the weight setting unit 49 returns to step S12.

When determination is made in step S13 that $P_{lat} < P_{L\_start}$ (step S13: YES), the weight setting unit 49 sets the first weight W1 to 0, and sets the second weight W2 to 1 (step S14). At this time, it is preferable that the weight setting unit 49 gradually reduce the first weight W1 from 1 to 0 and gradually increase the second weight W2 from 0 to 1. The time for gradually reducing the first weight W1 from 1 to 0 (time for gradually increasing the second weight W2 from 0 to 1) may be, for example, about 0.1 seconds.

The control mode of the electric motor 18 thus becomes the second control mode in which the drive of the electric motor 18 is controlled by the integrated motor torque command value $T_{mint,cmd}$. While the first weight W1 is being gradually reduced (while the second weight W2 is being gradually increased), the electric motor 18 is controlled based on the sum of the assist torque command value $W1 \cdot T_{asst}$ after the first weight multiplication and the integrated motor torque command value $W2 \cdot T_{mint,cmd}$ after the second weight multiplication.

In the second control mode, the electric motor 18 is controlled based on the integrated angle command value $\theta_{int,cmd}$ that is the sum of the manual steering command value $\theta_{MD,cmd}$ and the automatic steering command value $\theta_{AD,cmd}$. The steering reaction force based on the virtual road load torque $T_{rl}$ used to calculate the manual steering command value $\theta_{MD,cmd}$ is thus reflected.

Next, the weight setting unit 49 determines whether either a first condition that the vehicle lateral position $P_{lat}$ is greater than the predetermined value $P_{L\_return}$ (see FIG. 12) greater than $P_{L\_start}$ or a second condition that the vehicle lateral position $P_{lat}$ is greater than $P_{L\_start}$ and the determination result from the hands-on/off determination unit 50 indicates the gripping state is satisfied (step S15). For example, $P_{L\_return}$ is set to 80 cm.

When neither the first condition nor the second condition is satisfied (step S15: NO), the weight setting unit 49 returns to step S15.

When determination is made in step S15 that either the first condition or the second condition is satisfied (step S15: YES), the weight setting unit 49 sets the first weight W1 to 1, and sets the second weight W2 to 0 (step S16). At this time, it is preferable that the weight setting unit 49 gradually increase the first weight W1 from 0 to 1 and gradually reduce the second weight W2 from 1 to 0. The time for gradually increasing the first weight W1 from 0 to 1 (time for gradually reducing the second weight W2 from 1 to 0) may be, for example, about 0.1 seconds.

The control mode of the electric motor 18 thus becomes the first control mode. While the first weight W1 is being gradually increased (while the second weight W2 is being gradually reduced), the electric motor 18 is controlled based on the sum of the assist torque command value $W1 \cdot T_{asst}$ after the first weight multiplication and the integrated motor torque command value $W2 \cdot T_{mint,cmd}$ after the second weight multiplication.

In the first control mode, the steering reaction force based on the virtual road load torque $T_{rl}$ used to calculate the manual steering command value $\theta_{MD,cmd}$ is not reflected.

After the process of step S16 is performed, the weight setting unit 49 returns to step S12.

When determination is made in step S12 that the vehicle reference position is on the right side of the center of the lane (step S12: NO), the weight setting unit 49 determines whether the vehicle lateral position $P_{lat}$ is smaller than $P_{R\_start}$ (see FIGS. 5 and 6) (step S17).

When $P_{lat} \geq P_{R\_start}$ (step S17: NO), the weight setting unit 49 returns to step S12.

When determination is made in step S17 that $P_{lat} < P_{R\_start}$ (step S17: YES), the weight setting unit 49 sets the first weight W1 to 0, and sets the second weight W2 to 1 (step S18). At this time, it is preferable that the weight setting unit 49 gradually reduce the first weight W1 from 1 to 0 and gradually increase the second weight W2 from 0 to 1.

The control mode of the electric motor 18 thus becomes the second control mode. In the second control mode, the steering reaction force based on the virtual road load torque $T_{rl}$ is reflected.

Next, the weight setting unit 49 determines whether either a third condition that the vehicle lateral position $P_{lat}$ is greater than the predetermined value $P_{R\_return}$ (see FIG. 12) greater than $P_{R\_start}$ or a fourth condition that the vehicle lateral position $P_{lat}$ is greater than $P_{R\_start}$ and the determination result from the hands-on/off determination unit 50 indicates the gripping state is satisfied (step S19). For example, $P_{R\_return}$ is set to 90 cm.

When neither the third condition nor the fourth condition is satisfied (step S19: NO), the weight setting unit 49 returns to step S19.

When determination is made in step S19 that either the third condition or the fourth condition is satisfied (step S19: YES), the weight setting unit 49 sets the first weight W1 to 1, and sets the second weight W2 to 0 (step S20). At this time, it is preferable that the weight setting unit 49 gradually increase the first weight W1 from 0 to 1 and gradually reduce the second weight W2 from 1 to 0.

The control mode of the electric motor 18 thus becomes the first control mode. In the first control mode, the steering reaction force based on the virtual road load torque $T_{rl}$ is not reflected.

After the process of step S20 is performed, the weight setting unit 49 returns to step S12.

Figure 17:
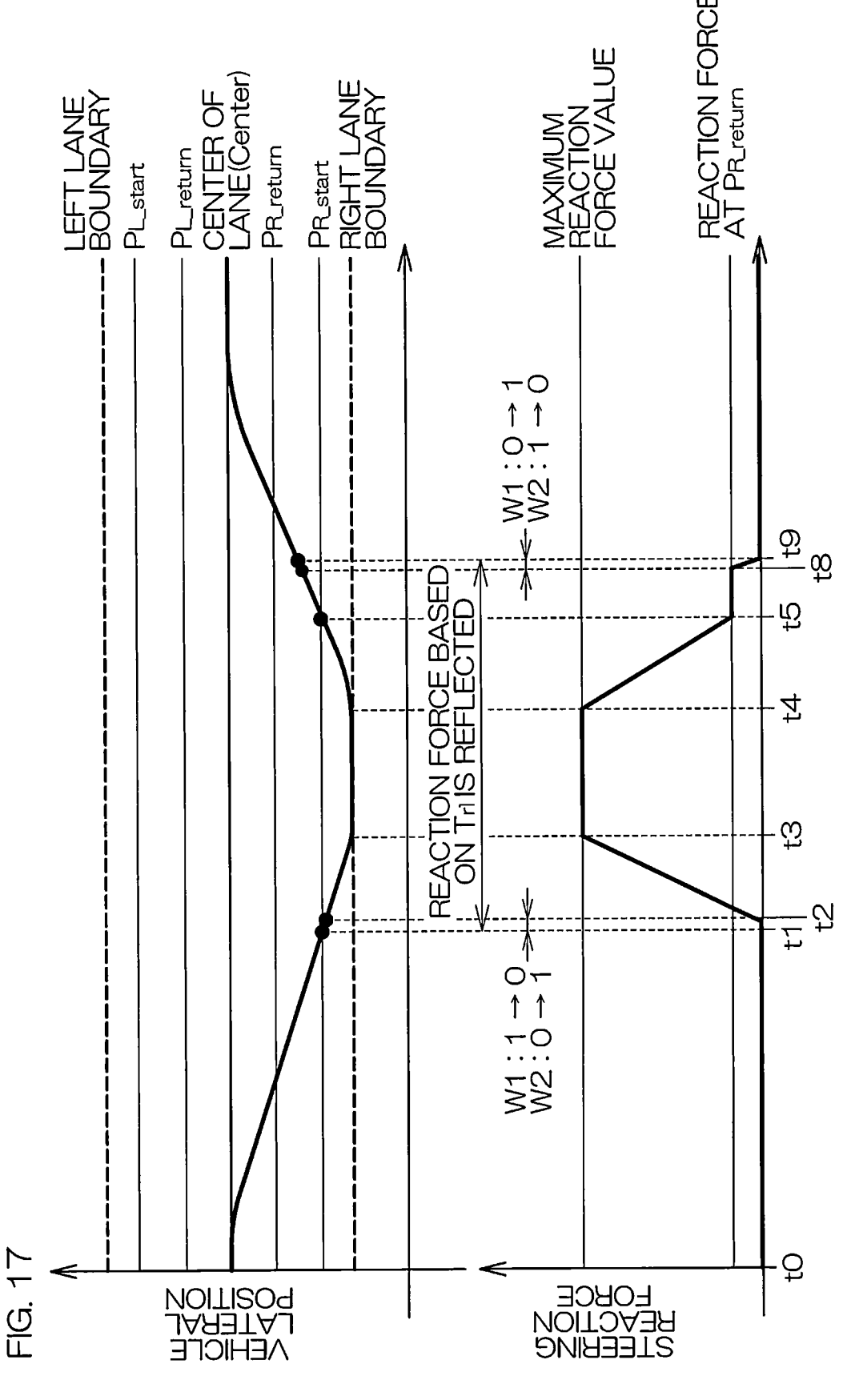
FIG. 17 is a schematic diagram illustrating a steering reaction force generated based on the virtual road load torque $T_{rl}$ when the weight setting process is performed by the procedure of FIG. 16.

FIG. 17 is a schematic diagram illustrating a steering reaction force generated based on the virtual road load torque $T_{rl}$ when the weight setting process is performed by the procedure of FIG. 16.

The operation from time t0 to time t5 in FIG. 17 is the same as that in FIG. 13. At time t4, the vehicle starts to move from the right lane boundary toward the center of the lane. When the vehicle lateral position $P_{lat}$ reaches $P_{R\_start}$ (time t5), the steering reaction force based on the virtual road load torque $T_{rl}$ reaches a constant value.

When the hands-on/off result indicates the gripping state (time t8) before the vehicle lateral position $P_{lat}$ crosses $P_{R\_return}$ toward the center of the lane, the fourth condition in step S19 of FIG. 16 is satisfied. Therefore, W1 is gradually increased and W2 is gradually reduced. At time t9, W1=1 and W2=0. That is, the control mode becomes the first control mode.

That is, when the gripping state is determined with the vehicle lateral position $P_{lat}$ shifted toward the center of the lane across $P_{R\_start}$, determination is made that the driver is steering the vehicle to return to the center of the lane. The second control mode is switched to the first control mode even if the vehicle lateral position $P_{lat}$ has not crossed $P_{R\_return}$ toward the center of the lane.

From time t8 to t9, the steering reaction force gradually decreases because part of the steering reaction force based on the virtual road load torque $T_{rl}$ is reflected. Since the control mode becomes the first control mode from time t9, the steering reaction force based on the virtual road load torque $T_{rl}$ is 0.

[Modification of Manual Steering Command Value Generation Unit 42]

A modification of the manual steering command value generation unit 42 will be described below.

In the embodiment described above, the virtual load spring stiffness coefficient $k_{vl}$ and the virtual load viscous damping coefficient ci are set in association with the vehicle lateral position $P_{lat}$.

Figure 18:
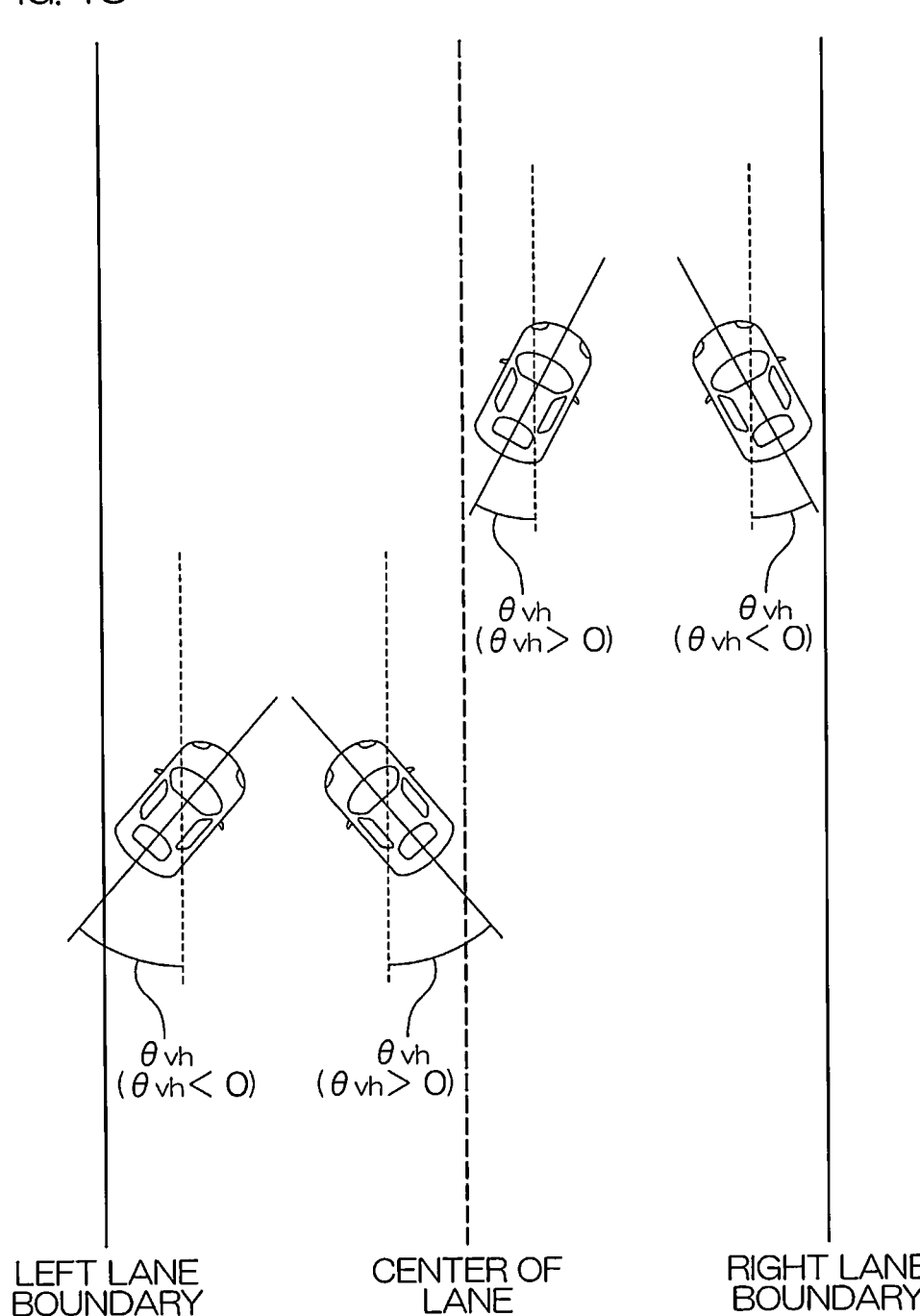
FIG. 18 is a schematic diagram illustrating a heading angle $\theta_{vh}$.

In the modification of the manual steering command value generation unit 42, the virtual load spring stiffness coefficient $k_{vl}$ and the virtual load viscous damping coefficient $c_{vl}$ are set in association with the vehicle lateral position $P_{lat}$ and a heading angle $\theta_{vh}$. As shown in FIG. 18, the heading angle $\theta_{vh}$ is an angle ($0° \leq \theta_{vh} < 180°$) between a lane center line and the traveling direction of the vehicle (vehicle width center line). The heading angle $\theta_{vh}$ is positive in a posture of the vehicle heading toward the lane boundary from the center of the lane, and is negative in a posture of the vehicle heading toward the center of the lane. When the traveling direction of the vehicle is parallel to the lane center line, the heading angle $\theta_{vh}$ is 0°.

The heading angle $\theta_{vh}$ is provided from the higher-level ECU 201 to the manual steering command value generation unit 42 in the motor control ECU 202 as indicated by the long dashed double-short dashed line in FIGS. 1 and 2. When a weight setting process shown in FIG. 24 described later or a weight setting process shown in FIG. 26 described later is performed by the weight setting unit 49, the heading angle $\theta_{vh}$ is also provided to the weight setting unit 49 as indicated by the long dashed double-short dashed line in FIG. 2.

In the modification of the manual steering command value generation unit 42, when the rotational angle of the lower column in FIG. 4 is the manual steering command value $\theta_{MD,cmd}$, the road load torque (virtual road load torque) $T_{rl}$ is given by expression (10) below using the virtual load spring stiffness coefficient $k_{vl}$, the virtual load viscous damping coefficient $c_{vl}$, and the manual steering command value $\theta_{MD,cmd}$.

$$T_{rl} = -k_{vl} \cdot \theta_{MD,cmd} - c_{vl}(d\theta_{MD,cmd}/dt) \qquad (10)$$

where $k_{vl} = k_{vl}(P_{lat}, \theta_{vh})$ and $c_{vl} = c_{vl}(P_{lat}, \theta_{vh})$.

As shown in expression (10) above, the virtual load spring stiffness coefficient $k_{vl}$ and the virtual load viscous damping coefficient $c_{vl}$ are set in association with the vehicle lateral position $P_{lat}$ and the heading angle $\theta_{vh}$.

Figure 19:
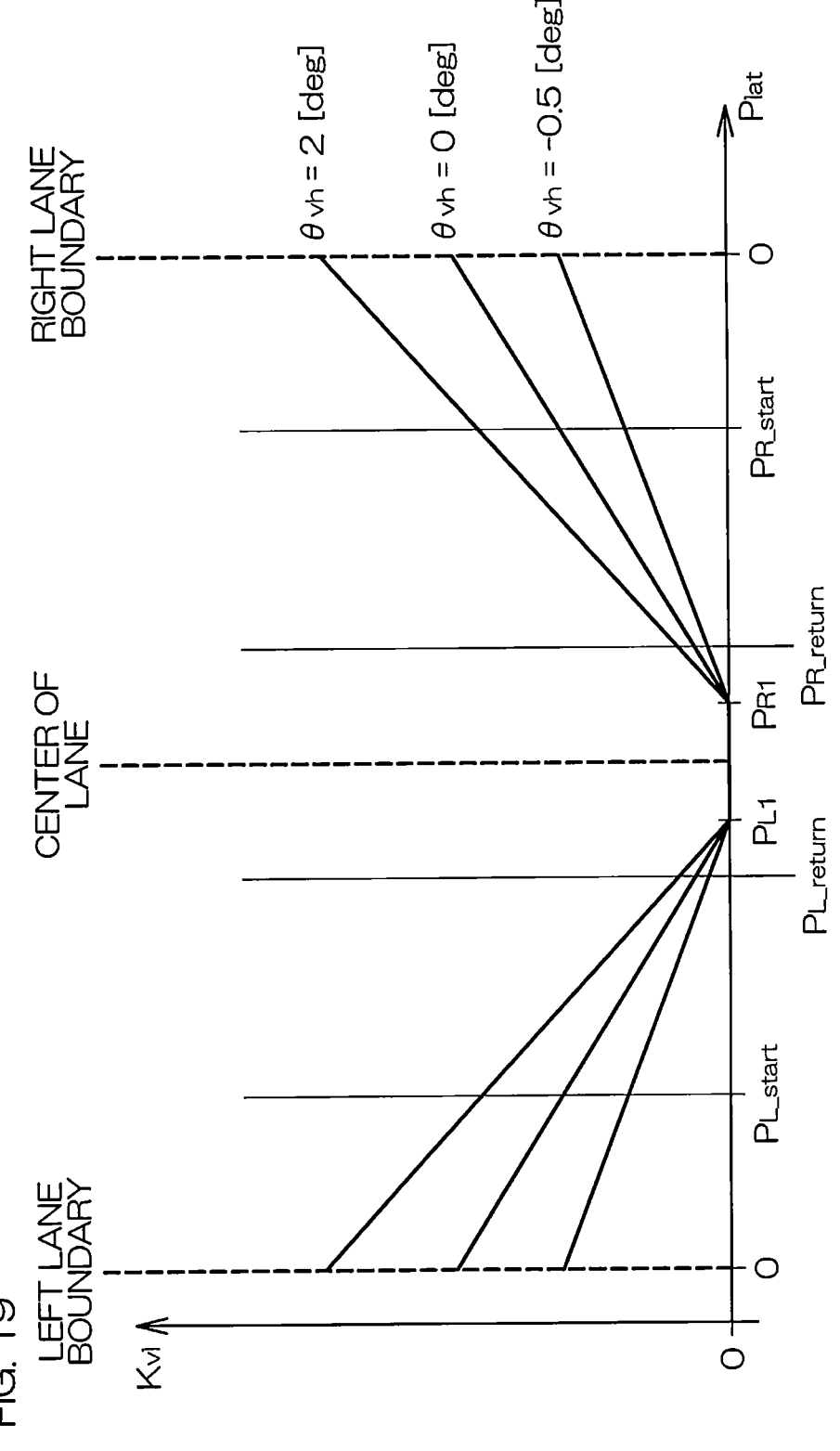
FIG. 19 is a graph showing an example of setting a virtual load spring stiffness coefficient $k_{vl}$ with respect to the vehicle lateral position $P_{lat}$.

FIG. 19 is a graph showing an example of setting the virtual load spring stiffness coefficient $k_{vl}$ with respect to the vehicle lateral position $P_{lat}$.

FIG. 19 shows examples in which the heading angle $\theta_{vh}$ is 0 [deg], in which the heading angle $\theta_{vh}$ is 2 [deg], and in which the heading angle $\theta_{vh}$ is −0.5 [deg].

The affix L of each symbol in FIG. 19 indicates that the symbol is applied when the vehicle reference position is on the left side with respect to the center of the lane, and the affix R indicates that the symbol is applied when the vehicle reference position is on the right side with respect to the center of the lane. The same applies to FIG. 22 described later.

$P_{L\_return}$, $P_{L\_start}$, $P_{R\_return}$, and $P_{R\_start}$ in FIG. 19 and FIGS. 20 to 23 described later may be set at the same positions as or at different positions from $P_{L\_return}$, $P_{L\_start}$, $P_{R\_return}$, and $P_{R\_start}$ in FIG. 12, respectively. It is herein assumed that $P_{L\_return}$, $P_{L\_start}$, $P_{R\_return}$, and $P_{R\_start}$ in FIG. 19 and FIGS. 20 to 23 described later are set at the same positions as $P_{L\_return}$, $P_{L\_start}$, $P_{R\_return}$, and $P_{R\_start}$ in FIG. 12, respectively.

When the vehicle lateral position $P_{lat}$ is equal to or greater than a predetermined value $P_{L1}$ closer to the center of the lane than $P_{L\_return}$ with respect to the left lane boundary or equal to or greater than a predetermined value $P_{R1}$ closer to the center of the lane than $P_{R\_return}$ with respect to the right lane boundary, the virtual load spring stiffness coefficient $k_{vl}$ is set to 0. For example, $P_{L1}$ and $P_{R1}$ are set to about 110 cm.

When the vehicle lateral position $P_{lat}$ is on the left side of the center of the lane and the vehicle lateral position $P_{lat}$ is equal to or greater than 0 and smaller than $P_{L1}$, the virtual load spring stiffness coefficient $k_{vl}$ is set according to a characteristic that it gradually increases as the vehicle lateral position $P_{lat}$ decreases from $P_{L1}$ (as the vehicle reference position approaches the left lane boundary) depending on the vehicle lateral position $P_{lat}$ and the heading angle $\theta_{vh}$. In FIG. 19, the virtual load spring stiffness coefficient $k_{vl}$ gradually increases linearly, but the virtual load spring stiffness coefficient $k_{vl}$ may gradually increase non-linearly.

The virtual load spring stiffness coefficient $k_{vl}$ in this section increases as the heading angle $\theta_{vh}$ increases when the heading angle $\theta_{vh}$ is positive (when the traveling direction of the vehicle is a direction toward the left lane boundary). On the other hand, the virtual load spring stiffness coefficient $k_{vl}$ decreases as the absolute value of the heading angle $\theta_{vh}$ increases when the heading angle $\theta_{vh}$ is negative (when the traveling direction of the vehicle is a direction toward the center of the lane).

When the vehicle lateral position $P_{lat}$ is on the right side of the center of the lane and the vehicle lateral position $P_{lat}$ is equal to or greater than 0 and smaller than $P_{R1}$, the virtual load spring stiffness coefficient $k_{vl}$ is set according to a characteristic that it gradually increases as the vehicle lateral position $P_{lat}$ decreases from $P_{R1}$ (as the vehicle reference position approaches the right lane boundary) depending on the vehicle lateral position $P_{lat}$ and the heading angle $\theta_{vh}$. In FIG. 19, the virtual load spring stiffness coefficient $k_{vl}$ gradually increases linearly, but the virtual load spring stiffness coefficient $k_{vl}$ may gradually increase non-linearly.

The virtual load spring stiffness coefficient $k_{vl}$ in this section increases as the heading angle $\theta_{vh}$ increases when the heading angle $\theta_{vh}$ is positive (when the traveling direction of the vehicle is a direction toward the right lane boundary). On the other hand, the virtual load spring stiffness coefficient $k_{vl}$ decreases as the absolute value of the heading angle $\theta_{vh}$ increases when the heading angle $\theta_{vh}$ is negative (when the traveling direction of the vehicle is a direction toward the left lane boundary).

An example of a method for setting the virtual load spring stiffness coefficient characteristics as shown in FIG. 19 will be described.

First, the characteristic of the virtual load spring stiffness coefficient $k_{vl}$ with respect to the vehicle lateral position $P_{lat}$ when the heading angle $\theta_{vh}$ is 0 [deg] (hereinafter referred to as "basic characteristic of spring stiffness coefficient $k_{vl}$") is set. An example of the basic characteristic of the spring stiffness coefficient $k_{vl}$ is shown in FIG. 20.

Figure 21:
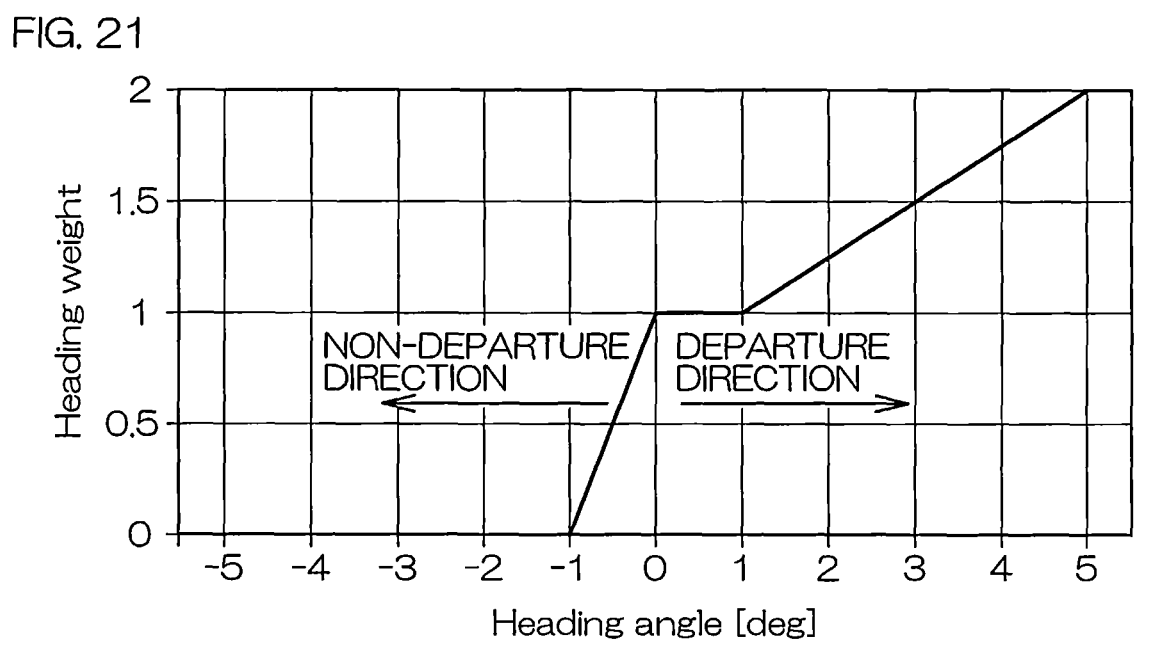

Next, a weight for the heading angle $\theta_{vh}$ (heading weight) is set. An example of a weighting characteristic with respect to the heading angle $\theta_{vh}$ is shown in FIG. 21. The weighting characteristic with respect to the heading angle $\theta_{vh}$ in FIG. 21 is only an example. For example, the weighting characteristic increases or decreases linearly as the heading angle $\theta_{vh}$ increases or decreases in FIG. 21, but it may increase or decrease non-linearly. Further, the weight may be set to a constant value in a specific angle range. In FIG. 21, the gain is set to 1 for the heading angle $\theta_{vh}$ in an angle range from 0 [deg] to 1 [deg] to suppress a change in the steering reaction force when the traveling direction of the vehicle is a departure direction and is substantially parallel to the lane center line.

Figure 20:
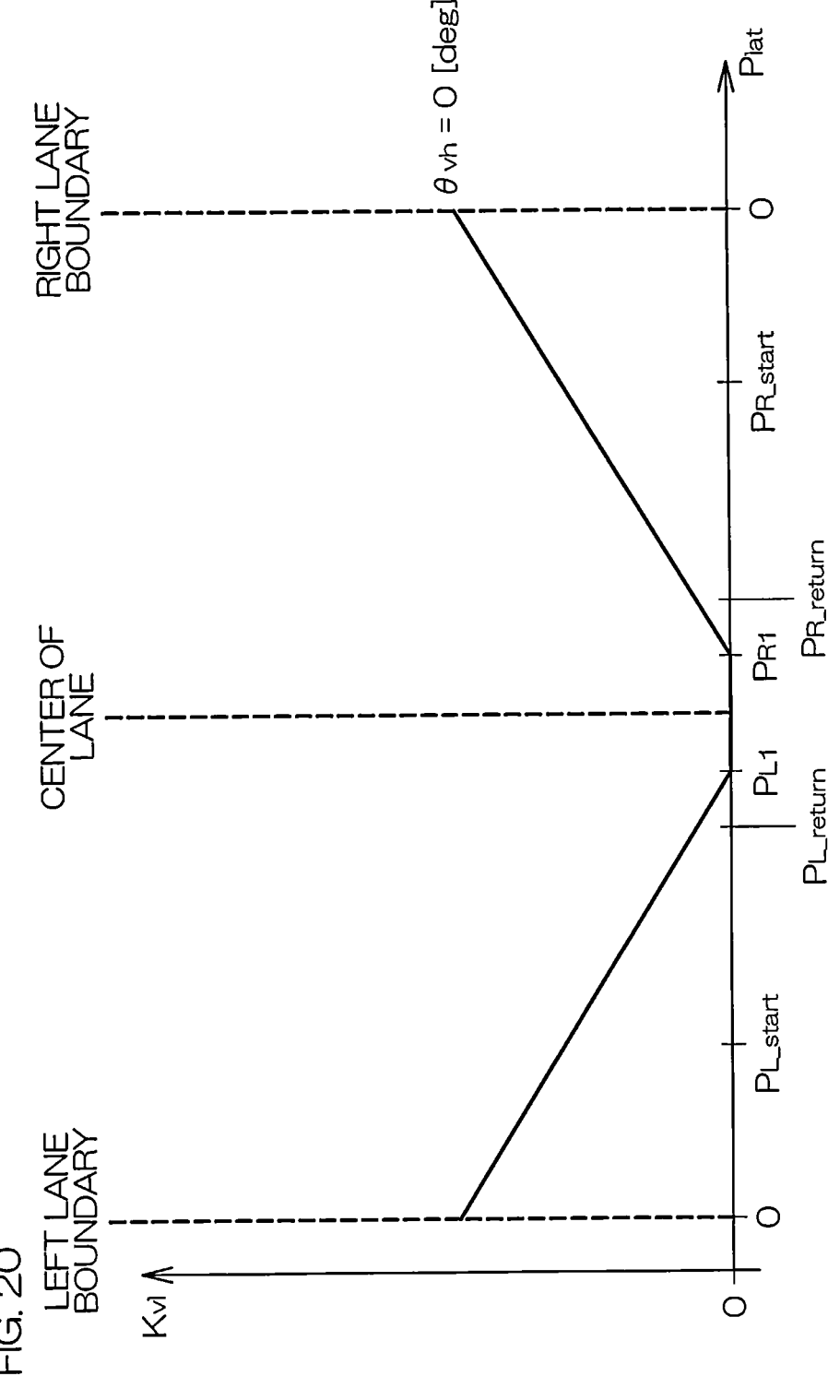
FIG. 20 is a graph showing an example of a basic characteristic of a spring stiffness coefficient $k_{vl}$.

Based on the basic characteristic of the spring stiffness coefficient $k_{vl}$ in FIG. 20 and the weighting characteristic with respect to the heading angle $\theta_{vh}$ in FIG. 21, the characteristics of the virtual load spring stiffness coefficient $k_{vl}$ with respect to the vehicle lateral position $P_{lat}$ are set for a plurality of types of heading angle $\theta_{vh}$. For example, the characteristic for the heading angle $\theta_{vh}$ of 2 [deg] is set by multiplying the basic characteristic of the spring stiffness coefficient $k_{vl}$ by 1.25 as the weight for 2 [deg].

Figure 22:
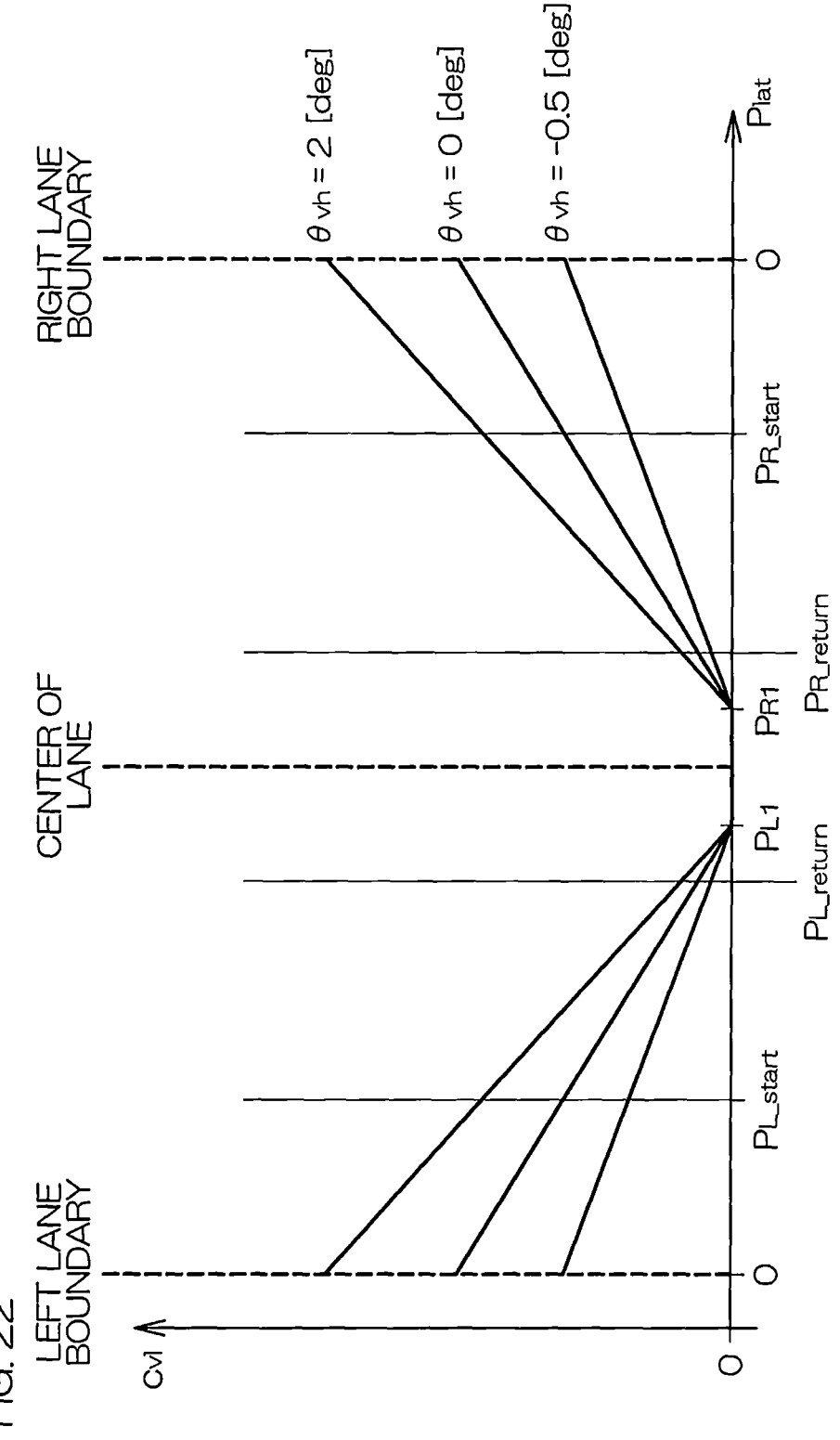
FIG. 22 is a graph showing an example of setting the virtual load viscous damping coefficient cu with respect to the vehicle lateral position $P_{lat}$.

FIG. 22 is a graph showing an example of setting the virtual load viscous damping coefficient $c_{vl}$ with respect to the vehicle lateral position $P_{lat}$.

FIG. 22 shows examples in which the heading angle $\theta_{vh}$ is 0 [deg], in which the heading angle $\theta_{vh}$ is 2 [deg], and in which the heading angle $\theta_{vh}$ is −0.5 [deg].

The characteristics of the virtual load viscous damping coefficient $c_{vl}$ with respect to the vehicle lateral position $P_{lat}$ are similar to the characteristics of the virtual load spring stiffness coefficient $k_{vl}$ with respect to the vehicle lateral position $P_{lat}$. The characteristics of the virtual load viscous damping coefficient $c_{vl}$ with respect to the vehicle lateral position $P_{lat}$ are set by a method similar to the method for setting the characteristics of the virtual load spring stiffness coefficient $k_{vl}$ with respect to the vehicle lateral position $P_{lat}$ as described above.

The manual steering command value generation unit 42 calculates the manual steering command value $\theta_{MD,cmd}$ using the equation given by expression (2) above as in the embodiment described above. However, the virtual load spring stiffness coefficient $k_{vl}$ and the virtual load viscous damping coefficient $c_{vl}$ associated with the vehicle lateral position $P_{lat}$ and the heading angle $\theta_{vh}$ as shown in expression (10) are used as the virtual load spring stiffness coefficient $k_{vl}$ and the virtual load viscous damping coefficient $c_{vl}$.

The virtual load spring stiffness coefficient $k_{vl}$ associated with the vehicle lateral position $P_{lat}$ and the heading angle $\theta_{vh}$ is determined, for example, based on the vehicle lateral position $P_{lat}$ provided from the higher-level ECU 201 and a map that stores the virtual load spring stiffness coefficient $k_{vl}$ with respect to the vehicle lateral position $P_{lat}$ for each of the plurality of heading angles $\theta_{vh}$ (see the graph of FIG. 19). The virtual load viscous damping coefficient $c_{vl}$ associated with the vehicle lateral position $P_{lat}$ and the heading angle $\theta_{vh}$ is determined, for example, based on the vehicle lateral position $P_{lat}$ provided from the higher-level ECU 201 and a map that stores the virtual load viscous damping coefficient $c_{vl}$ with respect to the vehicle lateral position $P_{lat}$ for each of the plurality of heading angles $\theta_{vh}$ (see the graph of FIG. 22).

Figure 23:
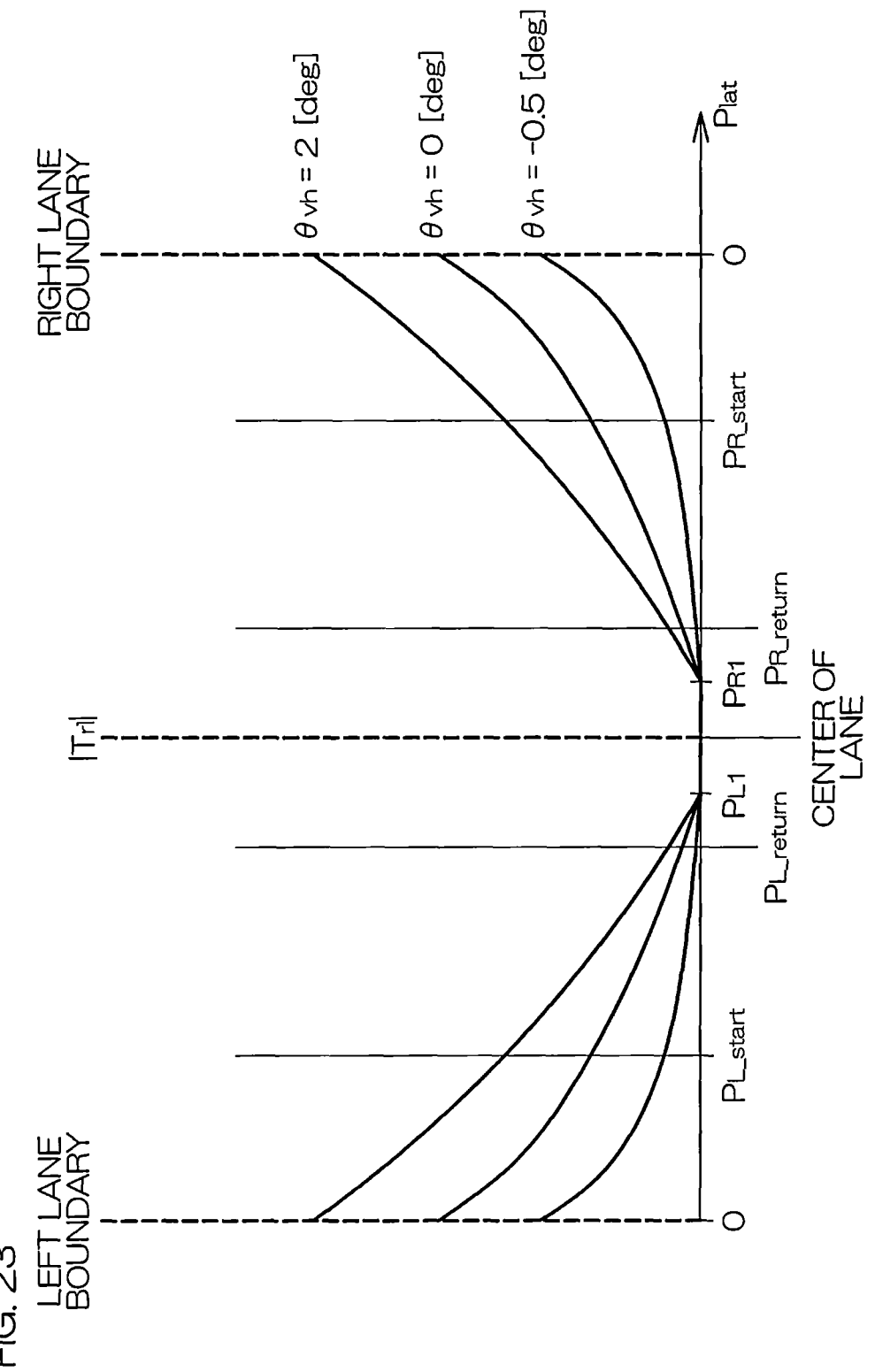
FIG. 23 is a graph showing an example of the relationship between the vehicle lateral position $P_{lat}$ and the absolute value $|T_{rl}|$ of the road load torque $T_{rl}$ calculated based on expression (10).

FIG. 23 is a graph showing an example of the relationship between the vehicle lateral position $P_{lat}$ and the absolute value $|T_{rl}|$ of the road load torque $T_{rl}$ calculated based on expression (10).

FIG. 23 shows examples in which the heading angle $\theta_{vh}$ is 0 [deg], in which the heading angle $\theta_{vh}$ is 2 [deg], and in which the heading angle $\theta_{vh}$ is −0.5 [deg].

When the vehicle lateral position $P_{lat}$ is equal to or greater than $P_{L1}$ with respect to the left lane boundary or equal to or greater than $P_{R1}$ with respect to the right lane boundary, the virtual load spring stiffness coefficient $k_{vl}$ and the virtual load viscous damping coefficient $c_{vl}$ are 0. Therefore, the absolute value $|T_{rl}|$ of the virtual road load torque is 0.

When the vehicle lateral position $P_{lat}$ is on the left side of the center of the lane and the vehicle lateral position $P_{lat}$ is equal to or greater than 0 and smaller than $P_{L1}$, the absolute value $|T_{rl}|$ of the virtual road load torque increases as the vehicle lateral position $P_{lat}$ decreases from $P_{L1}$ (as the vehicle reference position approaches the left lane boundary). In the example of FIG. 23, $|T_{rl}|$ gradually increases non-linearly.

When the vehicle lateral position $P_{lat}$ is on the right side of the center of the lane and the vehicle lateral position $P_{lat}$ is equal to or greater than 0 and smaller than $P_{R1}$, the absolute value $|T_{rl}|$ of the virtual road load torque increases as the vehicle lateral position $P_{lat}$ decreases from $P_{R1}$ (as the vehicle reference position approaches the right lane boundary). In the example of FIG. 23, $|T_{rl}|$ gradually increases non-linearly.

Next, description will be given of the operation of the weight setting unit 49 when the virtual load spring stiffness coefficient $k_{vl}$ and the virtual load viscous damping coefficient $c_{vl}$ are set in association with the vehicle lateral position $P_{lat}$ and the heading angle $\theta_{vh}$.

When $P_{L\_return}$ is set between $P_{L1}$ and $P_{L\_start}$ and $P_{R\_return}$ is set between $P_{R1}$ and $P_{R\_start}$ as shown in FIG. 23, the weight setting unit 49 can perform the weight setting process according to the procedure of FIG. 11 described above or the procedure of FIG. 16 described above. Further, the weight setting unit 49 can perform the weight setting process described in the first modification of the weight setting unit 49 described above (modification in which the first vehicle lateral position and the second vehicle lateral position are the same).

When the virtual load spring stiffness coefficient $k_{vl}$ and the virtual load viscous damping coefficient $c_{vl}$ are set in association with the vehicle lateral position $P_{lat}$ and the heading angle $\theta_{vh}$, the weight setting unit 49 can perform the weight setting process by another procedure described below. For convenience of the following description, the positions corresponding to $P_{L\_return}$ and $P_{L\_start}$ in FIGS. 19, 22, and 23 will be represented by $P_{L2}$ and $P_{L3}$, respectively. The positions corresponding to $P_{R\_return}$ and $P_{R\_start}$ in FIGS. 19, 22, and 23 will be represented by $P_{R2}$ and $P_{R3}$, respectively.

[Third Modification of Weight Setting Unit 49]

Figure 25:
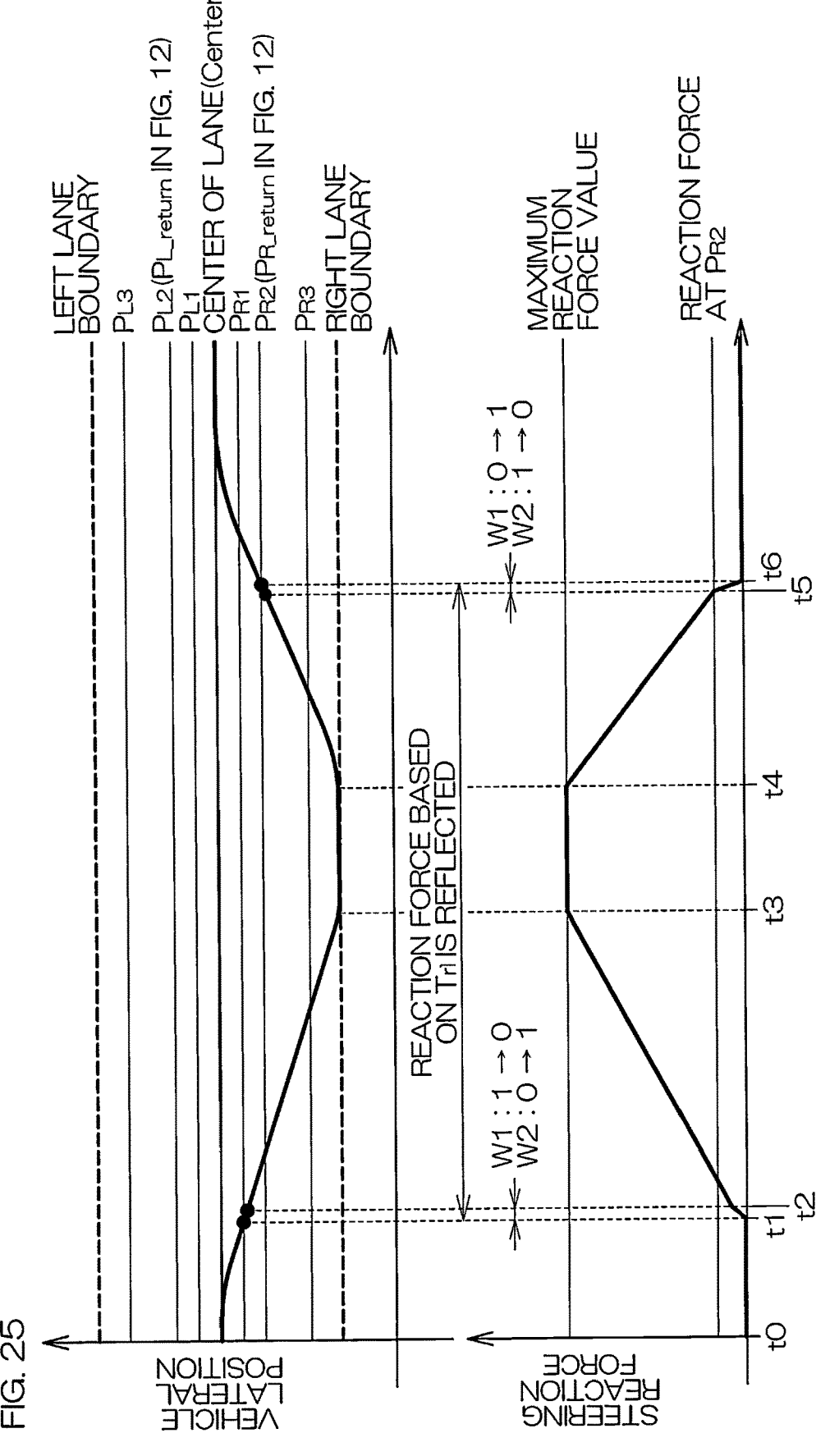
FIG. 25 is a schematic diagram illustrating a steering reaction force generated based on the virtual road load torque $T_{rl}$ in the driving assist mode when the first vehicle lateral position is set to $P_{L1}$, $P_{R1}$ and the second vehicle lateral position is set to $P_{L2}$, $P_{R2}$.

In a third modification, when the vehicle is on the left side of the center of the lane, the first vehicle lateral position for switching the first weight W1 from 1 to 0 (the second weight W2 from 0 to 1) is set within a range greater than $P_{L2}$ (position corresponding to $P_{L\_return}$ in FIG. 12) and equal to or smaller than $P_{L1}$ as shown in FIG. 25. It is herein assumed that the first vehicle lateral position when the vehicle is on the left side of the center of the lane is set to $P_{L1}$. When the vehicle is on the left side of the center of the lane, the second vehicle lateral position for switching the first weight W1 from 0 to 1 (the second weight W2 from 1 to 0) is set to $P_{L2}$.

When the vehicle is on the right side of the center of the lane, the first vehicle lateral position for switching the first weight W1 from 1 to 0 (the second weight W2 from 0 to 1) is set within a range greater than $P_{R2}$ (position corresponding to $P_{R\_return}$ in FIG. 12) and equal to or smaller than $P_{R1}$ as shown in FIG. 25. It is herein assumed that the first vehicle lateral position when the vehicle is on the right side of the center of the lane is set to $P_{R1}$. When the vehicle is on the right side of the center of the lane, the second vehicle lateral position for switching the first weight W1 from 0 to 1 (the second weight W2 from 1 to 0) is set to $P_{R2}$.

Figure 24:
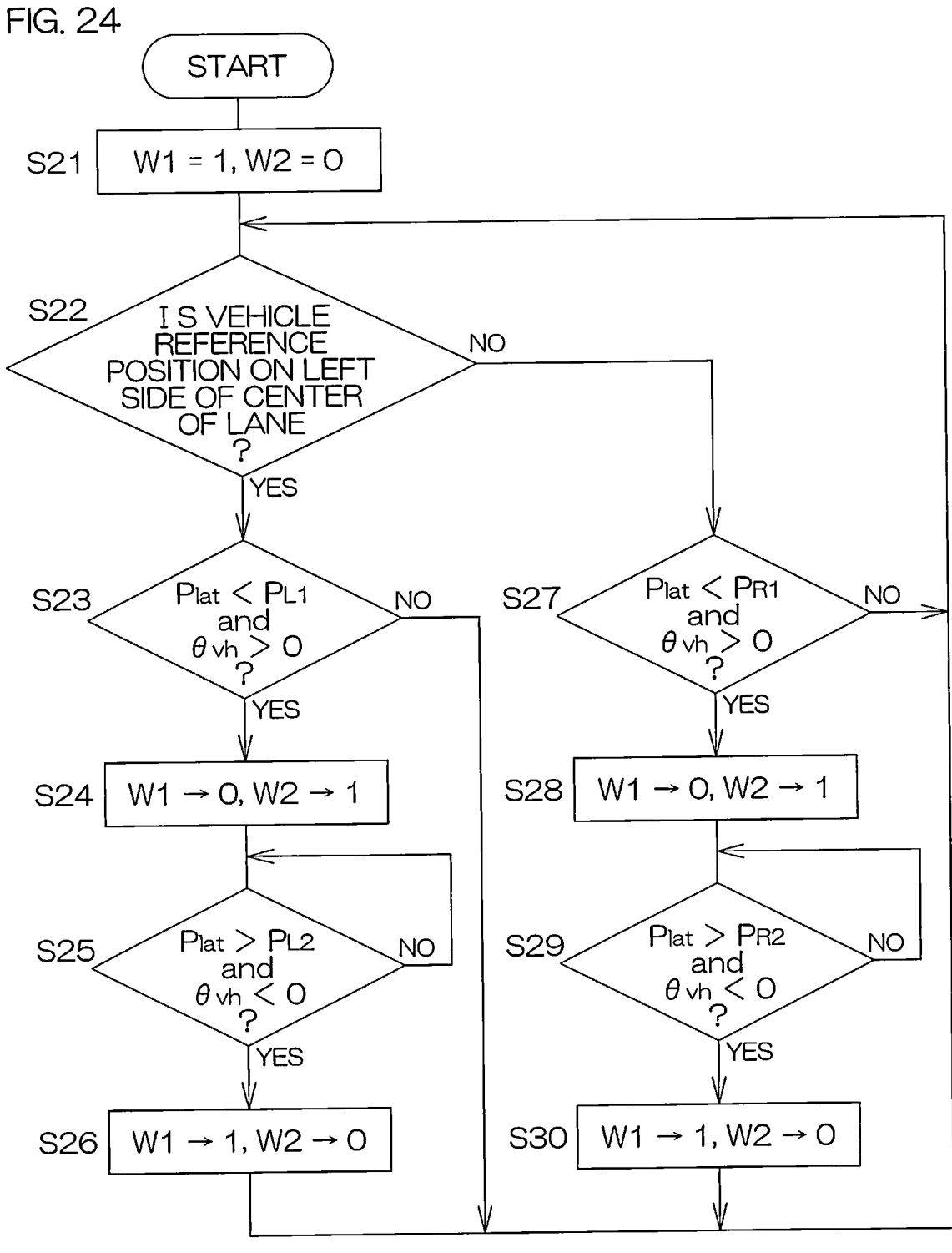
FIG. 24 is a flowchart showing the procedure of a weight setting process performed by the weight setting unit according to a third modification in the driving assist mode.

FIG. 24 is a flowchart showing the procedure of a weight setting process performed by the weight setting unit 49 according to the third modification in the driving assist mode.

When the driving mode is the driving assist mode, the weight setting unit 49 sets the first weight W1 to 1, and sets the second weight W2 to 0 (step S21). The control mode of the electric motor 18 thus becomes the first control mode in which the drive of the electric motor 18 is controlled only by the assist torque command value $T_{asst}$.

When the driving mode is the driving assist mode, the automatic steering command value $\theta_{AD,cmd}$ is set by the higher-level ECU 201, and the automatic steering command value $\theta_{AD,cmd}$, the mode signal $S_{mode}$, the right/left discrimination signal $S_{LR}$, and the vehicle lateral position $P_{lat}$ are provided to the motor control ECU 202.

Next, the weight setting unit 49 determines whether the vehicle reference position is on the left side of the center of the lane based on the right/left discrimination signal $S_{LR}$ (step S22).

When the vehicle reference position is on the left side of the center of the lane (step S22: YES), the weight setting unit 49 determines whether a fifth condition that the vehicle lateral position $P_{lat}$ is smaller than $P_{L1}$ (see FIG. 25) and the heading angle $\theta_{vh}$ is larger than 0 is satisfied (step S23). For example, $P_{L1}$ is set to 110 cm.

When the fifth condition is not satisfied (step S23: NO), the weight setting unit 49 returns to step S22.

When determination is made in step S23 that the fifth condition is satisfied (step S23: YES), the weight setting unit 49 sets the first weight W1 to 0, and sets the second weight W2 to 1 (step S24). At this time, it is preferable that the weight setting unit 49 gradually reduce the first weight W1 from 1 to 0 and gradually increase the second weight W2 from 0 to 1. The time for gradually reducing the first weight

W1 from 1 to 0 (time for gradually increasing the second weight W2 from 0 to 1) may be, for example, about 0.1 seconds.

The control mode of the electric motor 18 thus becomes the second control mode in which the drive of the electric motor 18 is controlled by the integrated motor torque command value $T_{mint,cmd}$. While the first weight W1 is being gradually reduced (while the second weight W2 is being gradually increased), the electric motor 18 is controlled based on the sum of the assist torque command value $W1 \cdot T_{asst}$ after the first weight multiplication and the integrated motor torque command value $W2 \cdot T_{mint,cmd}$ after the second weight multiplication.

In the second control mode, the electric motor 18 is controlled based on the integrated angle command value $\theta_{int,cmd}$ that is the sum of the manual steering command value $\theta_{MD,cmd}$ and the automatic steering command value $\theta_{AD,cmd}$. The steering reaction force based on the virtual road load torque $T_{rl}$ used to calculate the manual steering command value $\theta_{MD,cmd}$ is thus reflected.

Next, the weight setting unit 49 determines whether a sixth condition that the vehicle lateral position $P_{lat}$ is greater than $P_{L2}$ (see FIG. 25) and the heading angle $\theta_{vh}$ is smaller than 0 is satisfied (step S25).

When the sixth condition is not satisfied (step S25: NO), the weight setting unit 49 returns to step S25.

When determination is made in step S25 that the sixth condition is satisfied (step S25: YES), the weight setting unit 49 sets the first weight W1 to 1, and sets the second weight W2 to 0 (step S26). At this time, it is preferable that the weight setting unit 49 gradually increase the first weight W1 from 0 to 1 and gradually reduce the second weight W2 from 1 to 0. The time for gradually increasing the first weight W1 from 0 to 1 (time for gradually reducing the second weight W2 from 1 to 0) may be, for example, about 0.1 seconds.

The control mode of the electric motor 18 thus becomes the first control mode. While the first weight W1 is being gradually increased (while the second weight W2 is being gradually reduced), the electric motor 18 is controlled based on the sum of the assist torque command value $W1 \cdot T_{asst}$ after the first weight multiplication and the integrated motor torque command value $W2 \cdot T_{mint,cmd}$ after the second weight multiplication.

In the first control mode, the steering reaction force based on the virtual road load torque $T_{rl}$ used to calculate the manual steering command value $\theta_{MD,cmd}$ is not reflected.

After the process of step S26 is performed, the weight setting unit 49 returns to step S22.

When determination is made in step S22 that the vehicle reference position is on the right side of the center of the lane (step S22: NO), the weight setting unit 49 determines whether a seventh condition that the vehicle lateral position $P_{lat}$ is smaller than $P_{R1}$ (see FIG. 25) and the heading angle $\theta_{vh}$ is larger than 0 is satisfied (step S27). For example, $P_{R1}$ is set to 110 cm.

When the seventh condition is not satisfied (step S27: NO), the weight setting unit 49 returns to step S22.

When determination is made in step S27 that the seventh condition is satisfied (step S27: YES), the weight setting unit 49 sets the first weight W1 to 0, and sets the second weight W2 to 1 (step S28). At this time, it is preferable that the weight setting unit 49 gradually reduce the first weight W1 from 1 to 0 and gradually increase the second weight W2 from 0 to 1.

The control mode of the electric motor 18 thus becomes the second control mode. In the second control mode, the steering reaction force based on the virtual road load torque $T_{rl}$ is reflected.

Next, the weight setting unit 49 determines whether an eighth condition that the vehicle lateral position $P_{lat}$ is greater than $P_{R2}$ (see FIG. 25) and the heading angle $\theta_{vh}$ is smaller than 0 is satisfied (step S29).

When the eighth condition is not satisfied (step S29: NO), the weight setting unit 49 returns to step S29.

When determination is made in step S29 that the eighth condition is satisfied (step S29: YES), the weight setting unit 49 sets the first weight W1 to 1, and sets the second weight W2 to 0 (step S30). At this time, it is preferable that the weight setting unit 49 gradually increase the first weight W1 from 0 to 1 and gradually reduce the second weight W2 from 1 to 0.

The control mode of the electric motor 18 thus becomes the first control mode. In the first control mode, the steering reaction force based on the virtual road load torque $T_{rl}$ is not reflected.

After the process of step S30 is performed, the weight setting unit 49 returns to step S22.

FIG. 25 is a schematic diagram illustrating a steering reaction force generated based on the virtual road load torque $T_{rl}$ in the driving assist mode when the first vehicle lateral position is set to $P_{L1}$, $P_{R1}$ and the second vehicle lateral position is set to $P_{L2}$, $P_{R2}$.

At time t0, the control mode is the first mode and the vehicle reference position is at the center of the lane. Since the control mode is the first control mode, W1=1 and W2=0, and the steering reaction force based on the virtual road load torque $T_{rl}$ used to calculate the manual steering command value $\theta_{MD,cmd}$ is 0.

The driver steers to the right immediately after time t0. The vehicle 25 therefore starts to move to the right. Assuming that $\theta_{vh}>0$ when the vehicle lateral position $P_{lat}$ crosses $P_{R1}$ toward the right lane boundary at time t1, the seventh condition in step S27 of FIG. 24 is satisfied. Therefore, W1 is gradually reduced and W2 is gradually increased. At time t2, W1=0 and W2=1. That is, the control mode becomes the second control mode.

From time t0 to time t1, the steering reaction force based on the virtual road load torque $T_{rl}$ used to calculate the manual steering command value $\theta_{MD,cmd}$ is 0. From time t1 to t2, the steering reaction force gradually increases because part of the steering reaction force based on the virtual road load torque $T_{rl}$ is reflected. Since the control mode becomes the second control mode from time t2, the steering reaction force based on the virtual road load torque $T_{rl}$ further increases.

When the vehicle reference position reaches the right lane boundary (time t3), the steering reaction force reaches the maximum reaction force value. When the driver feels the steering reaction force and stops steering to the right, the vehicle moves toward the center of the lane. When the vehicle reference position is shifted toward the center of the lane from the right lane boundary (time t4), the steering reaction force based on the virtual road load torque $T_{rl}$ decreases. Assuming that $\theta_{vh}<0$ when the vehicle lateral position $P_{lat}$ crosses $P_{R2}$ toward the center of the lane at time t5, the eighth condition in step S29 of FIG. 24 is satisfied. Therefore, W1 is gradually increased and W2 is gradually reduced. At time t6, W1=1 and W2=0. That is, the control mode becomes the first control mode.

From time t5 to t6, the steering reaction force gradually decreases because part of the steering reaction force based on the virtual road load torque $T_{rl}$ is reflected. Since the control mode becomes the first control mode from time t6, the steering reaction force based on the virtual road load torque $T_{rl}$ is 0.

In the third modification, the following effects can be obtained compared to the embodiment described above with reference to FIG. 12. When the traveling direction of the vehicle is the lane departure direction, it is preferable to promptly notify the driver about this fact. In the third modification, the first vehicle lateral position is set closer to the center of the lane than the second vehicle lateral position of the embodiment described above. Therefore, when the vehicle travels in the lane departure direction, the steering reaction force can be transferred to the driver earlier than in the embodiment described above.

[Fourth Modification of Weight Setting Unit 49]

Figure 27:
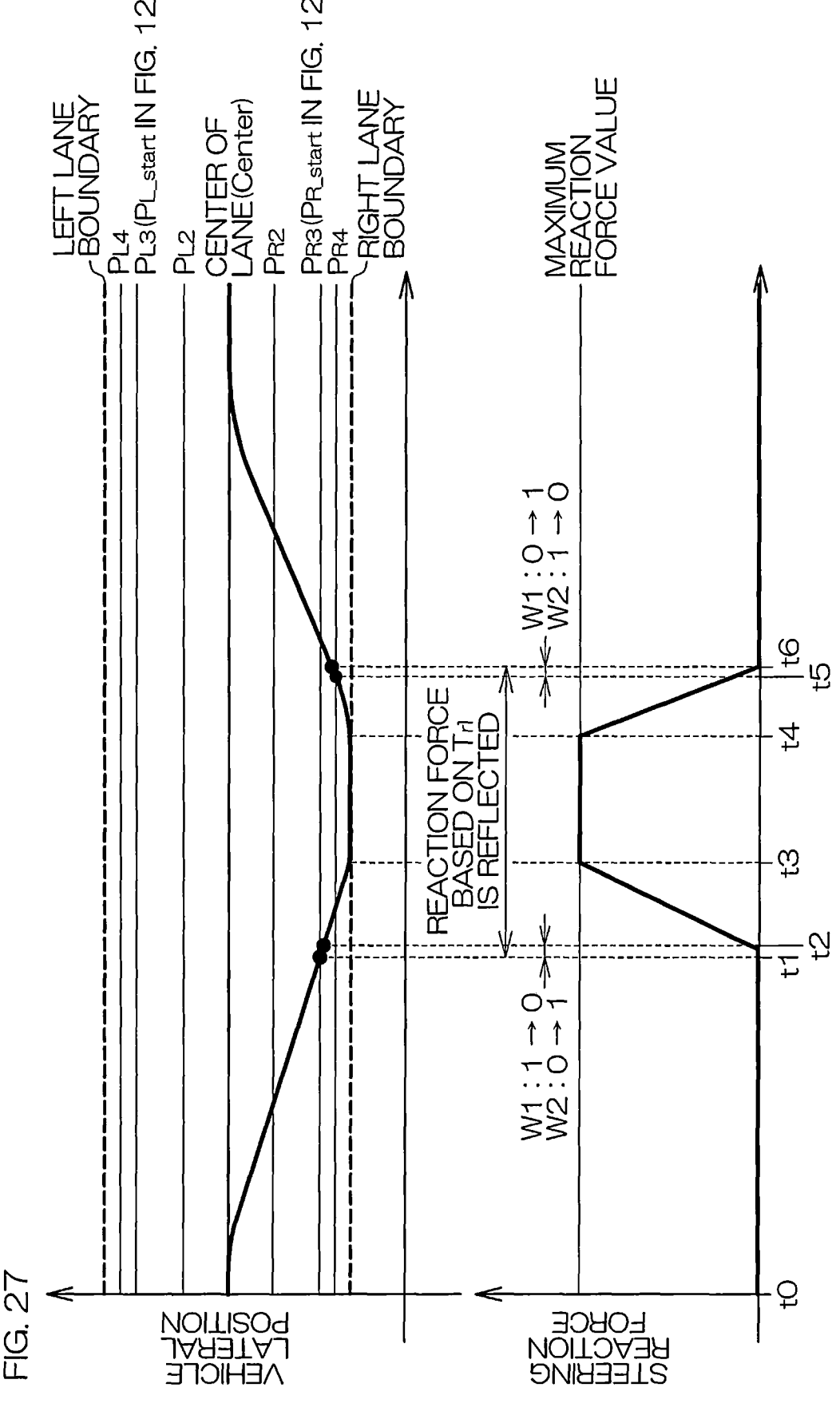
FIG. 27 is a schematic diagram illustrating a steering reaction force generated based on the virtual road load torque $T_{rl}$ in the driving assist mode when the first vehicle lateral position is set to $P_{L3}$, $P_{R3}$ and the second vehicle lateral position is set to $P_{L4}$, $P_{R4}$.

In a fourth modification, when the vehicle is on the left side of the center of the lane, the first vehicle lateral position for switching the first weight W1 from 1 to 0 (the second weight W2 from 0 to 1) is set to $P_{L3}$ (position corresponding to $P_{L\_start}$ in FIG. 12) as shown in FIG. 27. When the vehicle is on the left side of the center of the lane, the second vehicle lateral position for switching the first weight W1 from 0 to 1 (the second weight W2 from 1 to 0) is set within a range greater than 0 and equal to or smaller than $P_{L3}$ (position corresponding to $P_{L\_start}$ in FIG. 12). It is herein assumed that the second vehicle lateral position when the vehicle is on the left side of the center of the lane is set to $P_{L4}$.

When the vehicle is on the right side of the center of the lane, the first vehicle lateral position for switching the first weight W1 from 1 to 0 (the second weight W2 from 0 to 1) is set to $P_{R3}$ (position corresponding to $P_{R\_start}$ in FIG. 12) as shown in FIG. 27. When the vehicle is on the right side of the center of the lane, the second vehicle lateral position for switching the first weight W1 from 0 to 1 (the second weight W2 from 1 to 0) is set within a range greater than 0 and equal to or smaller than $P_{R3}$ (position corresponding to $P_{R\_start}$ in FIG. 12). It is herein assumed that the second vehicle lateral position when the vehicle is on the right side of the center of the lane is set to $P_{R4}$.

Figure 26:
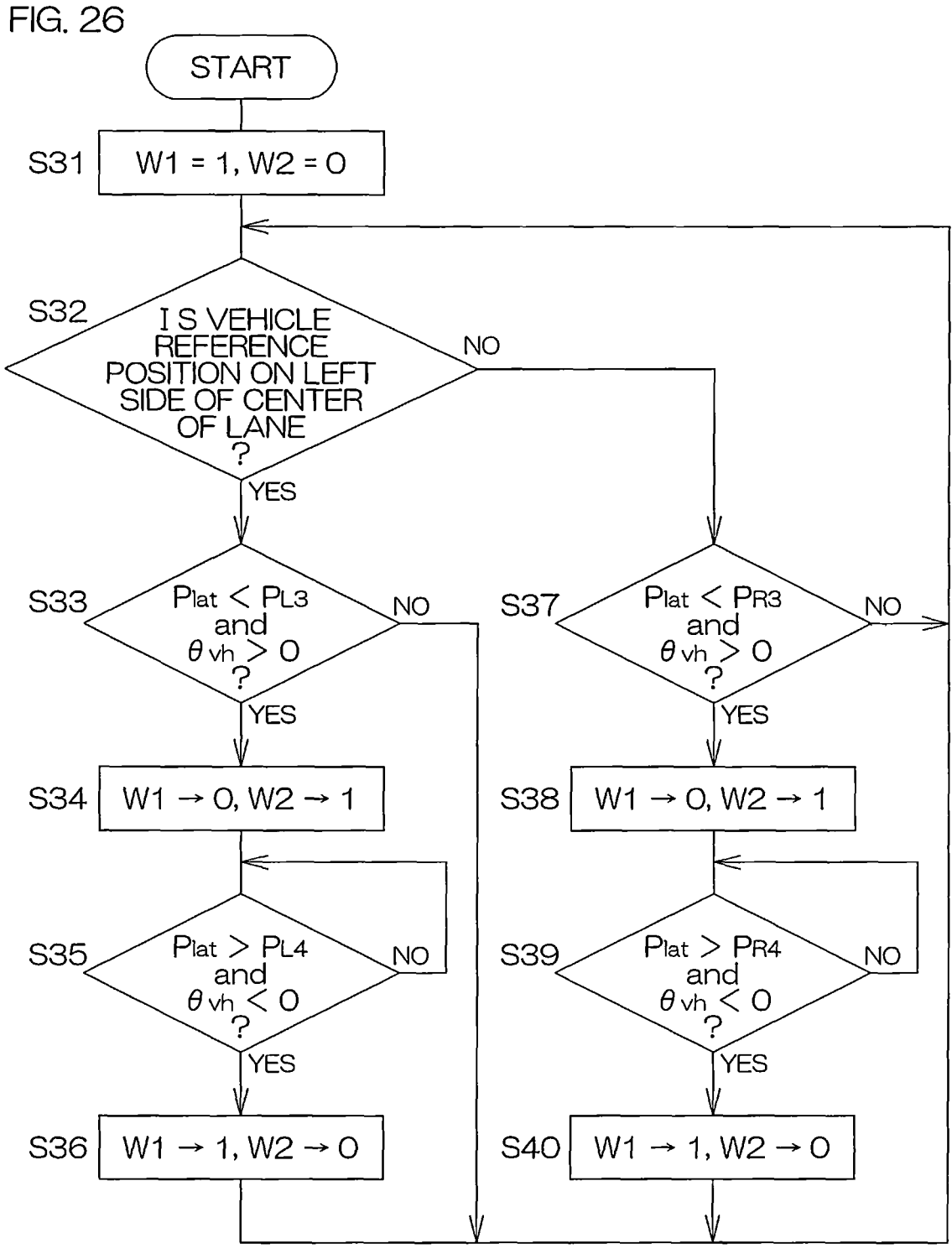
FIG. 26 is a flowchart showing the procedure of a weight setting process performed by the weight setting unit according to a fourth modification in the driving assist mode.

FIG. 26 is a flowchart showing the procedure of a weight setting process performed by the weight setting unit 49 according to the fourth modification in the driving assist mode.

When the driving mode is the driving assist mode, the weight setting unit 49 sets the first weight W1 to 1, and sets the second weight W2 to 0 (step S31). The control mode of the electric motor 18 thus becomes the first control mode in which the drive of the electric motor 18 is controlled only by the assist torque command value $T_{asst}$.

When the driving mode is the driving assist mode, the automatic steering command value $\theta_{AD,cmd}$ is set by the higher-level ECU 201, and the automatic steering command value $\theta_{AD,cmd}$, the mode signal $S_{mode}$, the right/left discrimination signal $S_{LR}$, and the vehicle lateral position $P_{lat}$ are provided to the motor control ECU 202.

Next, the weight setting unit 49 determines whether the vehicle reference position is on the left side of the center of the lane based on the right/left discrimination signal $S_{LR}$ (step S32).

When the vehicle reference position is on the left side of the center of the lane (step S32: YES), the weight setting unit 49 determines whether a ninth condition that the vehicle lateral position $P_{lat}$ is smaller than $P_{L3}$ (see FIG. 27) and the heading angle $\theta_{vh}$ is larger than 0 is satisfied (step S33).

When the ninth condition is not satisfied (step S33: NO), the weight setting unit 49 returns to step S32.

When determination is made in step S33 that the ninth condition is satisfied (step S33: YES), the weight setting unit 49 sets the first weight W1 to 0, and sets the second weight W2 to 1 (step S34). At this time, it is preferable that the weight setting unit 49 gradually reduce the first weight W1 from 1 to 0 and gradually increase the second weight W2 from 0 to 1. The time for gradually reducing the first weight W1 from 1 to 0 (time for gradually increasing the second weight W2 from 0 to 1) may be, for example, about 0.1 seconds.

The control mode of the electric motor 18 thus becomes the second control mode in which the drive of the electric motor 18 is controlled by the integrated motor torque command value $T_{mint,cmd}$. While the first weight W1 is being gradually reduced (while the second weight W2 is being gradually increased), the electric motor 18 is controlled based on the sum of the assist torque command value $W1 \cdot T_{asst}$ after the first weight multiplication and the integrated motor torque command value $W2 \cdot T_{mint,cmd}$ after the second weight multiplication.

In the second control mode, the electric motor 18 is controlled based on the integrated angle command value $\theta_{int,cmd}$ that is the sum of the manual steering command value $\theta_{MD,cmd}$ and the automatic steering command value $\theta_{AD,cmd}$. The steering reaction force based on the virtual road load torque $T_{rl}$ used to calculate the manual steering command value $\theta_{MD,cmd}$ is thus reflected.

Next, the weight setting unit 49 determines whether a tenth condition that the vehicle lateral position $P_{lat}$ is greater than $P_{L4}$ (see FIG. 27) and the heading angle $\theta_{vh}$ is smaller than 0 is satisfied (step S35). For example, $P_{L4}$ is set to 30 cm.

When the tenth condition is not satisfied (step S35: NO), the weight setting unit 49 returns to step S35.

When determination is made in step S35 that the tenth condition is satisfied (step S35: YES), the weight setting unit 49 sets the first weight W1 to 1, and sets the second weight W2 to 0 (step S36). At this time, it is preferable that the weight setting unit 49 gradually increase the first weight W1 from 0 to 1 and gradually reduce the second weight W2 from 1 to 0. The time for gradually increasing the first weight W1 from 0 to 1 (time for gradually reducing the second weight W2 from 1 to 0) may be, for example, about 0.1 seconds.

The control mode of the electric motor 18 thus becomes the first control mode. While the first weight W1 is being gradually increased (while the second weight W2 is being gradually reduced), the electric motor 18 is controlled based on the sum of the assist torque command value $W1 \cdot T_{asst}$ after the first weight multiplication and the integrated motor torque command value $W2 \cdot T_{mint,cmd}$ after the second weight multiplication.

In the first control mode, the steering reaction force based on the virtual road load torque $T_{rl}$ used to calculate the manual steering command value $\theta_{MD,cmd}$ is not reflected.

After the process of step S36 is performed, the weight setting unit 49 returns to step S32.

When determination is made in step S32 that the vehicle reference position is on the right side of the center of the lane (step S32: NO), the weight setting unit 49 determines whether an eleventh condition that the vehicle lateral position $P_{lat}$ is smaller than $P_{R3}$ (see FIG. 27) and the heading angle $\theta_{vh}$ is larger than 0 is satisfied (step S37).

When the eleventh condition is not satisfied (step S37: NO), the weight setting unit 49 returns to step S32.

When determination is made in step S37 that the eleventh condition is satisfied (step S37: YES), the weight setting unit 49 sets the first weight W1 to 0, and sets the second weight W2 to 1 (step S38). At this time, it is preferable that the weight setting unit 49 gradually reduce the first weight W1 from 1 to 0 and gradually increase the second weight W2 from 0 to 1.

The control mode of the electric motor 18 thus becomes the second control mode. In the second control mode, the steering reaction force based on the virtual road load torque $T_{rl}$ is reflected.

Next, the weight setting unit 49 determines whether a twelfth condition that the vehicle lateral position $P_{lat}$ is greater than $P_{R4}$ (see FIG. 27) and the heading angle $\theta_{vh}$ is smaller than 0 is satisfied (step S39). For example, $P_{R4}$ is set to 30 cm.

When the twelfth condition is not satisfied (step S39: NO), the weight setting unit 49 returns to step S39.

When determination is made in step S39 that the twelfth condition is satisfied (step S39: YES), the weight setting unit 49 sets the first weight W1 to 1, and sets the second weight W2 to 0 (step S40). At this time, it is preferable that the weight setting unit 49 gradually increase the first weight W1 from 0 to 1 and gradually reduce the second weight W2 from 1 to 0.

The control mode of the electric motor 18 thus becomes the first control mode. In the first control mode, the steering reaction force based on the virtual road load torque $T_{rl}$ is not reflected.

After the process of step S40 is performed, the weight setting unit 49 returns to step S32.

FIG. 27 is a schematic diagram illustrating a steering reaction force generated based on the virtual road load torque $T_{rl}$ in the driving assist mode when the first vehicle lateral position is set to $P_{L3}$, $P_{R3}$ and the second vehicle lateral position is set to $P_{L4}$, $P_{R4}$.

At time t0, the control mode is the first mode and the vehicle reference position is at the center of the lane. Since the control mode is the first control mode, W1=1 and W2=0, and the steering reaction force based on the virtual road load torque $T_{rl}$ used to calculate the manual steering command value $\theta_{MD,cmd}$ is 0.

The driver steers to the right immediately after time t0. The vehicle therefore starts to move to the right. Assuming that $\theta_{vh}>0$ when the vehicle lateral position $P_{lat}$ crosses $P_{R3}$ toward the right lane boundary at time t1, the eleventh condition in step S37 of FIG. 26 is satisfied. Therefore, W1 is gradually reduced and W2 is gradually increased. At time t2, W1=0 and W2=1. That is, the control mode becomes the second control mode.

From time t0 to time t1, the steering reaction force based on the virtual road load torque $T_{rl}$ used to calculate the manual steering command value $\theta_{MD,cmd}$ is 0. From time t1 to t2, the steering reaction force gradually increases because part of the steering reaction force based on the virtual road load torque $T_{rl}$ is reflected. Since the control mode becomes the second control mode from time t2, the steering reaction force based on the virtual road load torque $T_{rl}$ further increases.

When the vehicle reference position reaches the right lane boundary (time t3), the steering reaction force reaches the maximum reaction force value. When the driver feels the steering reaction force and stops steering to the right, the vehicle moves toward the center of the lane. When the vehicle reference position is shifted toward the center of the lane from the right lane boundary (time t4), the steering reaction force based on the 15 virtual road load torque $T_{rl}$ decreases. Assuming that $\theta_{vh}<0$ when the vehicle lateral position $P_{lat}$ crosses $P_{R4}$ toward the center of the lane at time t5, the twelfth condition in step S39 of FIG. 26 is satisfied.

Therefore, W1 is gradually increased and W2 is gradually reduced. At time t6, W1=1 and W2=0. That is, the control mode becomes the first control mode.

From time t5 to t6, the steering reaction force gradually decreases because part of the steering reaction force based on the virtual road load torque $T_{rl}$ is reflected. Since the control mode becomes the first control mode from time t6, the steering reaction force based on the virtual road load torque $T_{rl}$ is 0.

In the fourth modification, the following effects can be obtained compared to the embodiment described above with reference to FIG. 12. In the fourth modification, the second vehicle lateral position is set closer to the lane boundary than the first vehicle lateral position of the embodiment described above. Therefore, when the driver steers in the direction in which the vehicle returns to the center of the lane after the control mode has been switched from the first control mode to the second control mode, the steering reaction force for the driver can be canceled earlier than in the embodiment described above. It is thus possible to reduce the feeling of discomfort in steering due to the unnecessary steering reaction force when the vehicle is returned to the center of the lane by the driver's operation.

Although the embodiment and modifications of the present invention are described above, the present invention may also be implemented in other forms.

In the embodiment or modifications described above, the virtual load spring stiffness coefficient $k_{vl}$ and the virtual load viscous damping coefficient ci are set to change depending on the vehicle lateral position $P_{lat}$ or depending on the vehicle lateral position $P_{lat}$ and the heading angle $\theta_{vh}$, but may be set to change depending on a time differential value of the vehicle lateral position $P_{lat}$, a differential value of the heading angle, etc.

Preset fixed values may be used for the virtual load spring stiffness coefficient $k_{vl}$ and the virtual load viscous damping coefficient $c_{vl}$.

In the embodiment described above, the vehicle lateral position $P_{lat}$ is the distance from the boundary of the lane where the vehicle is currently traveling (lane boundary) to the vehicle reference position. The vehicle lateral position $P_{lat}$ may be a distance from the center of the lane where the vehicle is currently traveling to the vehicle reference position.

In the embodiment described above, the assist torque command value $T_{asst}$ is multiplied by the first weight W1, and the assist torque command value $W1 \cdot T_{asst}$ after the first weight multiplication is provided to the addition unit 47. Instead, however, a manual torque command value according to the manual steering command value $\theta_{MD,cmd}$ may be multiplied by the first weight W1, and the manual torque command value after the first weight multiplication may be provided to the addition unit 47.

In the embodiment described above, the angle control unit 44 (see FIG. 7) includes the feedforward control unit 53. However, the feedforward control unit 53 may be omitted. In this case, the feedback control torque $T_{fb}$, calculated by the feedback control unit 52 is basic target torque.

The driving assist control (LKA) according to the present embodiment can be used in combination with lane centering assist (LCA) control that causes the vehicle to travel along the center of the lane.

Figure 28:
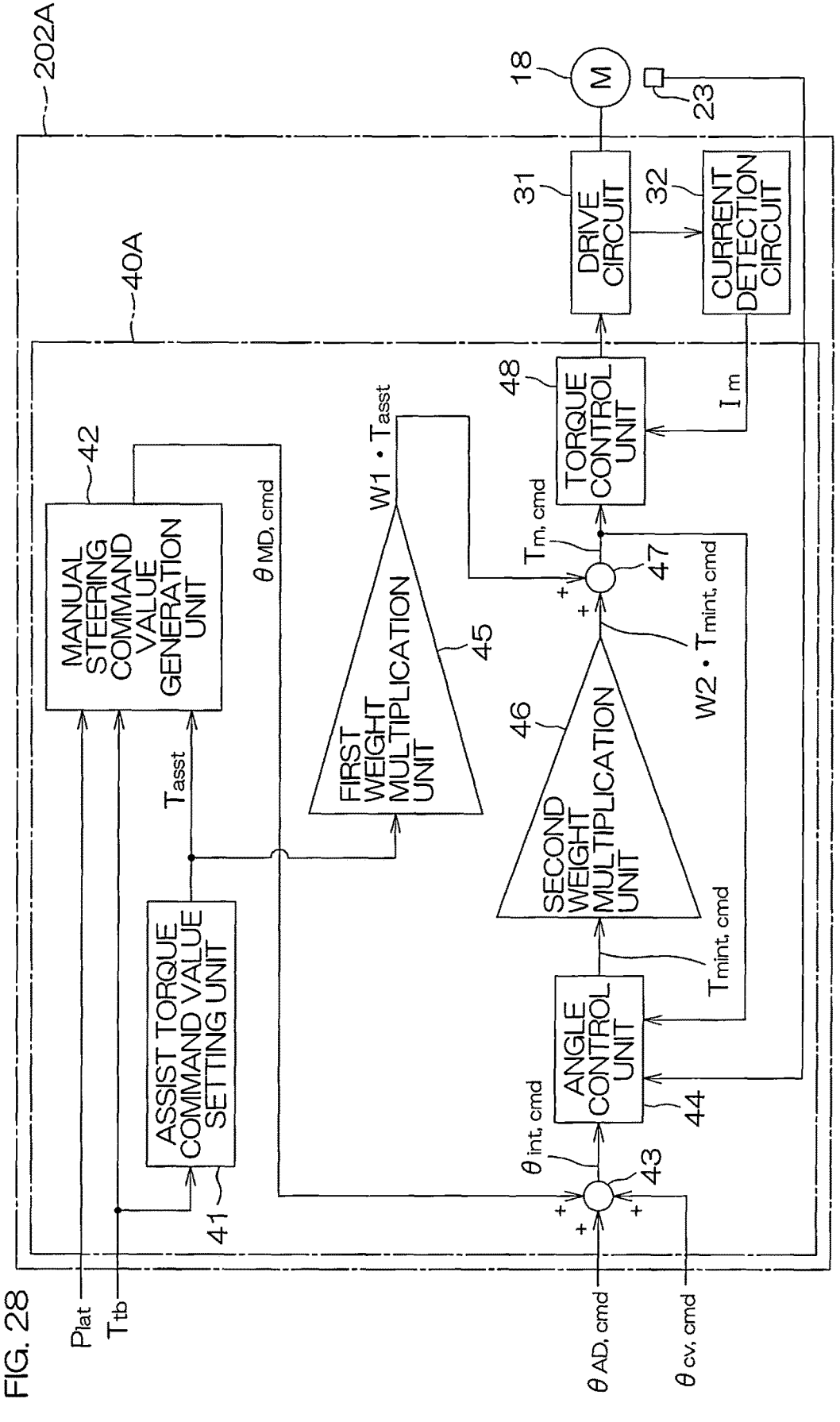
FIG. 28 is a block diagram showing an example of a motor control ECU when lane keep assist (LKA) control and lane centering assist (LCA) control are used in combination.

FIG. 28 is a block diagram showing an example of a motor control ECU 202A when the lane keep assist (LKA) control and the lane centering assist (LCA) control are used in combination. In FIG. 28, portions corresponding to those in FIG. 2 described above are denoted by the same signs as those in FIG. 2.

Comparing the motor control ECU 202A of FIG. 28 with the motor control ECU 202 of FIG. 2, the functional configuration of a microcomputer 40A is different from the functional configuration of the microcomputer 40 of FIG. 2.

Specifically, the microcomputer 40A of FIG. 28 does not include the weight setting unit 49 of FIG. 2. That is, the microcomputer 40A includes the assist torque command value setting unit 41, the manual steering command value generation unit 42, the integrated angle command value calculation unit 43, the angle control unit 44, the first weight multiplication unit 45, the second weight multiplication unit 46, the addition unit 47, and the torque control unit 48.

The first weight W1 used in the first weight multiplication unit 45 and the second weight W2 used in the second weight multiplication unit 46 are set to predetermined values in advance. For example, when the lane keep assist (LKA) control and the lane centering assist (LCA) control are used in combination, the first weight W1 is set to 0 and the second weight W2 is set to 1. When fully manual steering is performed, the first weight W1 is set to 1 and the second weight W2 is set to 0. It is herein assumed that the first weight W1 is set to 0 and the second weight W2 is set to 1.

The operations of the assist torque command value setting unit 41, the angle control unit 44, and the torque control unit 48 are the same as the operations of the assist torque command value setting unit 41, the angle control unit 44, and the torque control unit 48 of FIG. 2, and therefore description thereof will be omitted.

The operation of the manual steering command value generation unit 42 will be described.

The road load torque (virtual road load torque) $T_{rl}$ is given by expression (1) above using the virtual load spring stiffness coefficient $k_{vl}$, the virtual load viscous damping coefficient $c_{vl}$, and the manual steering command value $\theta_{MD,cmd}$.

Figure 29:
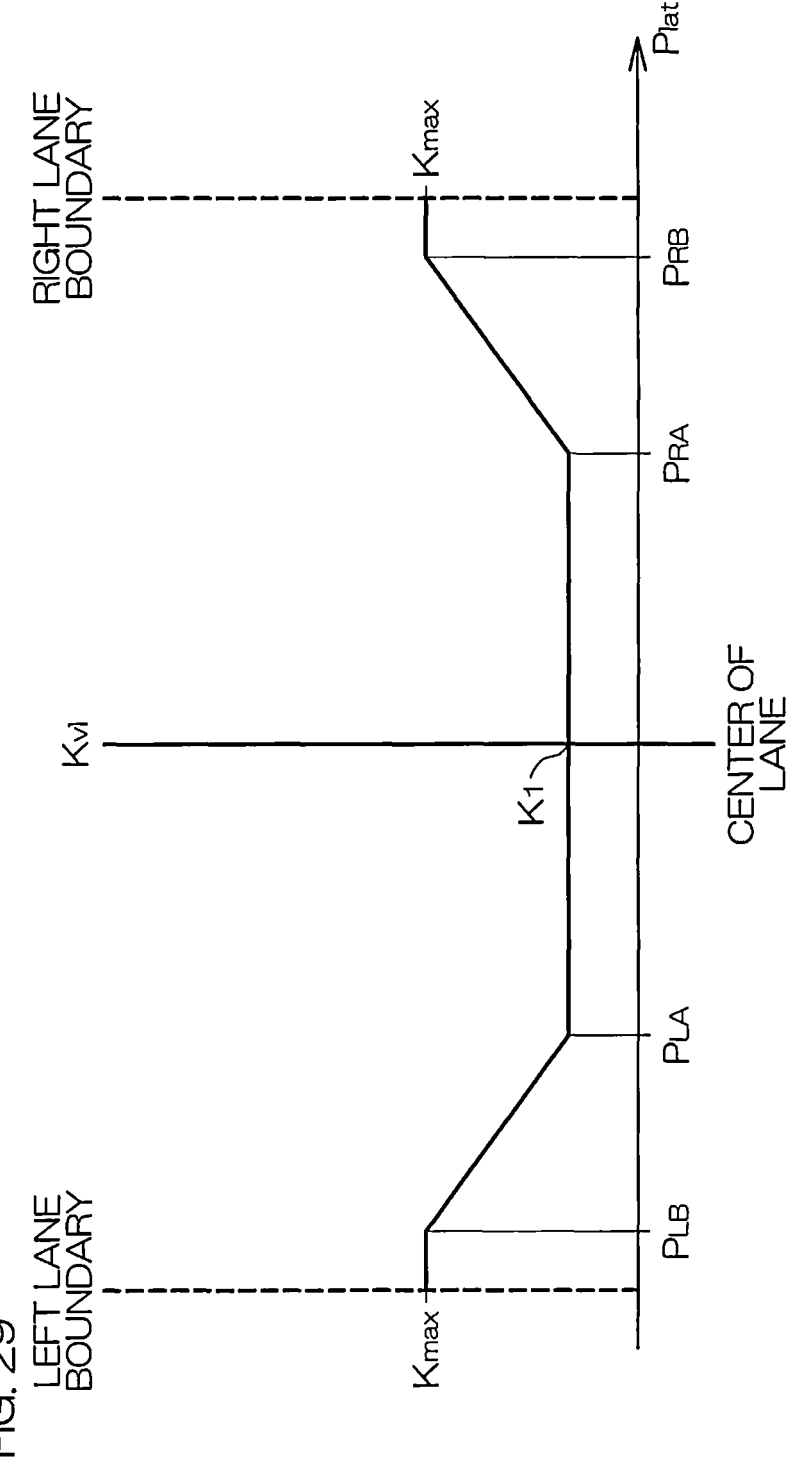
FIG. 29 is a graph showing an example of setting the virtual load spring stiffness coefficient $k_{vl}$ with respect to the vehicle lateral position $P_{lat}$.

FIG. 29 is a graph showing an example of setting the virtual load spring stiffness coefficient $k_{vl}$ with respect to the vehicle lateral position $P_{lat}$. The affix L of each symbol in FIG. 29 indicates that the symbol is applied when the vehicle reference position is on the left side with respect to the center of the lane, and the affix R indicates that the symbol is applied when the vehicle reference position is on the right side with respect to the center of the lane.

When the vehicle lateral position $P_{lat}$ is equal to or greater than a predetermined value $P_{LA}$ with respect to the left lane boundary or equal to or greater than a predetermined value $P_{RA}$ with respect to the right lane boundary, the virtual load spring stiffness coefficient $k_{vl}$ is set to a predetermined value $k_1$.

When the vehicle lateral position $P_{lat}$ is equal to or greater than a predetermined value $P_{LB}$ smaller than $P_{LA}$ and is smaller than $P_{LA}$ with respect to the left lane boundary, the virtual load spring stiffness coefficient $k_{vl}$ is set according to a characteristic that it gradually increases from $k_{vl}$ to $k_{max}$ as the vehicle lateral position $P_{lat}$ decreases from $P_{LA}$ (as the vehicle reference position approaches the left lane boundary).

When the vehicle lateral position $P_{lat}$ is equal to or greater than a predetermined value $P_{RB}$ smaller than $P_{RA}$ and is smaller than $P_{RA}$ with respect to the right lane boundary, the virtual load spring stiffness coefficient $k_{vl}$ is set according to a characteristic that it gradually increases from $k_{vl}$ to $k_{max}$ as the vehicle lateral position $P_{lat}$ decreases from $P_{RA}$ (as the vehicle reference position approaches the right lane boundary).

When the vehicle lateral position $P_{lat}$ is smaller than $P_{LB}$ with respect to the left lane boundary, the virtual load spring stiffness coefficient $k_{vl}$ is set to $k_{max}$. When the vehicle lateral position $P_{lat}$ is smaller than $P_{RB}$ with respect to the right lane boundary, the virtual load spring stiffness coefficient $k_{vl}$ is set to $k_{max}$.

The characteristics of the virtual load viscous damping coefficient $c_{vl}$ with respect to the vehicle lateral position $P_{lat}$ are set similarly to the characteristics of the virtual load spring stiffness coefficient $k_{vl}$ with respect to the vehicle lateral position $P_{lat}$. Detailed description of the virtual load viscous damping coefficient $c_{vl}$ with respect to the vehicle lateral position $P_{lat}$ will be omitted.

The manual steering command value generation unit 42 calculates the manual steering command value $\theta_{MD,cmd}$ based on expression (2) above. Specifically, the manual steering command value generation unit 42 calculates the manual steering command value $\theta_{MD,cmd}$ by solving the differential equation given by expression (2) by substituting the torsion bar torque $T_{tb}$ detected by the torque sensor 12 into $T_{tb}$ of expression (2) and substituting the assist torque command value $T_{asst}$ set by the assist torque command value setting unit 41 into $T_{asst}$ of expression (2).

Referring to FIG. 28, as in the embodiment described above, the higher-level ECU (not shown) generates the vehicle lateral position $P_{lat}$ and the automatic steering command value $\theta_{AD,cmd}$, and provides the generated vehicle lateral position $P_{lat}$ and the generated automatic steering command value $\theta_{AD,cmd}$ to the motor control ECU 202A. In this example, the automatic steering command value $\theta_{AD,cmd}$ is a target value of the steering angle for causing the vehicle to travel along the lane center line.

When the vehicle lateral position $P_{lat}$ is equal to or smaller than $P_{LB}$ with respect to the left lane boundary and is equal to or smaller than $P_{RB}$ with respect to the right lane boundary, the higher-level ECU generates a vibration angle command value $\theta_{cv,cmd}$ according to a waveform of alert vibration to be given to the steering wheel 2 (hereinafter referred to as "target vibration waveform"), and provides the vibration angle command value $\theta_{ev,cmd}$ to the motor control ECU 202A. The vibration angle command value $\theta_{ev,cmd}$ indicates an instantaneous value of the target vibration waveform in terms of the rotational angle of the output shaft (steering shaft) 9. The target vibration waveform has a specified target amplitude and a predetermined target frequency.

Figure 30:
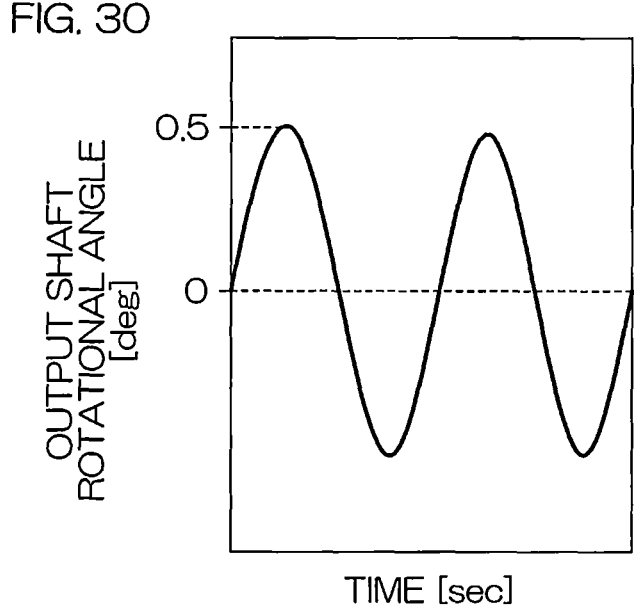
FIG. 30 is a schematic diagram showing an example of a target vibration waveform.

FIG. 30 shows an example of the target vibration waveform. In the example of FIG. 30, the target amplitude is set to 0.5 [deg] and the target frequency is set to 30 [Hz].

The manual steering command value $\theta_{MD,cmd}$ calculated by the manual steering command value generation unit 42 is provided to the integrated angle command value calculation unit 43. The automatic steering command value $\theta_{AD,cmd}$ and the vibration angle command value $\theta_{cv,cmd}$ are further provided to the integrated angle command value calculation unit 43 from the higher-level ECU.

When the vibration angle command value $\theta_{cv,cmd}$ is not provided from the higher-level ECU, the integrated angle command value calculation unit 43 calculates the integrated angle command value $\theta_{int,cmd}$ by adding the manual steering command value $\theta_{MD,cmd}$ to the automatic steering command value $\theta_{AD,cmd}$. When the vibration angle command value $\theta_{cv,cmd}$ is provided from the higher-level ECU, the integrated angle command value calculation unit 43 calculates the integrated angle command value $\theta_{int,cmd}$ by adding the vibration angle command value $\theta_{cv,cmd}$ and the manual steering command value $\theta_{MD,cmd}$ to the automatic steering command value $\theta_{AD,cmd}$.

The angle control unit 44 calculates the integrated motor torque command value $T_{mint,cmd}$ that matches the integrated angle command value $\theta_{int,cmd}$ based on the integrated angle command value $\theta_{int,cmd}$. In this example, the first weight W1 is set to 0 and the second weight W2 is set to 1. Therefore, the integrated motor torque command value $T_{mint,cmd}$ is provided to the torque control unit 48 as the motor torque command value $T_{m,cmd}$.

Figure 31:
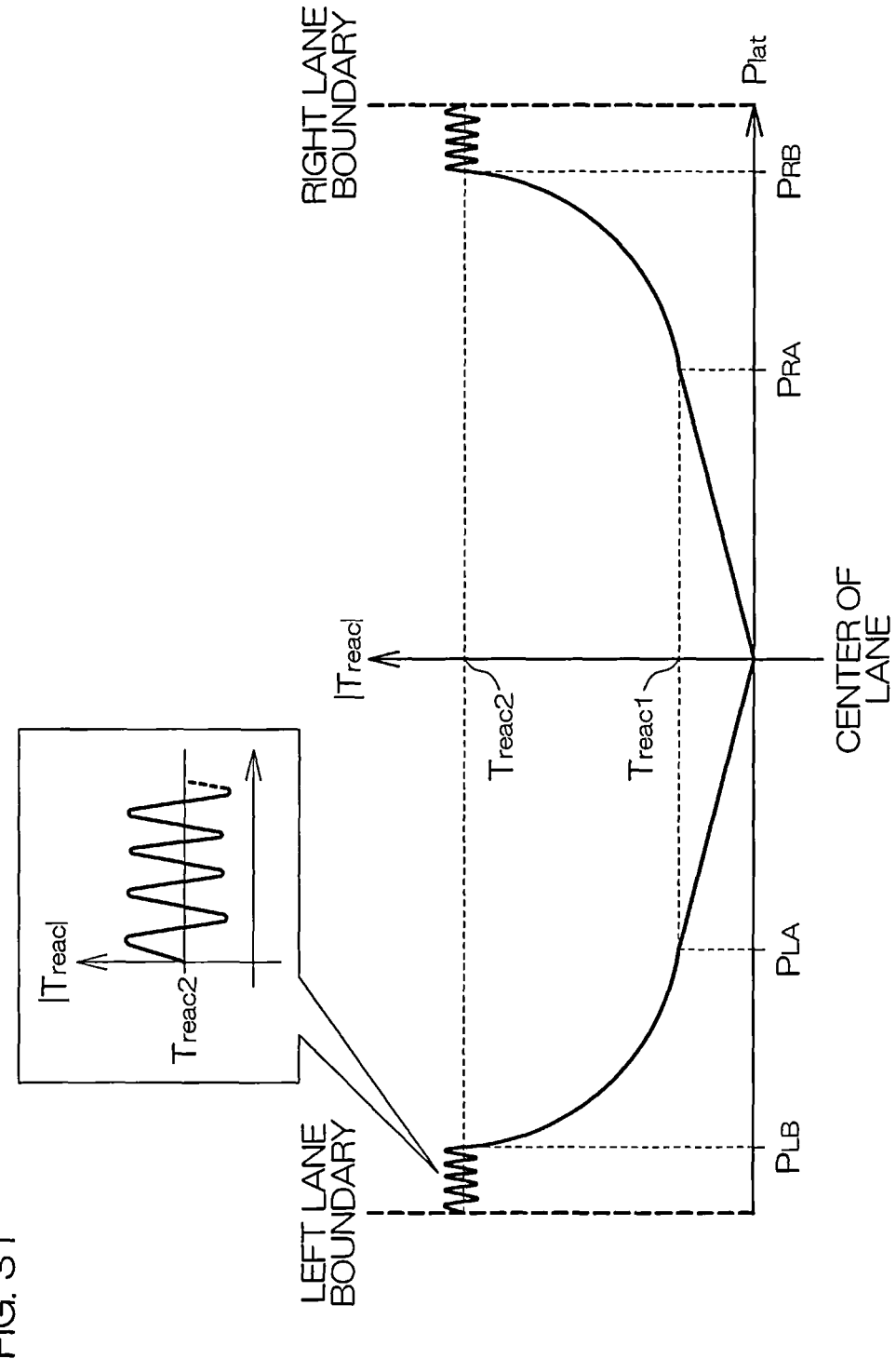
FIG. 31 is a graph showing an example of the relationship between the vehicle lateral position $P_{lat}$ and an absolute value $|T_{reac}|$ of a steering reaction force $T_{reac}$ when the characteristic of the virtual load spring stiffness coefficient $k_{vl}$ is the characteristic shown in FIG. 29 and the characteristic of the virtual load viscous damping coefficient $c_{vl}$ is similar to the characteristic shown in FIG. 29.

FIG. 31 is a graph showing an example of the relationship between the vehicle lateral position $P_{lat}$ and an absolute value $|T_{reac}|$ of a steering reaction force $T_{reac}$ when the characteristic of the virtual load spring stiffness coefficient $k_{vl}$ is the characteristic shown in FIG. 29 and the characteristic of the virtual load viscous damping coefficient ci is similar to the characteristic shown in FIG. 29.

When the vehicle lateral position $P_{lat}$ is equal to or greater than $P_{LA}$ with respect to the left lane boundary, the absolute value $|T_{reac}|$ of the steering reaction force $T_{reac}$ (absolute value $|T_{rl}|$ of the virtual road load torque $T_{rl}$) gradually increases from 0 to $T_{reac1}$ as it approaches $P_{LA}$ from the center of the lane. In the example of FIG. 31, $|T_{reac}|$ gradually increases linearly. In this range, the lane centering assist (LCA) control is performed.

When the vehicle lateral position $P_{lat}$ is equal to or greater than $P_{LB}$ and smaller than $P_{LA}$ with respect to the left lane boundary, the absolute value $|T_{reac}|$ of the steering reaction force $T_{reac}$ (absolute value $|T_{rl}|$ of the virtual road load torque $T_{rl}$) gradually increases from $T_{reac1}$ to $T_{reac2}$ as the vehicle lateral position $P_{lat}$ decreases from $P_{LA}$ (as the vehicle reference position approaches the left lane boundary). In the example of FIG. 31, $|T_{reac}|$ gradually increases non-linearly. In this range, the lane keep assist (LKA) control is performed.

When the vehicle lateral position $P_{lat}$ is smaller than $P_{LB}$, the absolute value $|T_{reac}|$ of the steering reaction force $T_{reac}$ is a value obtained by adding a vibration torque $T_{cv}$ according to the vibration angle command value $\theta_{cv,cmd}$ to $T_{reac2}$. The alert vibration can thus be transferred to the driver when the vehicle lateral position $P_{lat}$ is smaller than $P_{LB}$.

When the vehicle lateral position $P_{lat}$ is equal to or greater than $P_{RA}$ with respect to the right lane boundary, the absolute value $|T_{reac}|$ of the steering reaction force $T_{reac}$ (absolute value $|T_{rl}|$ of the virtual road load torque $T_{rl}$) gradually increases from 0 to $T_{reac1}$ as it approaches $P_{RA}$ from the center of the lane. In the example of FIG. 31, $|T_{reac}|$ gradually increases linearly. In this range, the lane centering assist (LCA) control is performed.

When the vehicle lateral position $P_{lat}$ is equal to or greater than $P_{RB}$ and smaller than $P_{RA}$ with respect to the right lane boundary, the absolute value $|T_{reac}|$ of the steering reaction force $T_{reac}$ (absolute value $|T_{rl}|$ of the virtual road load torque $T_{rl}$) gradually increases from $T_{reac1}$ to $T_{reac2}$ as the vehicle lateral position $P_{lat}$ decreases from $P_{RA}$ (as the vehicle reference position approaches the right lane boundary). In the example of FIG. 31, $|T_{reac}|$ gradually increases non-linearly. In this range, the lane keep assist (LKA) control is performed.

When the vehicle lateral position $P_{lat}$ is smaller than $P_{RB}$, the absolute value $|T_{reac}|$ of the steering reaction force $T_{reac}$ is a value obtained by adding the vibration torque $T_{cv}$ according to the vibration angle command value $\theta_{cv,cmd}$ to $T_{reac2}$. The alert vibration can thus be transferred to the driver when the vehicle lateral position $P_{lat}$ is smaller than $P_{RB}$.

The embodiment and modifications described above illustrate an example in which the present invention is applied to a column type EPS. However, the present invention is also applicable to EPSs other than the column type. The present invention is also applicable to a steer-by-wire system.

Although the embodiment of the present invention is described in detail above, this is merely a specific example used to clarify the technical content of the present invention, and the present invention should not be construed as being limited to the specific example, and the scope of the present invention is limited only by the appended claims.

This application corresponds to an international patent application (PCT/JP2021/041059) filed with the Japan Patent Office as the receiving office on Nov. 8, 2021, the entire disclosure of which is incorporated herein by reference.

DESCRIPTION OF THE REFERENCE NUMERALS

1 . . . electric power steering system, 3 . . . steered wheel, 4 . . . steering operation mechanism, 18 electric motor, 41 assist torque command value setting unit, 42 manual steering command value generation unit, 43 integrated angle command value calculation unit, 44 . . . angle control unit, 45 . . . first weight multiplication unit, 46 . . . second weight multiplication unit, 47 addition unit, 48 torque control unit, 49 . . . weight setting unit, 50 . . . hands-on/off determination unit

The invention claimed is:

1. A motor control device that controls drive of an electric motor for steering angle control, the motor control device comprising:

an assist torque command value generation unit that generates an assist torque command value using steering torque;

a manual steering command value generation unit that generates a manual steering command value using the steering torque and the assist torque command value;

an integrated angle command value calculation unit that calculates an integrated angle command value by adding the manual steering command value to an automatic steering command value for driving assist; and a switching unit that switches between a first control mode in which the electric motor is controlled based on the assist torque command value or the manual steering command value and a second control mode in which the electric motor is controlled based on the integrated angle command value according to a lateral position of a vehicle with respect to a lane in a driving assist mode, wherein the manual steering command value is calculated in consideration of a virtual road load torque, and the virtual road load torque is set according to the lateral position of the vehicle with respect to the lane.

2. The motor control device according to claim 1, wherein:

a first lateral position that is the lateral position at which the first control mode is switched to the second control mode and a second lateral position that is the lateral position at which the second control mode is switched to the first control mode are set in advance; and a steering reaction force applied to the vehicle when the vehicle moves from a lane boundary of the lane to the second lateral position has a first characteristic in which a rate of decrease in the steering reaction force is high, and a second characteristic that is continuous with the first characteristic and in which the rate of decrease in the steering reaction force is lower than the rate of decrease in the steering reaction force in the first characteristic.

3. The motor control device according to claim 1, wherein a first lateral position that is the lateral position at which the first control mode is switched to the second control mode and a second lateral position that is the lateral position at which the second control mode is switched to the first control mode are set to different positions.

4. The motor control device according to claim 3, wherein the second lateral position is set closer to a center of the lane than the first lateral position.

5. The motor control device according to claim 3, wherein the first lateral position is set closer to a center of the lane than the second lateral position.

6. A motor control device that controls drive of an electric motor for steering angle control, the motor control device comprising:

an assist torque command value generation unit that generates an assist torque command value using steering torque;

a manual steering command value generation unit that generates a manual steering command value using the steering torque and the assist torque command value;

an integrated angle command value calculation unit that calculates an integrated angle command value by adding the manual steering command value to an automatic steering command value for driving assist; and a switching unit that switches between a first control mode in which the electric motor is controlled based on the assist torque command value or the manual steering command value and a second control mode in which the electric motor is controlled based on the integrated angle command value according to a lateral position of a vehicle with respect to a lane in a driving assist mode, wherein:

a first lateral position that is the lateral position at which the first control mode is switched to the second control mode and a second lateral position that is the lateral position at which the second control mode is switched to the first control mode are set in advance; and a steering reaction force applied to the vehicle when the vehicle moves from a lane boundary of the lane to the second lateral position has a first characteristic in which a rate of decrease in the steering reaction force is high, and a second characteristic that is continuous with the first characteristic and in which the rate of decrease in the steering reaction force is lower than the rate of decrease in the steering reaction force in the first characteristic.

7. The motor control device according to claim 6, wherein the manual steering command value is calculated in consideration of a virtual road load torque.

* * * * *